US012734696B2

(12) United States Patent
Haruna

(10) Patent No.: US 12,734,696 B2
(45) Date of Patent: Sep. 15, 2026

(54) REMOTE OPERATION SYSTEM

(71) Applicant: Mitsubishi Electric Corporation, Tokyo (JP)

(72) Inventor: Masaki Haruna, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 57 days.

(21) Appl. No.: 18/574,752

(22) PCT Filed: Jul. 7, 2021

(86) PCT No.: PCT/JP2021/025584
§ 371 (c)(1),
(2) Date: Dec. 28, 2023

(87) PCT Pub. No.: WO2023/281648
PCT Pub. Date: Jan. 12, 2023

(65) Prior Publication Data
US 2024/0335948 A1 Oct. 10, 2024

(51) Int. Cl.
*B25J 9/16* (2006.01)
*B25J 13/06* (2006.01)
*B25J 19/02* (2006.01)

(52) U.S. Cl.
CPC ............ *B25J 9/1689* (2013.01); *B25J 13/06* (2013.01); *B25J 19/023* (2013.01)

(58) Field of Classification Search
None
See application file for complete search history.

(56) References Cited

U.S. PATENT DOCUMENTS

| | | | | |
|---|---|---|---|---|
| 11,498,216 | B2 | 11/2022 | Saruta et al. | |
| 12,017,351 | B2 * | 6/2024 | Rod | G02B 27/017 |
| 2017/0181808 | A1 * | 6/2017 | Panescu | A61B 34/20 |
| 2020/0215691 | A1 | 7/2020 | Saruta et al. | |
| 2020/0405405 | A1 * | 12/2020 | Shelton, IV | A61B 17/068 |

(Continued)

FOREIGN PATENT DOCUMENTS

| | | | |
|---|---|---|---|
| WO | 2016/113836 | A1 | 7/2016 |
| WO | 2019/059364 | A1 | 3/2019 |
| WO | 2019/224994 | A1 | 11/2019 |

OTHER PUBLICATIONS

International Search Report and Written Opinion mailed on Oct. 5, 2021, received for PCT Application PCT/JP2021/025584, filed on Jul. 7, 2021, 9 pages including English Translation.

(Continued)

*Primary Examiner* — Arslan Azhar
(74) *Attorney, Agent, or Firm* — XSENSUS LLP

(57) ABSTRACT

A remote operation system includes an edge device that contacts a target, a motion operation transmission device that receives an operator operation for operating the edge device and outputs motion transmission information to the edge device, and a visual presentation device that displays an image of the target and the edge device. The edge device-includes a haptic sensing device that detects a haptic sensation to the target, a haptic optical converter that converts the haptic sensation detected by the haptic sensing device into a light intensity signal specifying the intensity of light, and a light intensity-controlled light emitter that emits light of an intensity corresponding to the light intensity signal.

15 Claims, 38 Drawing Sheets

(56) References Cited

U.S. PATENT DOCUMENTS

| | | | | |
|---|---|---|---|---|
| 2021/0072762 | A1 | 3/2021 | Kasuya et al. | |
| 2023/0133825 | A1* | 5/2023 | Row | G06T 7/33<br>700/245 |

OTHER PUBLICATIONS

Cirillo A. et al., “A Conformable Force/Tactile Skin for Physical Human Robot Interaction”, IEEE Robotics and Automation Letters, vol. 1, No. 1, Jan. 1, 2016 (Jan. 1, 2016), pp. 41-48, XP093181214, ISSN: 2377-3774, DOI: 10.1109/LRA.2015.2505061.

EESR dated Jul. 23, 2024 from the European patent office in application No. 21949282.4, 11pp.

Office Action mailed on Mar. 11, 2026 for the corresponding Chinese patent application No. 202180100061.3 and an English machine translation thereof, 18pp.

* cited by examiner

1
IMAGING DEVICE
3000
3000a
LIGHT INTENSITY-CONTROLLED LIGHT EMITTERS
2600
HAPTIC SENSING DEVICES
2300
END EFFECTOR
2100
EDGE DEVICE
2000
HAPTIC OPTICAL CONVERTER
2700
2700a
2300a
TARGET
4000
4000a
VISUAL PRESENTATION DEVICE
1100
1100a
OPERATOR
1000
1000a
MOTION OPERATION TRANSMISSION DEVICE
1200
1200a

10
IMAGING DEVICE
3000
3000a
VISUAL PRESENTATION DEVICE
1100
1100a
OPERATOR
1000
1000a
MOTION OPERATION TRANSMISSION DEVICE
1200
1200a
2000
2700a
LIGHT INTENSITY-CONTROLLED LIGHT EMITTER
2600
HAPTIC OPTICAL CONVERTER
2700
HAPTIC SENSING DEVICE
2300
2300a
4000a
TARGET
4000
TOOL
2200
END EFFECTOR
2100
EDGE DEVICE

11
VISION-BASED SENSORY TRANSMISSION DEVICE
3200
3200a
IMAGING DEVICE
3000
3000a
VISUAL PRESENTATION DEVICE
1100
1100a
OPERATOR
1000
1000a
MOTION OPERATION TRANSMISSION DEVICE
1200
1200a
3300a
2300a
2000
PASSIVE MARKER
2500
HAPTIC SENSING DEVICE
2300
TOOL
2200
END EFFECTOR
2100
EDGE DEVICE
4000a
TARGET
4000

Figure 42:
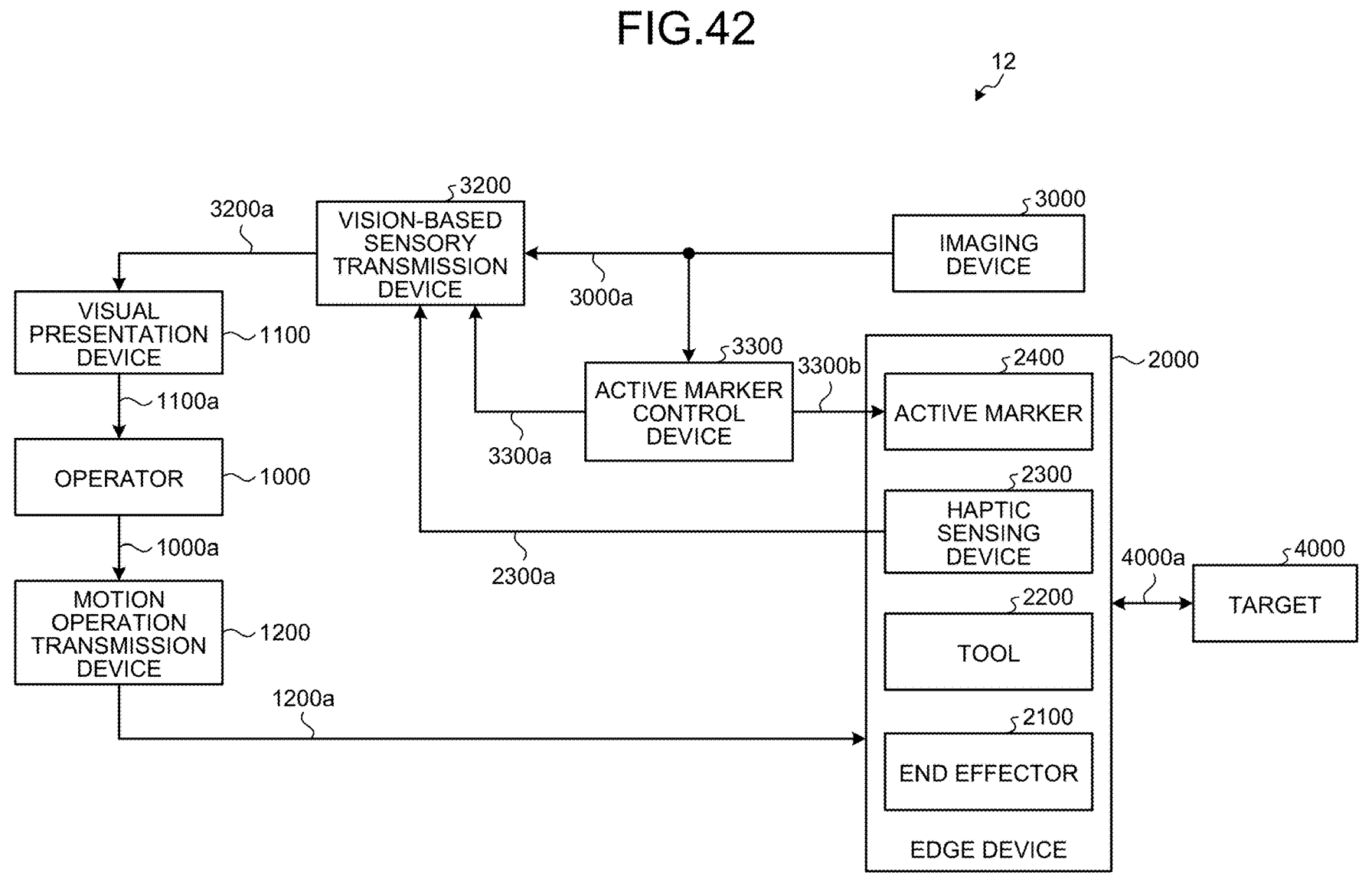

IMAGING DEVICE 3000

EDGE DEVICE 2000

ACTIVE MARKER 2400

HAPTIC SENSING DEVICE 2300

TOOL 2200

END EFFECTOR 2100

TARGET 4000

4000a

3300b

ACTIVE MARKER CONTROL DEVICE 3300

3000a

3300a

2300a

VISION-BASED SENSORY TRANSMISSION DEVICE 3200

3200a

VISUAL PRESENTATION DEVICE 1100

1100a

OPERATOR 1000

1000a

MOTION OPERATION TRANSMISSION DEVICE 1200

1200a

13
VISION-BASED SENSORY TRANSMISSION DEVICE
3200
3200a
IMAGING DEVICE
3000
3000a
VISUAL PRESENTATION DEVICE
1100
1100a
ACTIVE MARKER CONTROL DEVICE
3300
3300a
3300b
2000
ACTIVE MARKERS
2400
OPERATOR
1000
1000a
HAPTIC SENSING DEVICE
2300
2300a
4000a
TARGET
4000
MOTION OPERATION TRANSMISSION DEVICE
1200
1200a
TOOL
2200
END EFFECTOR
2100
EDGE DEVICE

REMOTE OPERATION SYSTEM

CROSS-REFERENCE TO RELATED APPLICATION

This application is a national phase application under 35 U.S.C. § 371, based on International Patent Application No. PCT/JP2021/025584, filed Jul. 7, 2021, the entire contents of which are incorporated herein by reference.

FIELD

The present disclosure relates to a remote operation system for a person at a place distant from an edge device to operate the edge device.

BACKGROUND

Patent Literature 1 discloses a motion detecting device that detects the movements of the fingers of an operator for remotely operating an articulated robot. In conventionally known remote operation systems, an operator operates an edge device by wire. The conventional remote operation systems transmit haptic information on the edge device in a work environment to the operator, thereby contributing to the improvement of operability and realism for the operator.

CITATION LIST

Patent Literature

Patent Literature 1: WO 2019/224994 A

SUMMARY OF INVENTION

Problem to be Solved by the Invention

The conventional remote operation systems feed the haptic information on the edge device back to the operator by physical force. For that, the conventional remote operation systems require a drive unit in an operation interface for the operator, and have a problem that an operating device becomes large and complex.

The present disclosure has been made in view of the above. It is an object of the present disclosure to provide a remote operation system that avoids increases in the size and complexity of an operating device.

Means to Solve the Problem

To solve the problem and achieve the object described above, a remote operation system according to the present disclosure includes: an edge device that contacts a target; a motion operation transmission device that receives an operator operation for operating the edge device and outputs motion transmission information corresponding to the operator operation to the edge device; and a visual display device that displays an image of the target and the edge device. The edge device includes: a haptic sensing device that detects a haptic sensation to the target, a haptic optical converter that converts the haptic sensation detected by the haptic sensing device into a signal specifying an intensity of light corresponding to a magnitude of the detected haptic sensation, and a light intensity-controlled light emitter that emits light of an intensity corresponding to the signal obtained by the haptic optical converter.

Effects of the Invention

The remote operation system according to the present disclosure has the effect of being able to avoid increases in the size and complexity of an operating device.

BRIEF DESCRIPTION OF DRAWINGS

FIG. 42 is a diagram illustrating a configuration of a remote operation system according to a twelfth embodiment.

DESCRIPTION OF EMBODIMENTS

Hereinafter, a remote operation system according to embodiments will be described in detail with reference to the drawings.

First Embodiment

Figure 1:
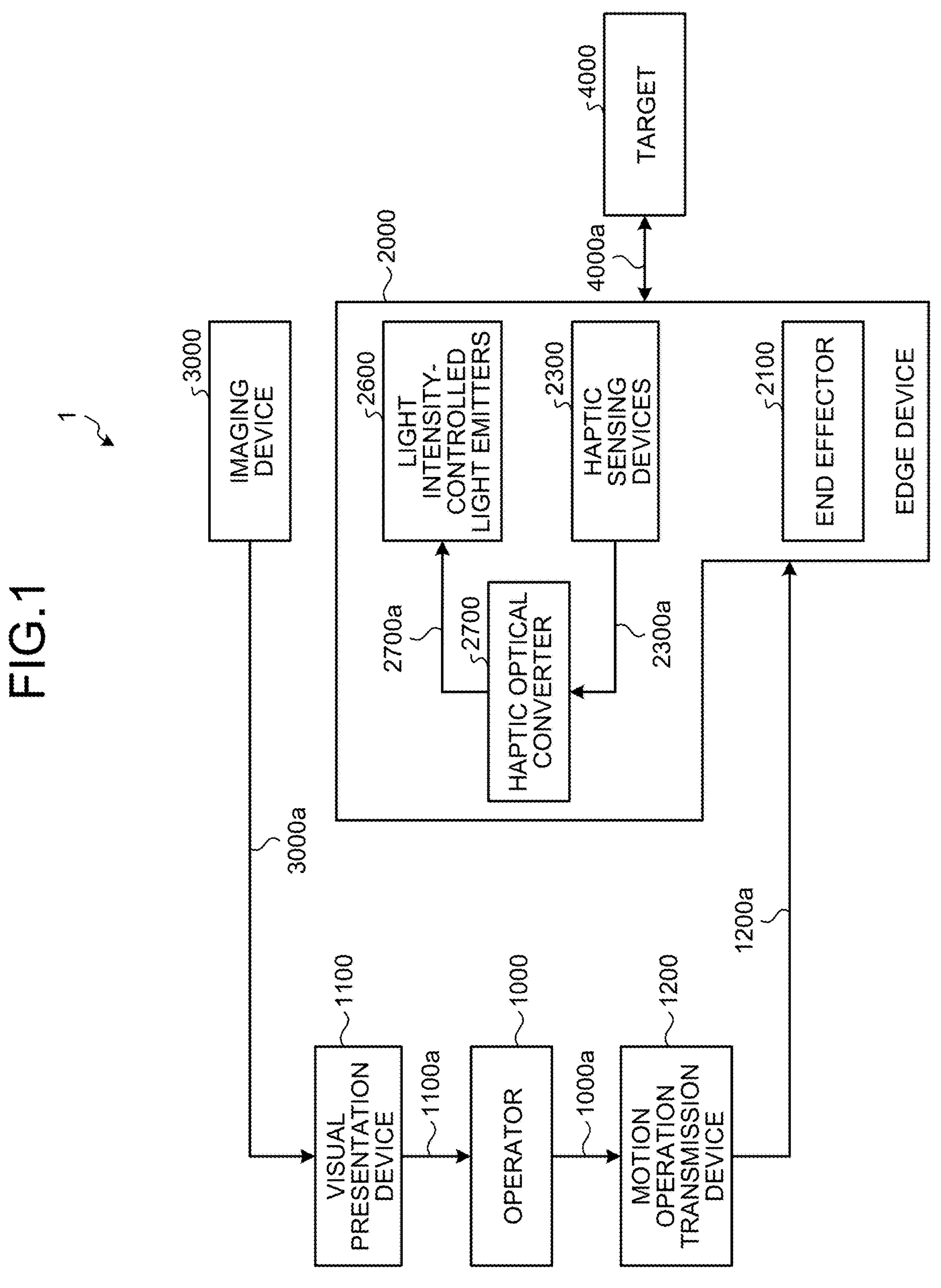
FIG. 1 is a diagram illustrating a configuration of a remote operation system according to a first embodiment.

FIG. 1 is a diagram illustrating a configuration of a remote operation system 1 according to a first embodiment. The remote operation system 1 includes a motion operation transmission device 1200 that receives, as input, an operator operation 1000*a* that is a motion operation by an operator 1000. FIG. 1 also illustrates the operator 1000. The motion operation transmission device 1200 outputs motion transmission information 1200*a* corresponding to the operator operation 1000*a*.

The remote operation system 1 further includes an edge device 2000 that contacts a target 4000. The operator operation 1000*a* is an instruction for operating the edge device 2000. FIG. 1 also illustrates the target 4000. The motion operation transmission device 1200 receives the operator operation 1000*a* for operating the edge device 2000, and outputs the motion transmission information 1200*a* corresponding to the operator operation 1000*a* to the edge device 2000. The edge device 2000 is operated by the motion transmission information 1200*a* output from the motion operation transmission device 1200. The target 4000 has an interaction 4000*a* with the edge device 2000 when the edge device 2000 operates. The target 4000 is a work environment of the edge device 2000.

The remote operation system 1 further includes an imaging device 3000 that images the target 4000 and the edge device 2000. The imaging device 3000 outputs imaging information 3000*a* indicating the result of imaging. The remote operation system 1 further includes a visual presentation device 1100 that receives, as input, the imaging information 3000*a* output from the imaging device 3000, and provides the operator 1000 with image information 1100*a* corresponding to the imaging information 3000*a*. That is, the visual presentation device 1100 displays an image of the target 4000 and the edge device 2000.

The edge device 2000 includes an end effector 2100 intended for interaction with the target 4000, and haptic sensing devices 2300 attached to the end effector 2100 for detecting haptic sensations to the target 4000. The haptic sensing devices 2300 output haptic information 2300*a* indicating the detected haptic sensations.

The edge device 2000 further includes a haptic optical converter 2700 that converts the haptic information 2300*a* output from the haptic sensing devices 2300 into light intensity signals 2700*a*. The haptic optical converter 2700 converts the haptic sensations detected by the haptic sensing devices 2300 into the light intensity signals 2700*a* that are signals specifying the intensities of light corresponding to the magnitudes of the detected haptic sensations. The edge device 2000 further includes light intensity-controlled light emitters 2600 attached to the end effector 2100 for emitting light of intensities corresponding to the light intensity signals 2700*a* obtained by the haptic optical converter 2700. The intensities of light emitted by the light intensity-controlled light emitters 2600 are controlled by the light intensity signals 2700*a*.

Figure 2:
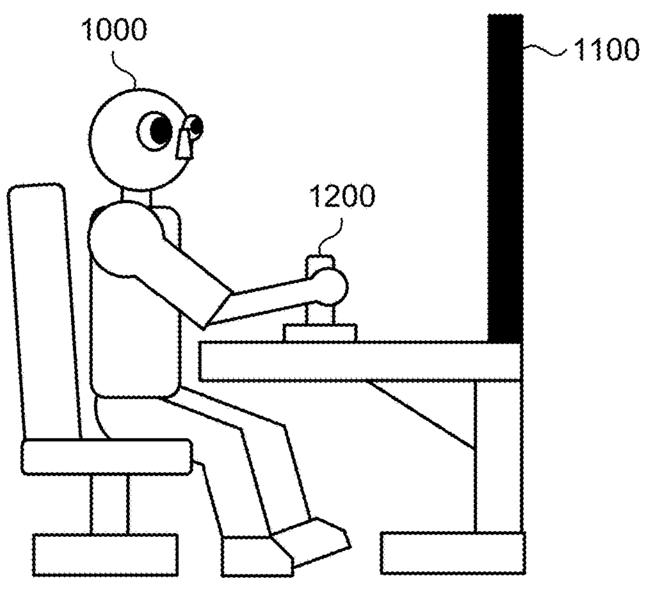
FIG. 2 is a diagram illustrating an operator, a visual presentation device, and a motion operation transmission device in the first embodiment.
Figure 3:
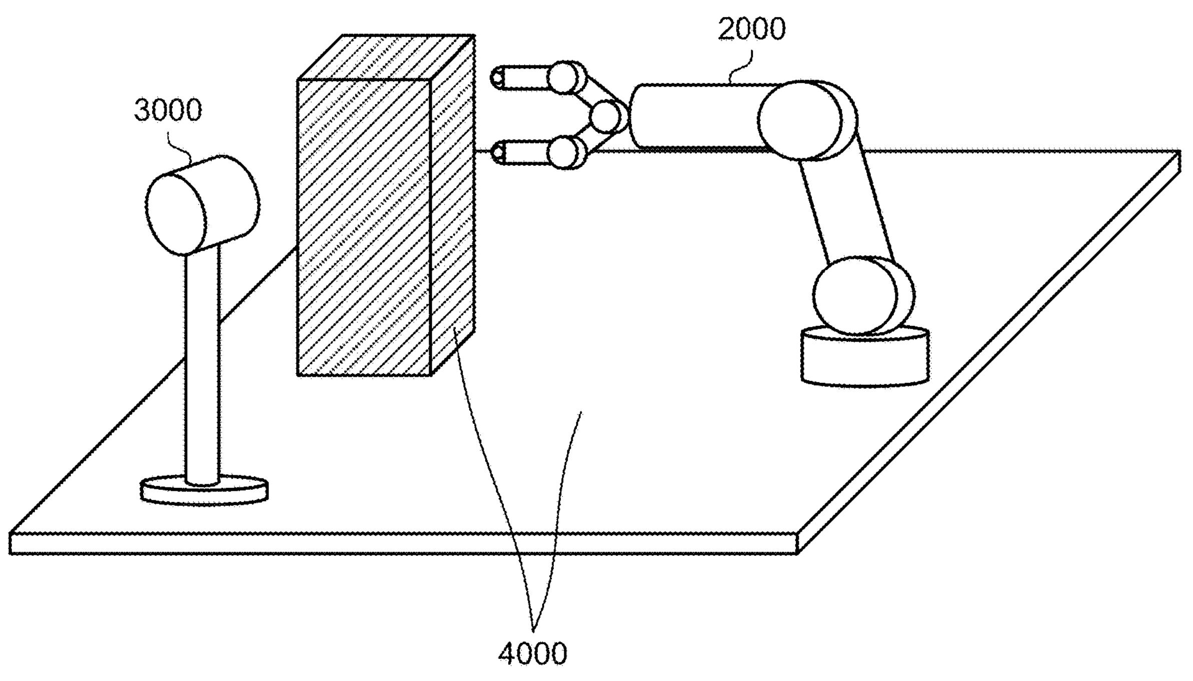
FIG. 3 is a perspective view illustrating an edge device, an imaging device, and a target in the first embodiment.

FIG. 2 is a diagram illustrating the operator 1000, the visual presentation device 1100, and the motion operation transmission device 1200 in the first embodiment. FIG. 3 is a perspective view illustrating the edge device 2000, the imaging device 3000, and the target 4000 in the first embodiment.

Figure 4:
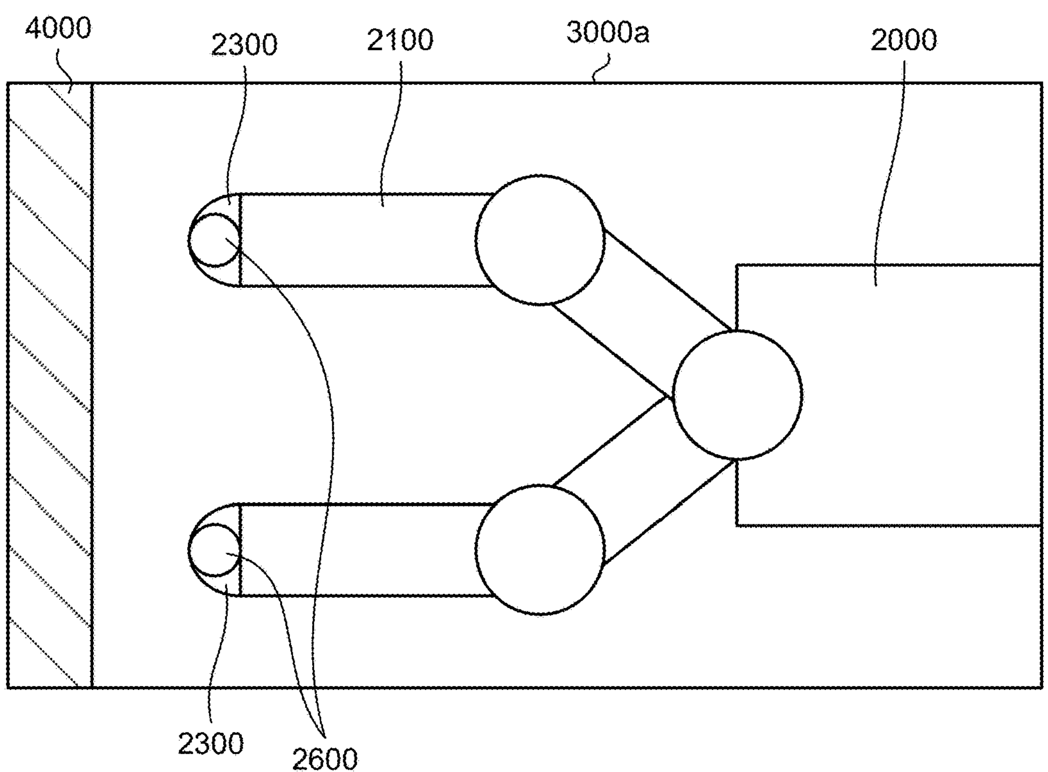
FIG. 4 is a diagram illustrating imaging information provided to the visual presentation device when an end effector included in the edge device of the remote operation system according to the first embodiment is not in contact with the target.

FIG. 4 is a diagram illustrating the imaging information 3000*a* provided to the visual presentation device 1100 when the end effector 2100 included in the edge device 2000 of the remote operation system 1 according to the first embodiment is not in contact with the target 4000. The light intensity-controlled light emitters 2600 are not lit.

Figure 5:
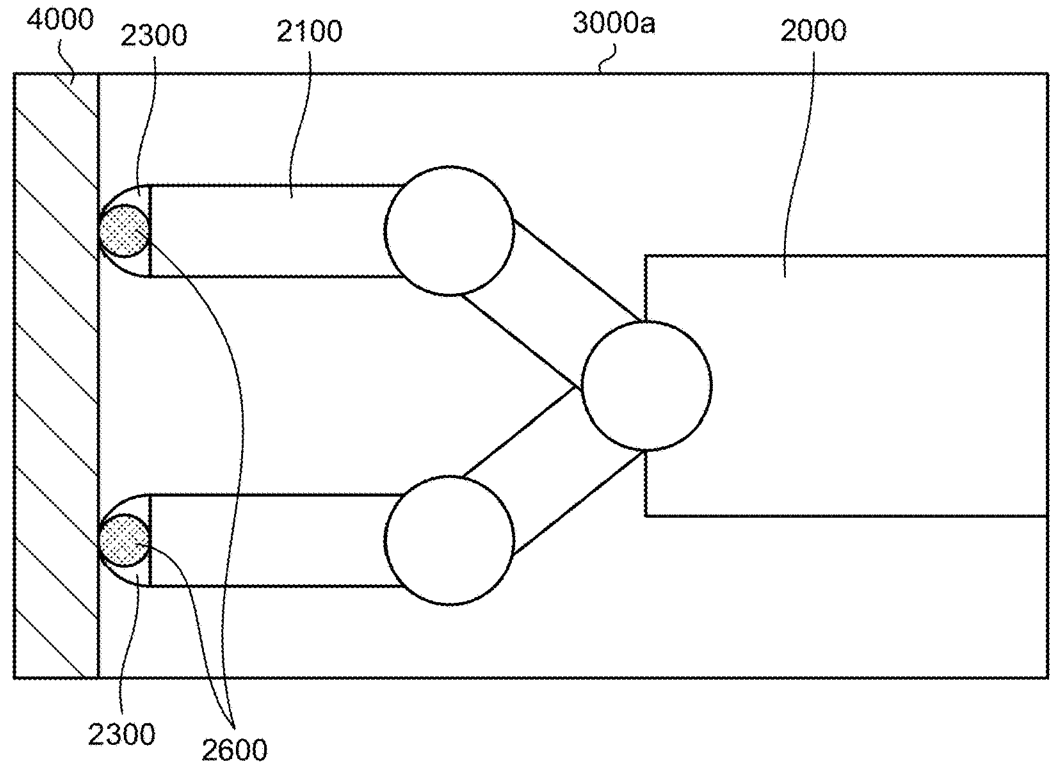
FIG. 5 is a diagram illustrating imaging information provided to the visual presentation device when the end effector included in the edge device of the remote operation system according to the first embodiment is in contact with the target.

FIG. 5 is a diagram illustrating the imaging information 3000*a* provided to the visual presentation device 1100 when the end effector 2100 included in the edge device 2000 of the remote operation system 1 according to the first embodiment is in contact with the target 4000. The light intensity-controlled light emitters 2600 are lit, according to the states of contact detected by the haptic sensing devices 2300. The remote operation system 1 may further include temperature sensors disposed in parallel with the haptic sensing devices 2300. The remote operation system 1 may include temperature sensors instead of the haptic sensing devices 2300.

When the haptic sensing devices 2300 attached to the end effector 2100 come into contact with the target 4000 and detect haptic sensations, currents proportional to the magnitudes of the haptic sensations detected by the haptic sensing devices 2300 are supplied to the light intensity-controlled light emitters 2600 attached to the end effector 2100. When the currents are supplied, the light intensity-controlled light emitters 2600 light up.

The imaging device 3000 images the end effector 2100 and the target 4000, and provides the imaging information 3000*a* indicating the result of imaging to the visual presentation device 1100. The visual presentation device 1100 displays the image information 1100*a* corresponding to the imaging information 3000*a*. The operator 1000 recognizes the contact between the end effector 2100 and the target 4000, based on the image information 1100*a* displayed by the visual presentation device 1100, operating the motion operation transmission device 1200.

The first embodiment does not require a drive unit in an operation interface for the operator 1000, and thus can avoid increases in the size and complexity of an operating device. The operator 1000, to which the haptic information 2300*a* is presented in an image, recognizes the haptic sensations produced on the edge device 2000 in the brain so that the haptic sensations do not contradict the presented image, and thus can perform operation without feeling discomfort. The operator 1000 can obtain the haptic information 2300*a* by closely watching a contact point area on the visual presentation device 1100, and thus can operate in a concentrated manner.

The remote operation system 1 according to the first embodiment allows the operator 1000 to detect the interaction 4000*a* of the end effector 2100 with the target 4000 from visual information. Since the remote operation system 1 can visually transmit the haptic information 2300*a* to the operator 1000, no drive unit is required in the operation interface for the operator 1000. Thus, the remote operation system 1 can avoid increases in the size and complexity of the operating device. Since the operator 1000 can obtain the haptic information 2300*a* without feeling discomfort by concentrating on the visual presentation device 1100, relatively high operability can be obtained. When temperature sensors are disposed, the operator 1000 can obtain temperature information without feeling discomfort.

Second Embodiment

The configuration of a remote operation system according to a second embodiment is the same as the configuration of the remote operation system 1 according to the first embodiment. However, the function of the light intensity-controlled light emitters 2600 is different between the second embodiment and the first embodiment. In the second embodiment, the light intensity-controlled light emitters 2600 do not change the intensities of light when emitting light, but express the states of contact of the haptic sensing devices 2300 with the target 4000 by changes in hue and lighting frequency when emitting light.

The remote operation system according to the second embodiment, which includes the light intensity-controlled light emitters 2600 having the function different from the function of the first embodiment, thus can transmit one of or both temperature and haptic sensation to the operator 1000 as the states of contact of the haptic sensing devices 2300 with the target 4000.

Third Embodiment

Figure 6:
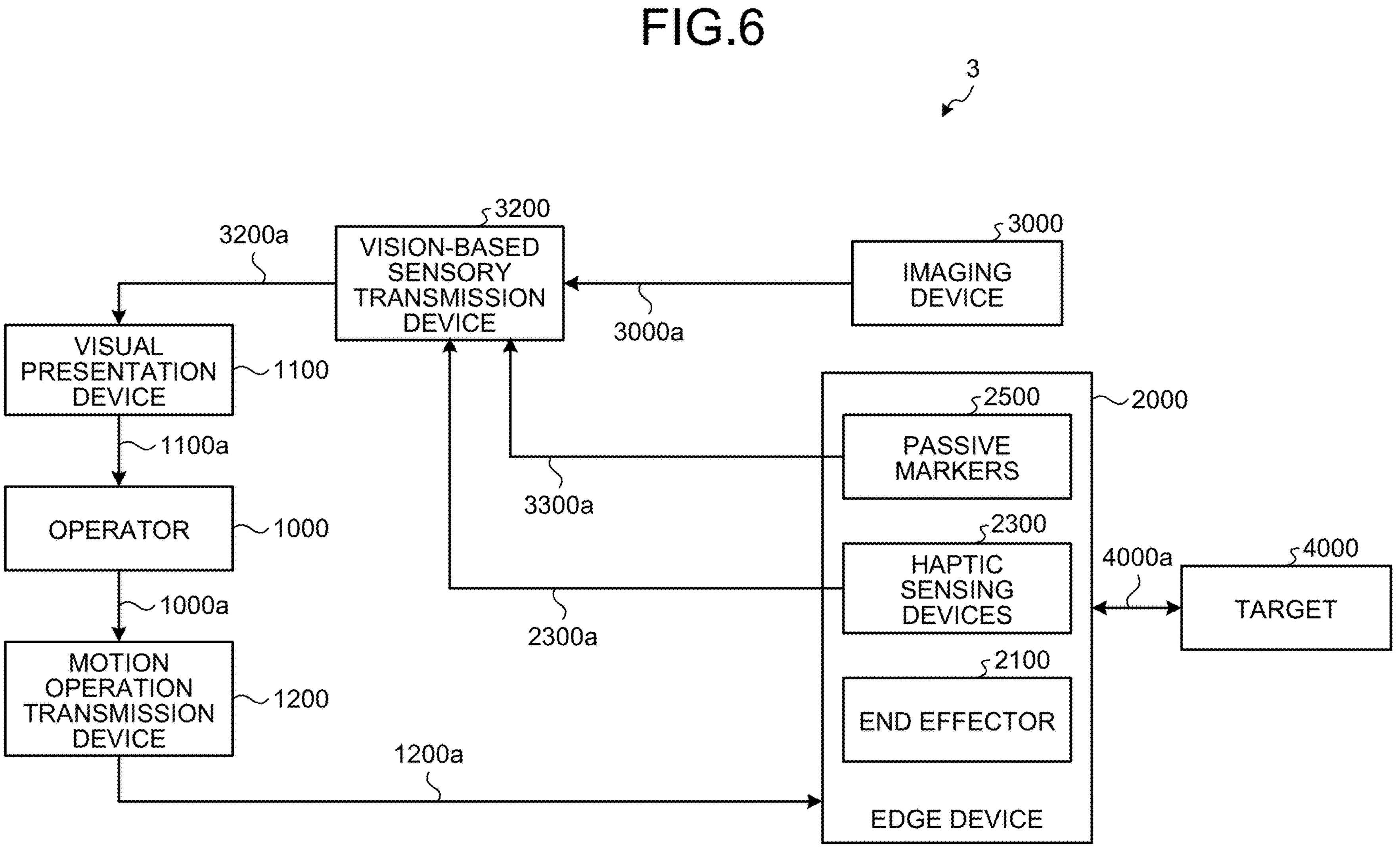
FIG. 6 is a diagram illustrating a configuration of a remote operation system according to a third embodiment.

FIG. 6 is a diagram illustrating a configuration of a remote operation system 3 according to a third embodiment. The remote operation system 3 includes the motion operation transmission device 1200 that receives, as input, the operator operation 1000*a* that is a motion operation by the operator 1000. FIG. 6 also illustrates the operator 1000. The motion operation transmission device 1200 outputs the motion transmission information 1200*a* corresponding to the operator operation 1000*a*.

The remote operation system 3 further includes the edge device 2000 that contacts the target 4000. The operator operation 1000*a* is an instruction for operating the edge device 2000. FIG. 6 also illustrates the target 4000. The motion operation transmission device 1200 receives the operator operation 1000*a* for operating the edge device 2000, and outputs the motion transmission information 1200*a* corresponding to the operator operation 1000*a* to the edge device 2000. The edge device 2000 is operated by the motion transmission information 1200*a* output from the motion operation transmission device 1200. The target 4000 has the interaction 4000*a* with the edge device 2000 when the edge device 2000 operates.

The remote operation system 3 further includes the imaging device 3000 that images the edge device 2000 and the target 4000. The imaging device 3000 outputs the imaging information 3000*a* indicating the result of imaging. The remote operation system 3 further includes a vision-based sensory transmission device 3200 that receives, as input, the imaging information 3000*a* output from the imaging device 3000, marker information 3300*a* output from the edge device 2000, and the haptic information 2300*a* output from the edge device 2000, and generates a vision-based sensory transmission image 3200*a*. The remote operation system 3 further includes the visual presentation device 1100 that receives, as input, the vision-based sensory transmission image 3200*a*, and provides the operator 1000 with the image information 1100*a* corresponding to the vision-based sensory transmission image 3200*a*. The marker information 3300*a* is, for example, information on any one of a color, a shape, and a feature point or a combination of two or more thereof that allows image extraction of passive markers 2500 from the imaging information 3000*a*. When the passive markers 2500 are red circles, the marker information 3300*a* is a combination of color information indicating red and shape information indicating a circle.

The edge device 2000 includes the end effector 2100 intended for interaction with the target 4000, and the haptic sensing devices 2300 attached to the end effector 2100 for detecting haptic sensations to the target 4000. The haptic sensing devices 2300 output the haptic information 2300*a* indicating the detected haptic sensations. The edge device 2000 further includes the passive markers 2500 including markers spatially identifiable in the imaging device 3000. The passive markers 2500 are augmented reality (AR) markers or members having a feature point that can be extracted from the imaging information 3000*a* captured by the imaging device 3000. The passive markers 2500 output the marker information 3300*a*.

Figure 7:
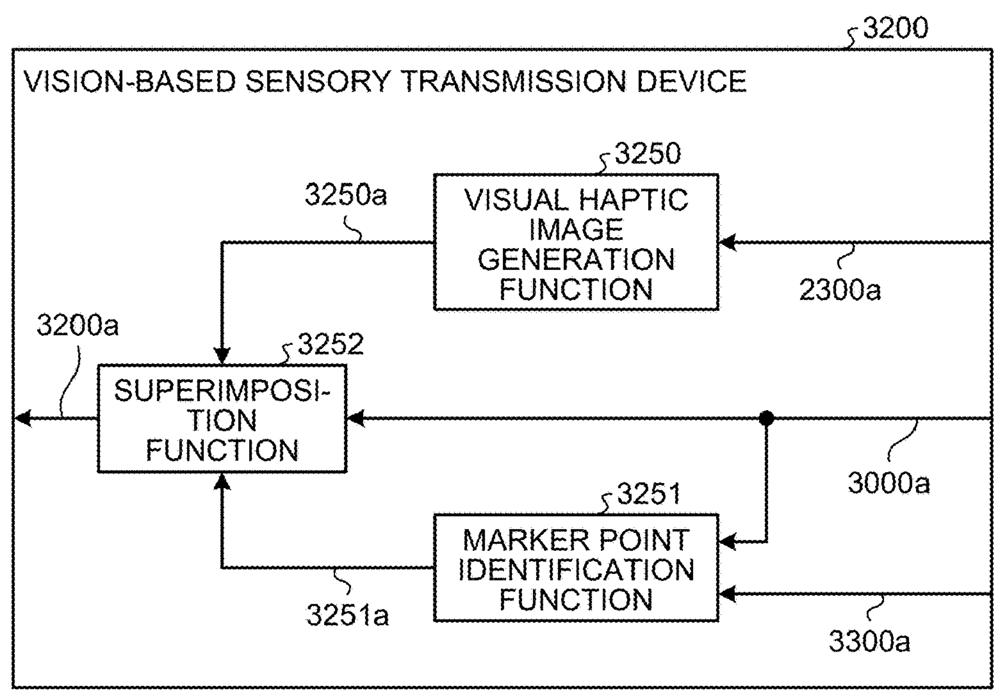
FIG. 7 is a diagram illustrating functions of a vision-based sensory transmission device included in the remote operation system according to the third embodiment.

FIG. 7 is a diagram illustrating functions of the vision-based sensory transmission device 3200 included in the remote operation system 3 according to the third embodiment. The vision-based sensory transmission device 3200 includes a marker point identification function 3251 that uses the marker information 3300*a* to identify the positions of the passive markers 2500, based on the imaging information 3000*a*, and generates marker point identification information 3251*a*. The vision-based sensory transmission device 3200 further includes a visual haptic image generation function 3250 that generates visual haptic image information 3250*a* based on the haptic information 2300*a*. The visual haptic image generation function 3250 is a function of generating the visual haptic image information 3250*a* indicating images corresponding to the haptic information 2300*a* indicating the haptic sensations detected by the haptic sensing devices 2300.

The vision-based sensory transmission device 3200 further includes a superimposition function 3252 that generates a vision-based sensory transmission image 3200*a* based on the visual haptic image information 3250*a* and the marker point identification information 3251*a*. The superimposition function 3252 is a function of superimposing the marker point identification information 3251*a* obtained by the marker point identification function 3251, the visual haptic image information 3250*a* obtained by the visual haptic image generation function 3250, and the imaging information 3000*a* obtained by the imaging device 3000.

Figure 8:
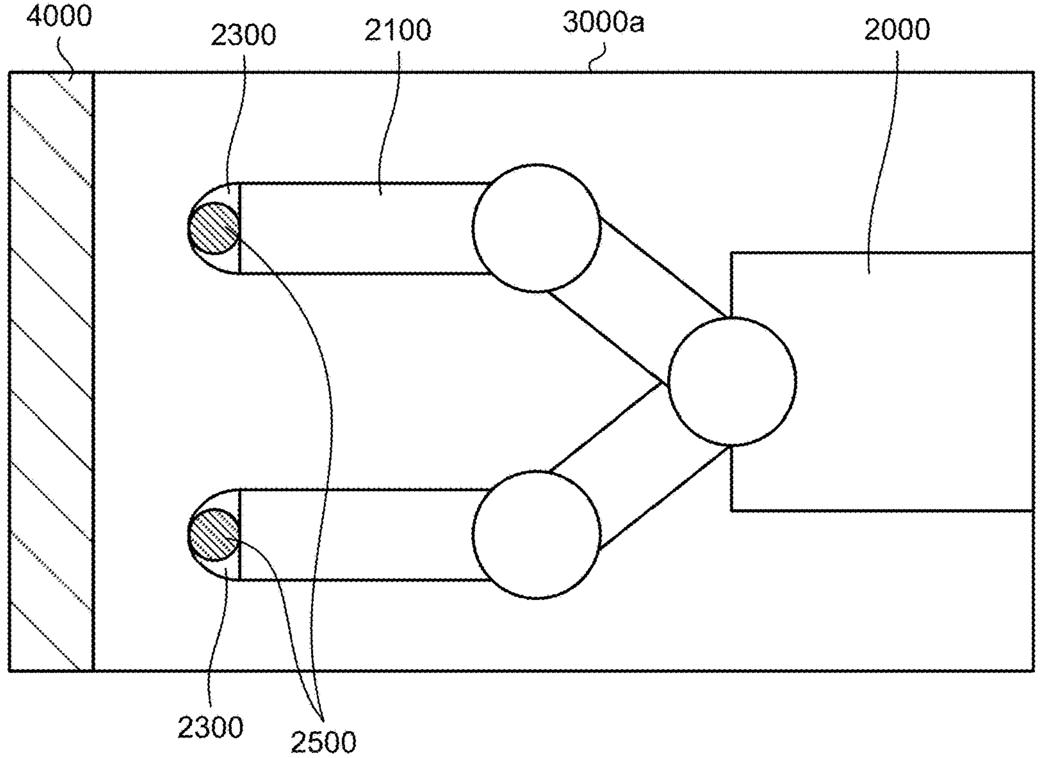
FIG. 8 is a diagram illustrating imaging information that is the output of an imaging device when an end effector included in an edge device of the remote operation system according to the third embodiment is not in contact with a target.

FIG. 8 is a diagram illustrating the imaging information 3000*a* that is the output of the imaging device 3000 when the end effector 2100 included in the edge device 2000 of the remote operation system 3 according to the third embodiment is not in contact with the target 4000. The passive markers 2500 have been detected as the marker point identification information 3251*a*.

Figure 9:
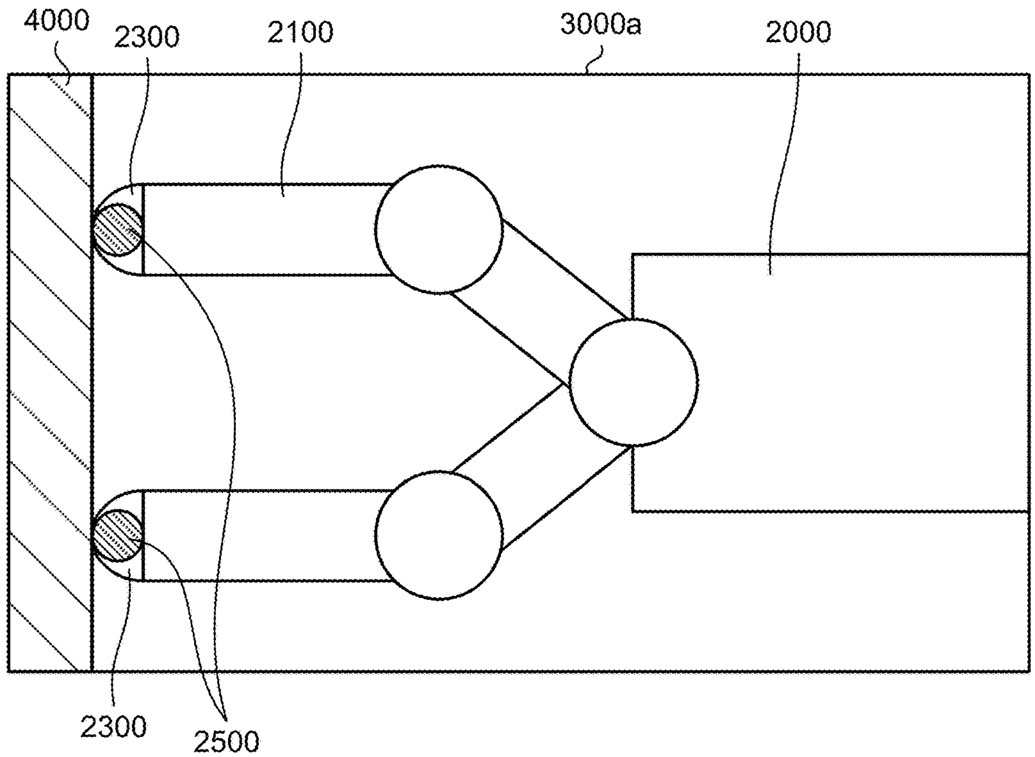
FIG. 9 is a diagram illustrating imaging information that is the output of the imaging device when the end effector included in the edge device of the remote operation system according to the third embodiment is in contact with the target.

FIG. 9 is a diagram illustrating the imaging information 3000*a* that is the output of the imaging device 3000 when the end effector 2100 included in the edge device 2000 of the remote operation system 3 according to the third embodiment is in contact with the target 4000. The passive markers 2500 have been detected as the marker point identification information 3251*a*, and the haptic sensing devices 2300 have detected haptic sensations.

Figure 10:
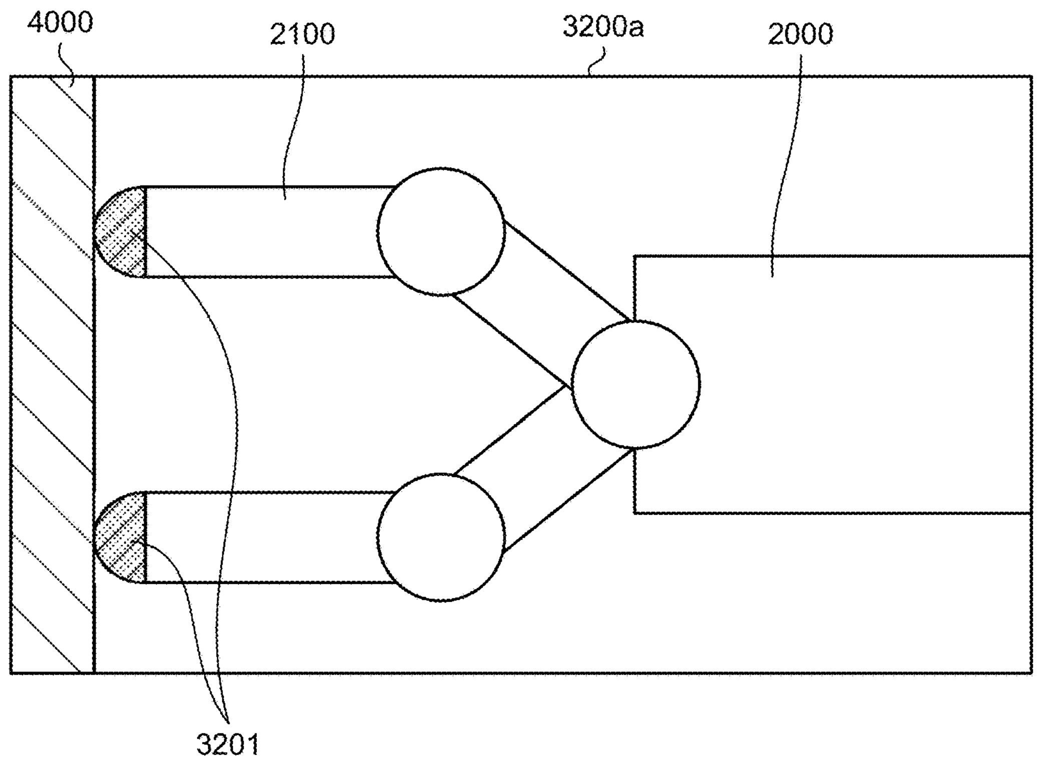
FIG. 10 is a diagram illustrating a vision-based sensory transmission image that is the output of the vision-based sensory transmission device when the end effector included in the edge device of the remote operation system according to the third embodiment is in contact with the target.

FIG. 10 is a diagram illustrating the vision-based sensory transmission image 3200*a* that is the output of the vision-based sensory transmission device 3200 when the end effector 2100 included in the edge device 2000 of the remote operation system 3 according to the third embodiment is in contact with the target 4000. Superimposed images 3201 in which the haptic information 2300*a* is expressed by the images are displayed at the positions where the passive markers 2500 have been detected as the marker point identification information 3251*a* in FIG. 9. The remote operation system 3 may further include temperature sensors arranged in parallel with the haptic sensing devices 2300. The remote operation system 3 may include temperature sensors instead of the haptic sensing devices 2300.

The passive markers 2500 may not be attached. In that case, the remote operation system 3 may recognize the shapes of the fingertips of the end effector 2100 and display the superimposed images 3201 at the fingertips.

The remote operation system 3 according to the third embodiment allows the operator 1000 to detect the interaction 4000*a* of the end effector 2100 with the target 4000 from visual information. The remote operation system 3 can avoid increases in the size and complexity of the operating device. Since the operator 1000 can obtain the haptic information 2300*a* without feeling discomfort by concentrating on the visual presentation device 1100, relatively high operability can be obtained. When temperature sensors are disposed, the operator 1000 can obtain temperature information without feeling discomfort. The remote operation system 3 can superimpose visual haptic images intended by the designer on contact points, and thus can provide images to suit the operator 1000 or the situation.

Fourth Embodiment

The configuration of a remote operation system according to a fourth embodiment is the same as the configuration of the remote operation system 3 according to the third embodiment. However, the superimposed images 3201 are different between the fourth embodiment and the third embodiment. In the third embodiment, the superimposed images 3201 indicate the intensities of lighting images. In the fourth embodiment, the superimposed images 3201 do not indicate the intensities of lighting images, but express the states of contact of the haptic sensing devices 2300 with the target 4000 by changes in hue and lighting frequency.

The remote operation system according to the fourth embodiment can transmit one of or both temperature and haptic sensation to the operator 1000 as the states of contact with the target 4000.

Fifth Embodiment

The configuration of a remote operation system according to a fifth embodiment is the same as the configuration of the remote operation system 3 according to the third embodiment. However, functions of the vision-based sensory transmission device 3200 of the fifth embodiment are different from the functions of the vision-based sensory transmission device 3200 of the third embodiment. In the fifth embodiment, differences from the third embodiment will be mainly described.

Figure 11:
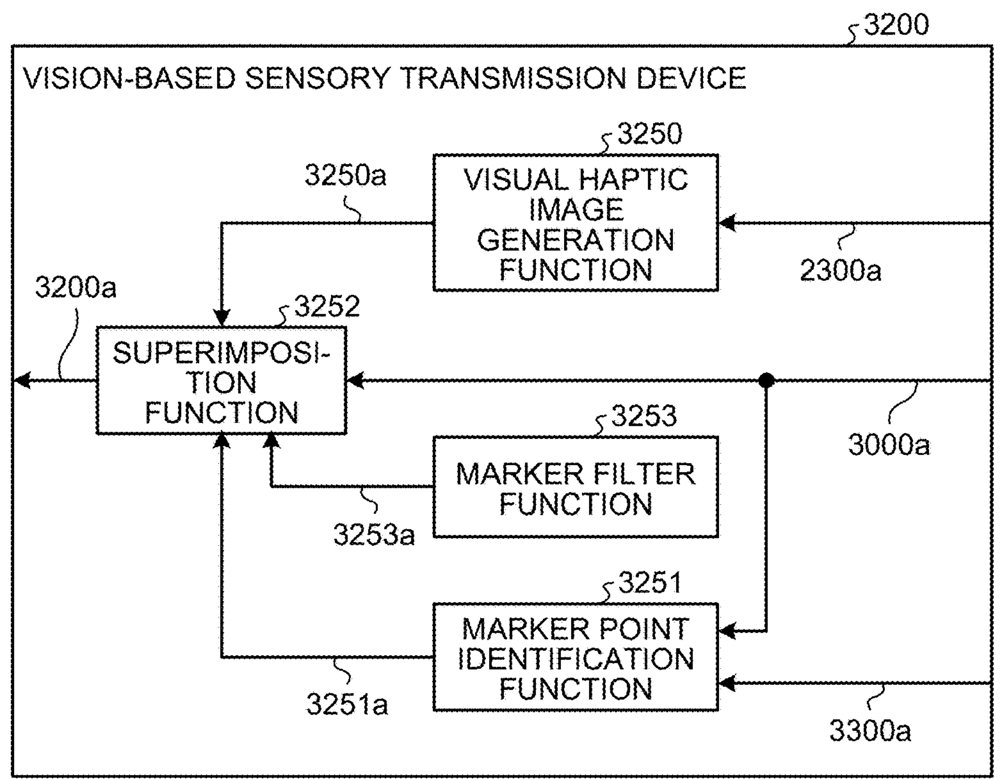
FIG. 11 is a diagram illustrating functions of a vision-based sensory transmission device included in a remote operation system according to a fifth embodiment.

FIG. 11 is a diagram illustrating the functions of the vision-based sensory transmission device 3200 included in the remote operation system according to the fifth embodiment. The vision-based sensory transmission device 3200 includes the marker point identification function 3251 that uses the marker information 3300*a* to identify the positions of the passive markers 2500, based on the imaging information 3000*a*, and generates the marker point identification information 3251*a*. The vision-based sensory transmission device 3200 further includes the visual haptic image generation function 3250 that generates the visual haptic image information 3250*a* based on the haptic information 2300*a*.

The vision-based sensory transmission device 3200 further includes a marker filter function 3253 that generates marker filter information 3253*a* for filtering the passive markers 2500 detected. The vision-based sensory transmission device 3200 further includes the superimposition function 3252 that generates the vision-based sensory transmission image 3200*a*, based on the visual haptic image information 3250*a*, the marker point identification information 3251*a*, and the marker filter information 3253*a*.

When haptic sensing sensors or markers are attached to the fingertips of the end effector 2100, a load of visual recognition at the fingertips increases. The remote operation system according to the fifth embodiment performs filtering to reduce a visual load. The remote operation system according to the fifth embodiment does not display the passive markers 2500 depending on conditions.

Figure 12:
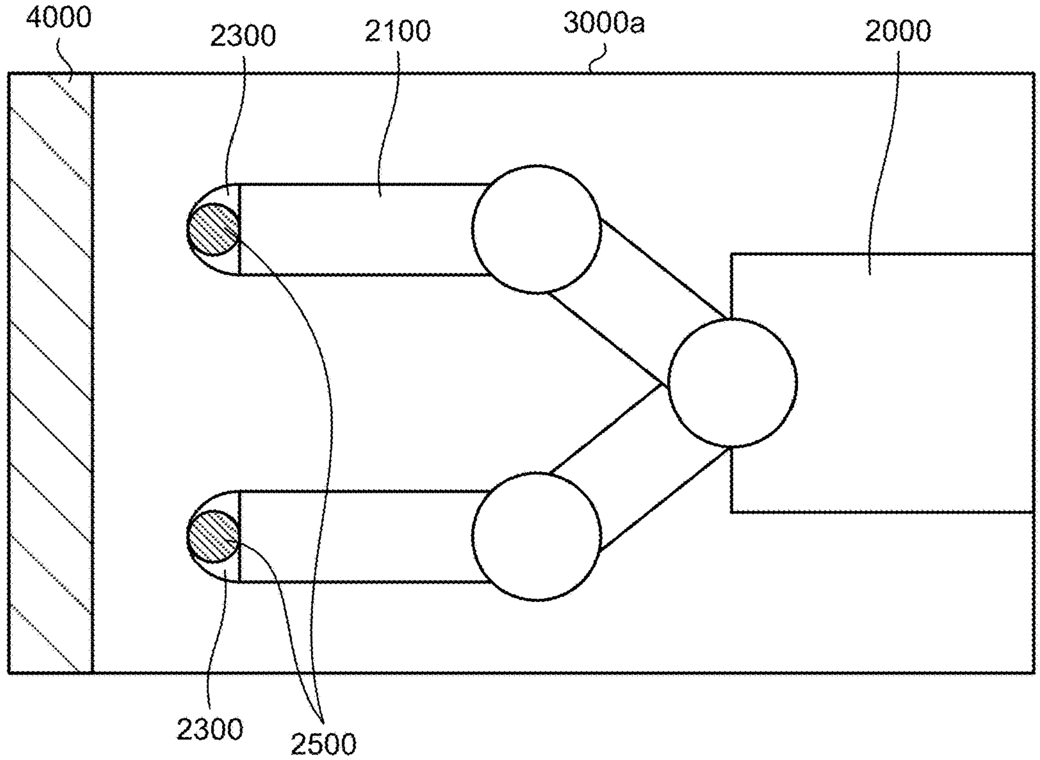
FIG. 12 is a diagram illustrating imaging information that is the output of an imaging device when an end effector included in an edge device of the remote operation system according to the fifth embodiment is not in contact with a target.

FIG. 12 is a diagram illustrating the imaging information 3000*a* that is the output of the imaging device 3000 when the end effector 2100 included in the edge device 2000 of the remote operation system according to the fifth embodiment is not in contact with the target 4000. The passive markers 2500 have been detected as the marker point identification information 3251*a*.

Figure 13:
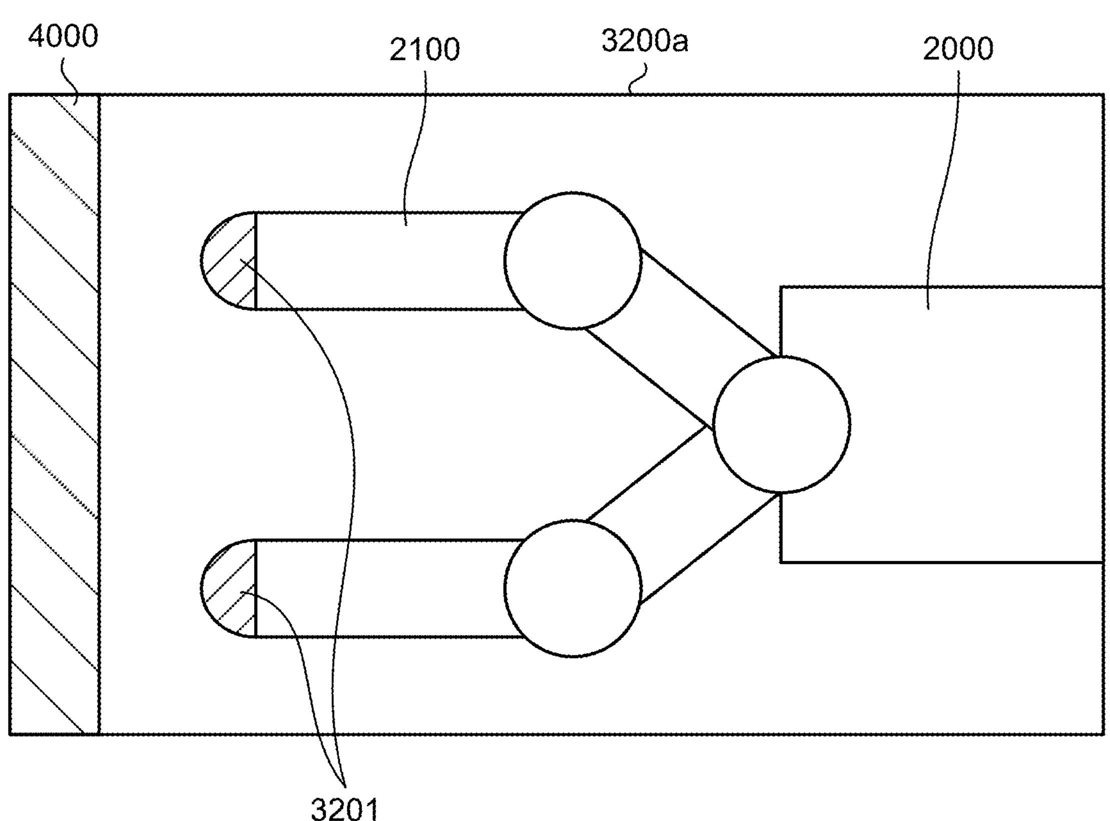
FIG. 13 is a diagram illustrating a vision-based sensory transmission image that is the output of the vision-based sensory transmission device when the end effector included in the edge device of the remote operation system according to the fifth embodiment is not in contact with the target.

FIG. 13 is a diagram illustrating the vision-based sensory transmission image 3200*a* that is the output of the vision-based sensory transmission device 3200 when the end effector 2100 included in the edge device 2000 of the remote operation system according to the fifth embodiment is not in contact with the target 4000. In the vision-based sensory transmission image 3200*a*, the superimposed images 3201 in which the marker filter information 3253*a* as filtering information is expressed by the images are displayed at the positions where the passive markers 2500 have been detected as the marker point identification information 3251*a*.

The remote operation system according to the fifth embodiment allows the operator 1000 to detect the interaction 4000*a* of the end effector 2100 with the target 4000 from visual information. The remote operation system according to the fifth embodiment can avoid increases in the size and complexity of the operating device. Since the operator 1000 can obtain the haptic information 2300*a* without feeling discomfort by concentrating on the visual presentation device 1100, relatively high operability can be obtained.

The fifth embodiment allows the images of the passive markers 2500 to be replaced with images preset by the designer in a situation where contact involving haptic sensation has not occurred between the edge device 2000 and the target 4000. That is, the remote operation system according to the fifth embodiment can reduce the load of recognition on the operator 1000.

Sixth Embodiment

The configuration of a remote operation system according to a sixth embodiment is the same as the configuration of the remote operation system 3 according to the third embodiment. However, functions of the vision-based sensory transmission device 3200 of the sixth embodiment are different from the functions of the vision-based sensory transmission device 3200 of the third embodiment. In the sixth embodiment, differences from the third embodiment will be mainly described.

Figure 14:
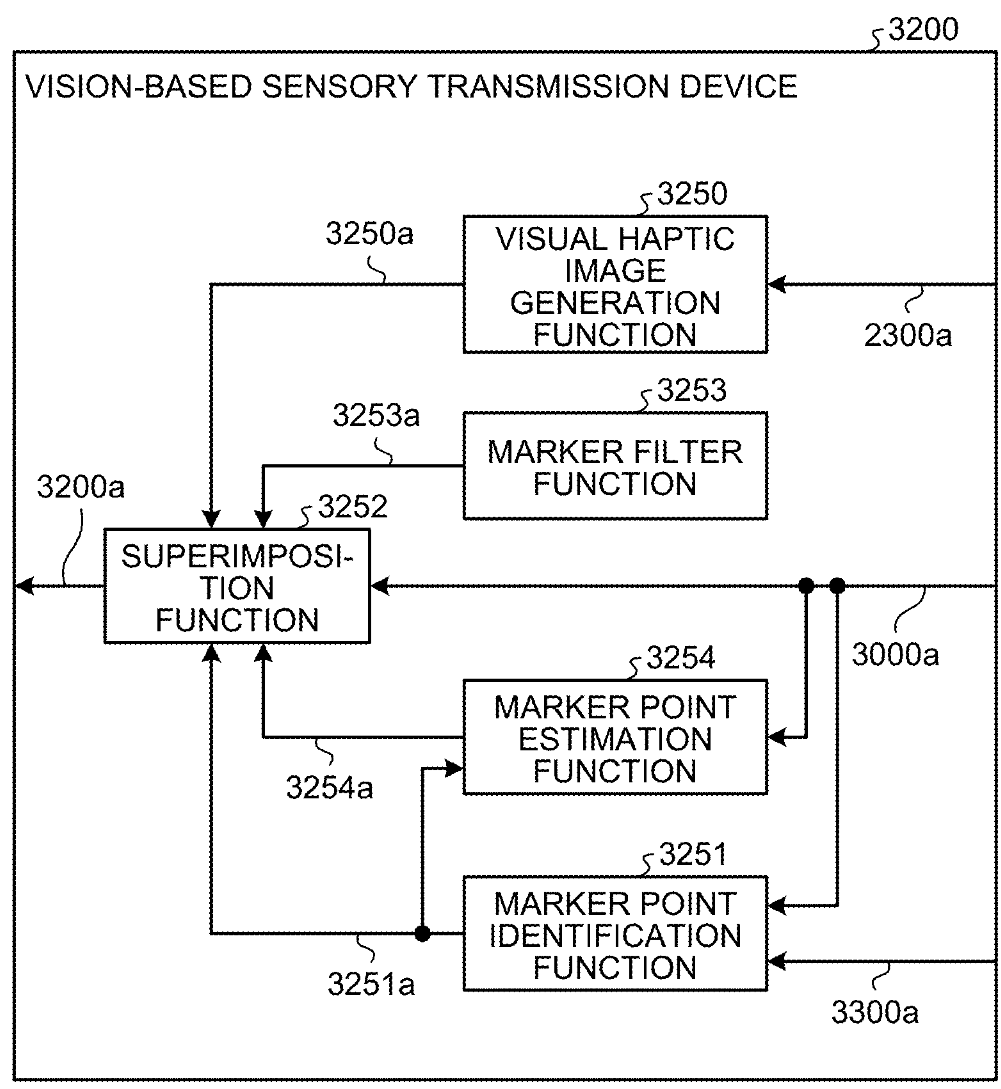
FIG. 14 is a diagram illustrating functions of a vision-based sensory transmission device included in a remote operation system according to a sixth embodiment.

FIG. 14 is a diagram illustrating the functions of the vision-based sensory transmission device 3200 included in the remote operation system according to the sixth embodiment. The vision-based sensory transmission device 3200 includes the marker point identification function 3251 that uses the marker information 3300*a* to identify the positions of the passive markers 2500, based on the imaging information 3000*a*, and generates the marker point identification information 3251*a*. The vision-based sensory transmission device 3200 further includes the visual haptic image generation function 3250 that generates the visual haptic image information 3250*a* based on the haptic information 2300*a*.

The vision-based sensory transmission device 3200 further includes the marker filter function 3253 that generates the marker filter information 3253*a* for filtering the passive markers 2500 detected.

The vision-based sensory transmission device 3200 further includes a marker point estimation function 3254 that generates marker point estimation information 3254*a* based on the imaging information 3000*a* and the marker point identification information 3251*a*. The marker point estimation function 3254 is a function of estimating a marker point that has disappeared, based on the imaging information 3000*a* and the marker point identification information 3251*a* in a situation where the edge device 2000 includes two or more passive markers 2500, one of the passive markers 2500 has been hidden by the target 4000 and disappeared from the imaging information 3000*a*, and another passive marker 2500 is present in the imaging information 3000*a*.

The vision-based sensory transmission device 3200 further includes the superimposition function 3252 that generates the vision-based sensory transmission image 3200*a*, based on the visual haptic image information 3250*a*, the marker point identification information 3251*a*, the marker filter information 3253*a*, and the marker point estimation information 3254*a*.

Figure 15:
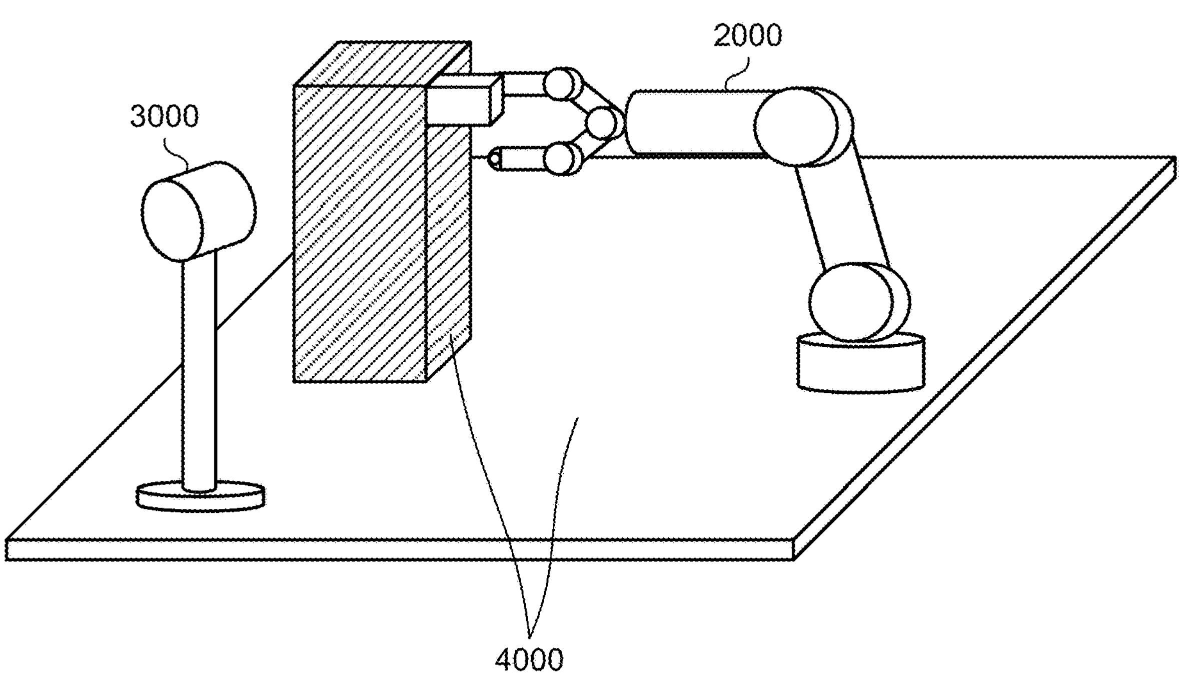
FIG. 15 is a perspective view illustrating an edge device and an imaging device of the remote operation system according to the sixth embodiment, and a target that is a work environment of the edge device.

FIG. 15 is a perspective view illustrating the edge device 2000 and the imaging device 3000 of the remote operation system according to the sixth embodiment, and the target 4000 that is a work environment of the edge device 2000.

Figure 16:
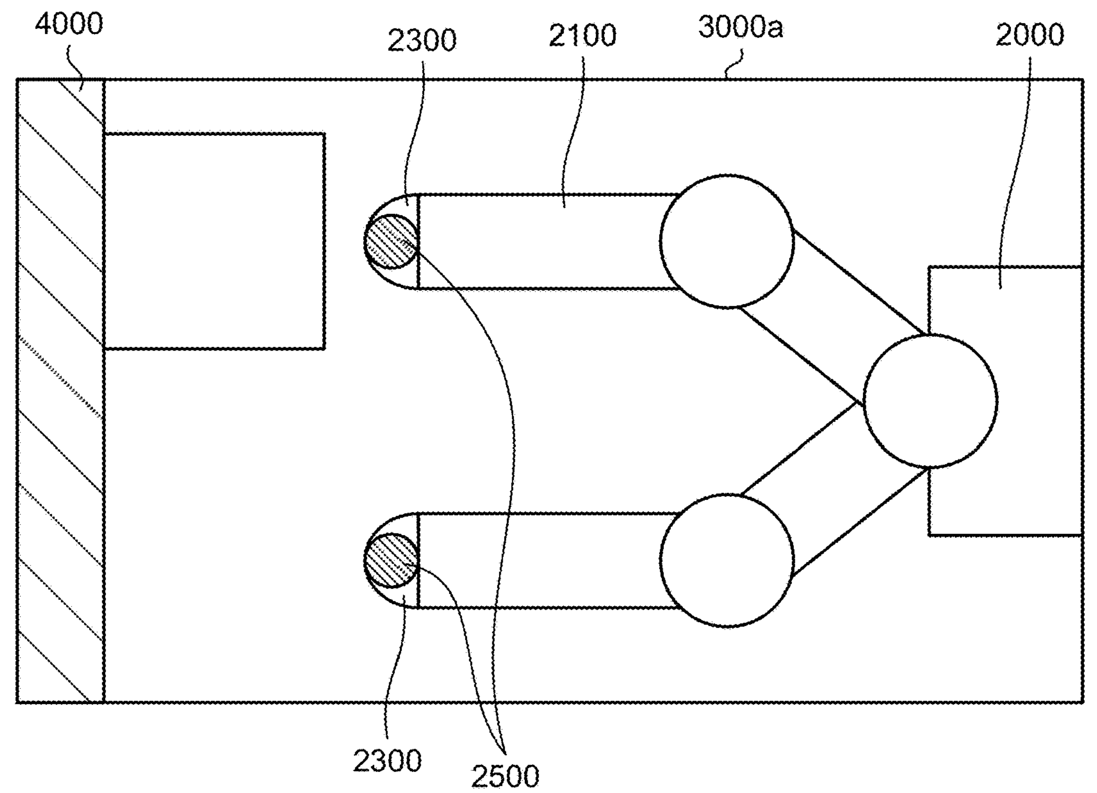
FIG. 16 is a diagram illustrating imaging information that is the output of the imaging device when an end effector included in the edge device of the remote operation system according to the sixth embodiment is not in contact with the target, and the end effector is not hidden by the target.

FIG. 16 is a diagram illustrating the imaging information 3000*a* that is the output of the imaging device 3000 when the end effector 2100 included in the edge device 2000 of the remote operation system according to the sixth embodiment is not in contact with the target 4000, and the end effector 2100 is not hidden by the target 4000. The passive markers 2500 have been detected as the marker point identification information 3251*a*.

Figure 17:
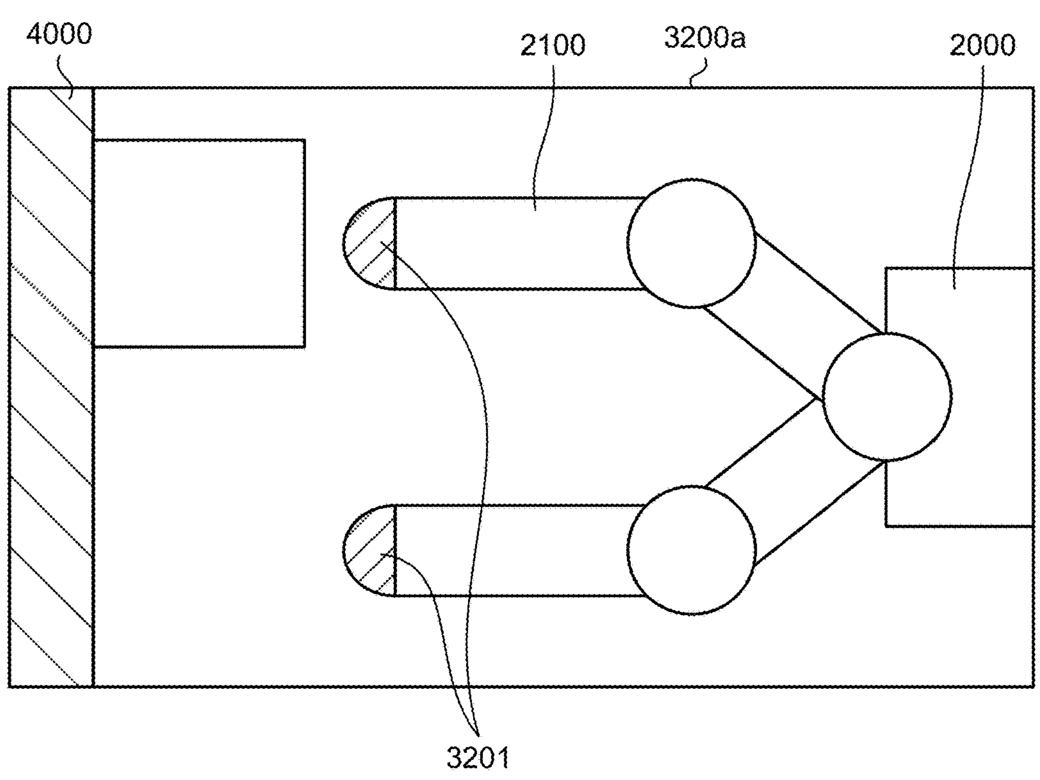
FIG. 17 is a diagram illustrating a vision-based sensory transmission image that is the output of the vision-based sensory transmission device when the end effector included in the edge device of the remote operation system according to the sixth embodiment is not in contact with the target, and the end effector is not hidden by the target.

FIG. 17 is a diagram illustrating the vision-based sensory transmission image 3200*a* that is the output of the vision-based sensory transmission device 3200 when the end effector 2100 included in the edge device 2000 of the remote operation system according to the sixth embodiment is not in contact with the target 4000, and the end effector 2100 is not hidden by the target 4000. In the vision-based sensory transmission image 3200*a*, the superimposed images 3201 in which the marker filter information 3253*a* as filtering information is expressed by the images are displayed at the positions where the passive markers 2500 have been detected as the marker point identification information 3251*a* in FIG. 16.

Figure 18:
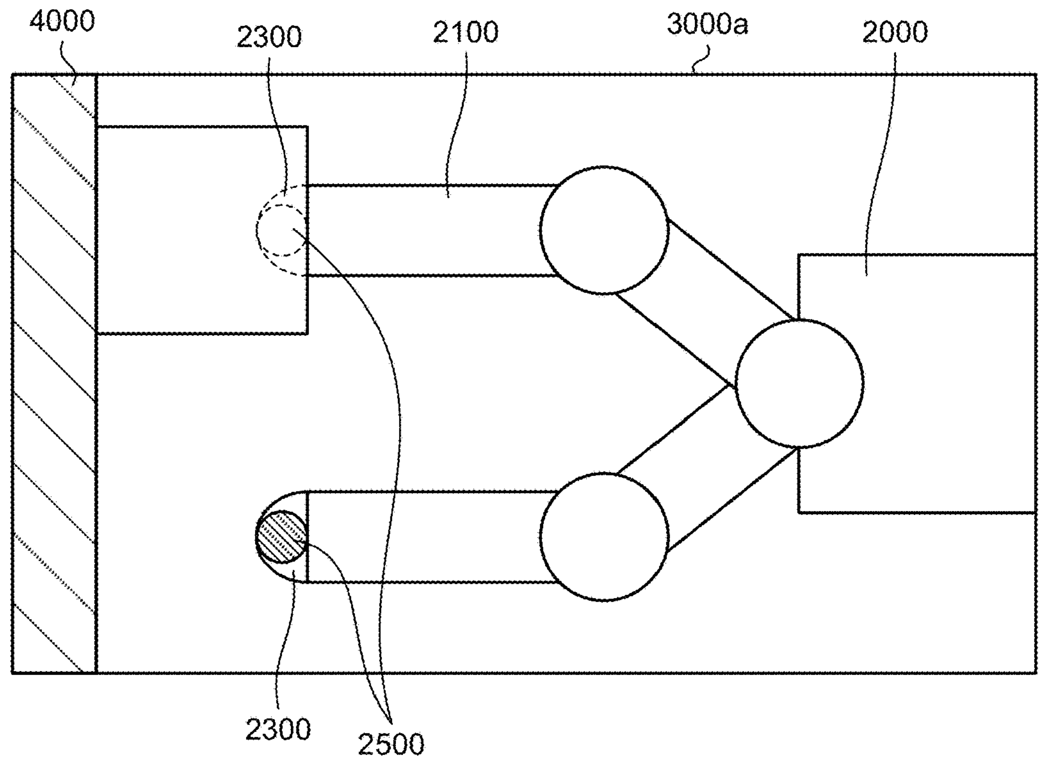
FIG. 18 is a diagram illustrating imaging information that is the output of the imaging device when the end effector included in the edge device of the remote operation system according to the sixth embodiment is not in contact with the target, and the end effector is hidden by the target.

FIG. 18 is a diagram illustrating the imaging information 3000*a* that is the output of the imaging device 3000 when the end effector 2100 included in the edge device 2000 of the remote operation system according to the sixth embodiment is not in contact with the target 4000, and the end effector 2100 is hidden by the target 4000. The passive markers 2500 have been detected as the marker point identification information 3251*a* and the marker point estimation information 3254*a*.

Figure 19:
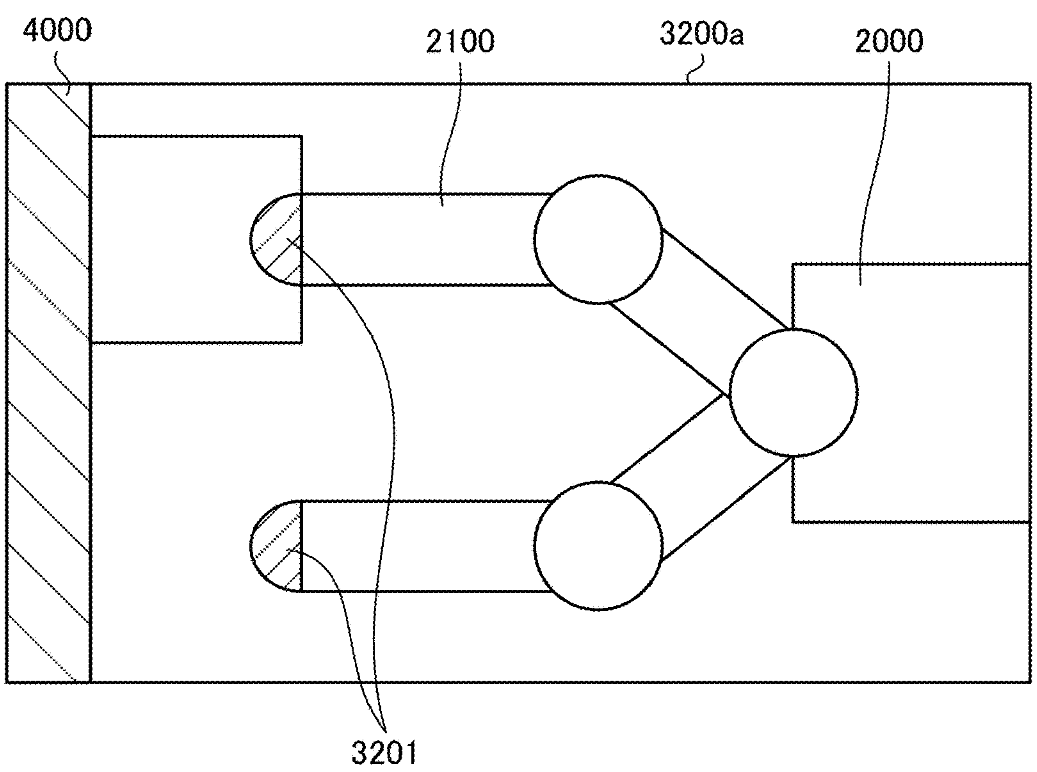
FIG. 19 is a diagram illustrating a vision-based sensory transmission image that is the output of the vision-based sensory transmission device when the end effector included in the edge device of the remote operation system according to the sixth embodiment is not in contact with the target, and the end effector is hidden by the target.

FIG. 19 is a diagram illustrating the vision-based sensory transmission image 3200*a* that is the output of the vision-based sensory transmission device 3200 when the end effector 2100 included in the edge device 2000 of the remote operation system according to the sixth embodiment is not in contact with the target 4000, and the end effector 2100 is hidden by the target 4000. In the vision-based sensory transmission image 3200*a*, the superimposed images 3201 in which the marker filter information 3253*a* as filtering information is expressed by the images are displayed at the positions where the passive markers 2500 have been detected as the marker point identification information 3251*a* and the marker point estimation information 3254*a* in FIG. 18.

Figure 20:
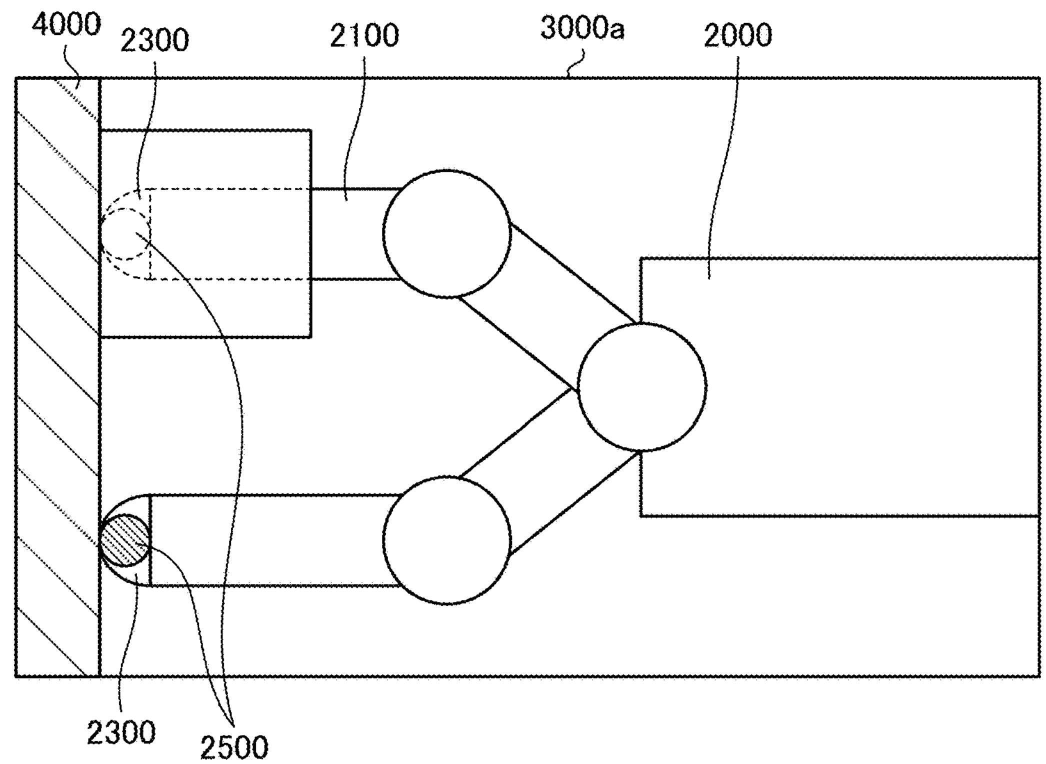
FIG. 20 is a diagram illustrating imaging information that is the output of the imaging device when the end effector included in the edge device of the remote operation system according to the sixth embodiment is in contact with the target, and the end effector is hidden by the target.

FIG. 20 is a diagram illustrating the imaging information 3000*a* that is the output of the imaging device 3000 when the end effector 2100 included in the edge device 2000 of the remote operation system according to the sixth embodiment is in contact with the target 4000, and the end effector 2100 is hidden by the target 4000. The passive markers 2500 have been detected as the marker point identification information 3251*a* and the marker point estimation information 3254*a*.

Figure 21:
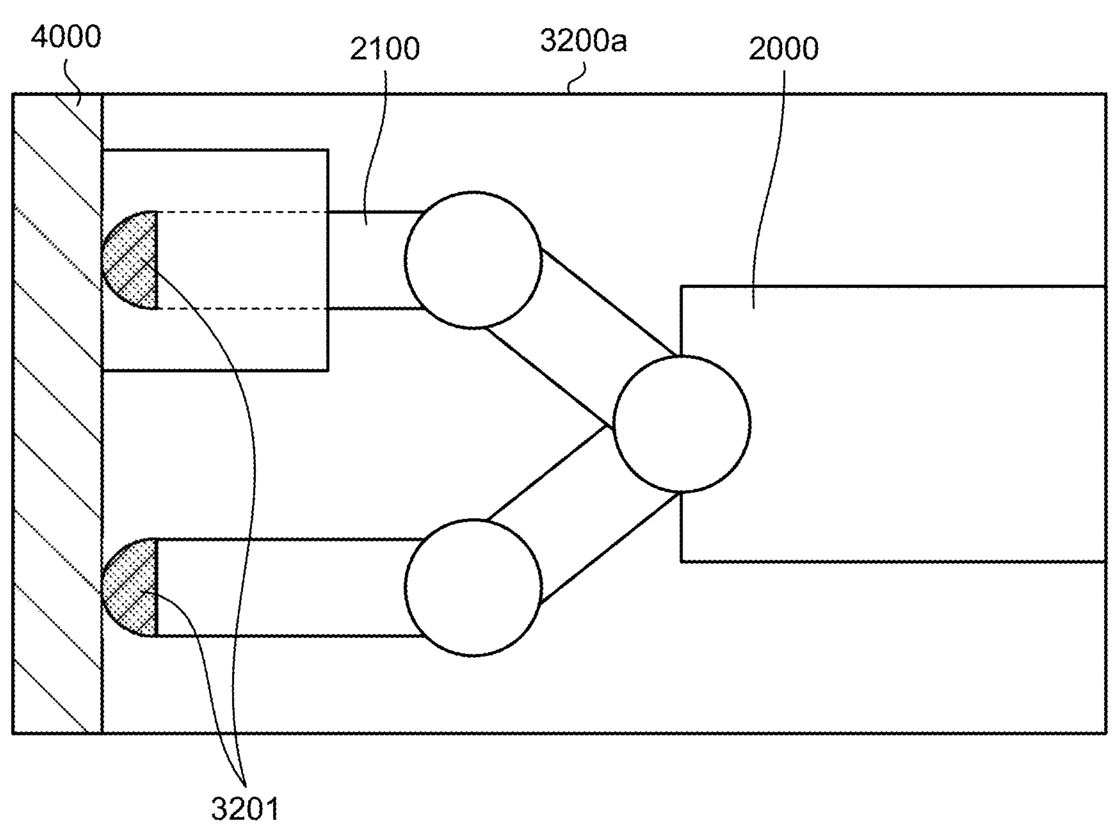
FIG. 21 is a diagram illustrating a vision-based sensory transmission image that is the output of the vision-based sensory transmission device when the end effector included in the edge device of the remote operation system according to the sixth embodiment is in contact with the target, and the end effector is hidden by the target.

FIG. 21 is a diagram illustrating the vision-based sensory transmission image 3200*a* that is the output of the vision-based sensory transmission device 3200 when the end effector 2100 included in the edge device 2000 of the remote operation system according to the sixth embodiment is in contact with the target 4000, and the end effector 2100 is hidden by the target 4000. In the vision-based sensory transmission image 3200*a*, the superimposed images 3201 in which the haptic information 2300*a* is expressed by the images are displayed at the positions where the passive markers 2500 have been detected as the marker point identification information 3251*a* and the marker point estimation information 3254*a* in FIG. 20.

When one of the passive markers 2500 has been hidden by the target 4000, by using the marker point estimation function 3254, the vision-based sensory transmission device 3200 stores the position of the hidden passive marker 2500 at the time when the passive marker 2500 has been hidden, and adds a vector traveled by the marker point identification information 3251*a* on another passive marker 2500 that is not hidden for a lapse of time since the time when the passive marker 2500 has been hidden, to the stored position of the hidden passive marker 2500, thereby deriving the marker point estimation information 3254*a*.

The remote operation system according to the sixth embodiment allows the operator 1000 to detect the interaction 4000*a* of the end effector 2100 with the target 4000 from visual information. The remote operation system according to the sixth embodiment can avoid increases in the size and complexity of the operating device. Since the operator 1000 can obtain the haptic information 2300*a* without feeling discomfort by concentrating on the visual presentation device 1100, relatively high operability can be obtained.

The remote operation system according to the sixth embodiment allows the images of the passive markers 2500 to be replaced with images preset by the designer in a situation where contact involving haptic sensation has not occurred between the edge device 2000 and the target 4000. That is, the remote operation system according to the sixth embodiment can reduce the load of recognition on the operator 1000. Even when one of the passive markers 2500 is hidden by a hiding object, the point of the hidden passive marker 2500 can be estimated, so that the remote operation system according to the sixth embodiment can improve operability for the operator 1000.

Seventh Embodiment

The configuration of a remote operation system according to a seventh embodiment is the same as the configuration of the remote operation system according to the sixth embodiment. However, functions of the vision-based sensory transmission device 3200 of the seventh embodiment are different from the functions of the vision-based sensory transmission device 3200 of the sixth embodiment. In the seventh embodiment, differences from the sixth embodiment will be mainly described.

Figure 22:
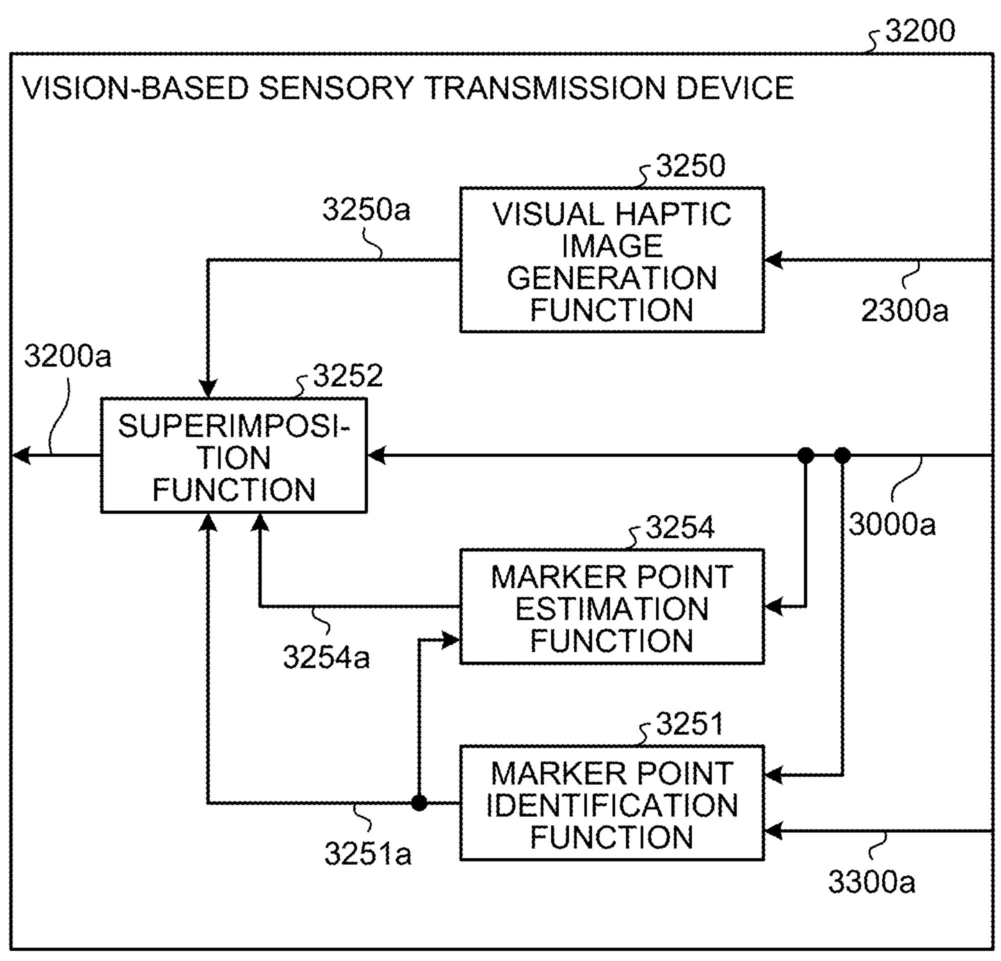
FIG. 22 is a diagram illustrating functions of a vision-based sensory transmission device included in a remote operation system according to a seventh embodiment.

FIG. 22 is a diagram illustrating the functions of the vision-based sensory transmission device 3200 included in the remote operation system according to the seventh embodiment. The vision-based sensory transmission device 3200 of the seventh embodiment includes the functions other than the marker filter function 3253 of all the functions included in the vision-based sensory transmission device 3200 of the sixth embodiment.

The remote operation system according to the seventh embodiment allows the images of the passive markers 2500 to be replaced with images preset by the designer in a situation where contact involving haptic sensation has not occurred between the edge device 2000 and the target 4000 that is the work environment of the edge device 2000. The seventh embodiment cannot provide the effect of reducing the load of recognition on the operator 1000, but can provide the effect of reducing a load of calculation to simplify the configuration of the remote operation system.

Eighth Embodiment

The configuration of a remote operation system according to an eighth embodiment is the same as the configuration of the remote operation system 3 according to the third embodiment. However, functions of the vision-based sensory transmission device 3200 of the eighth embodiment are different from the functions of the vision-based sensory transmission device 3200 of the third embodiment. In the eighth embodiment, differences from the third embodiment will be mainly described.

Figure 23:
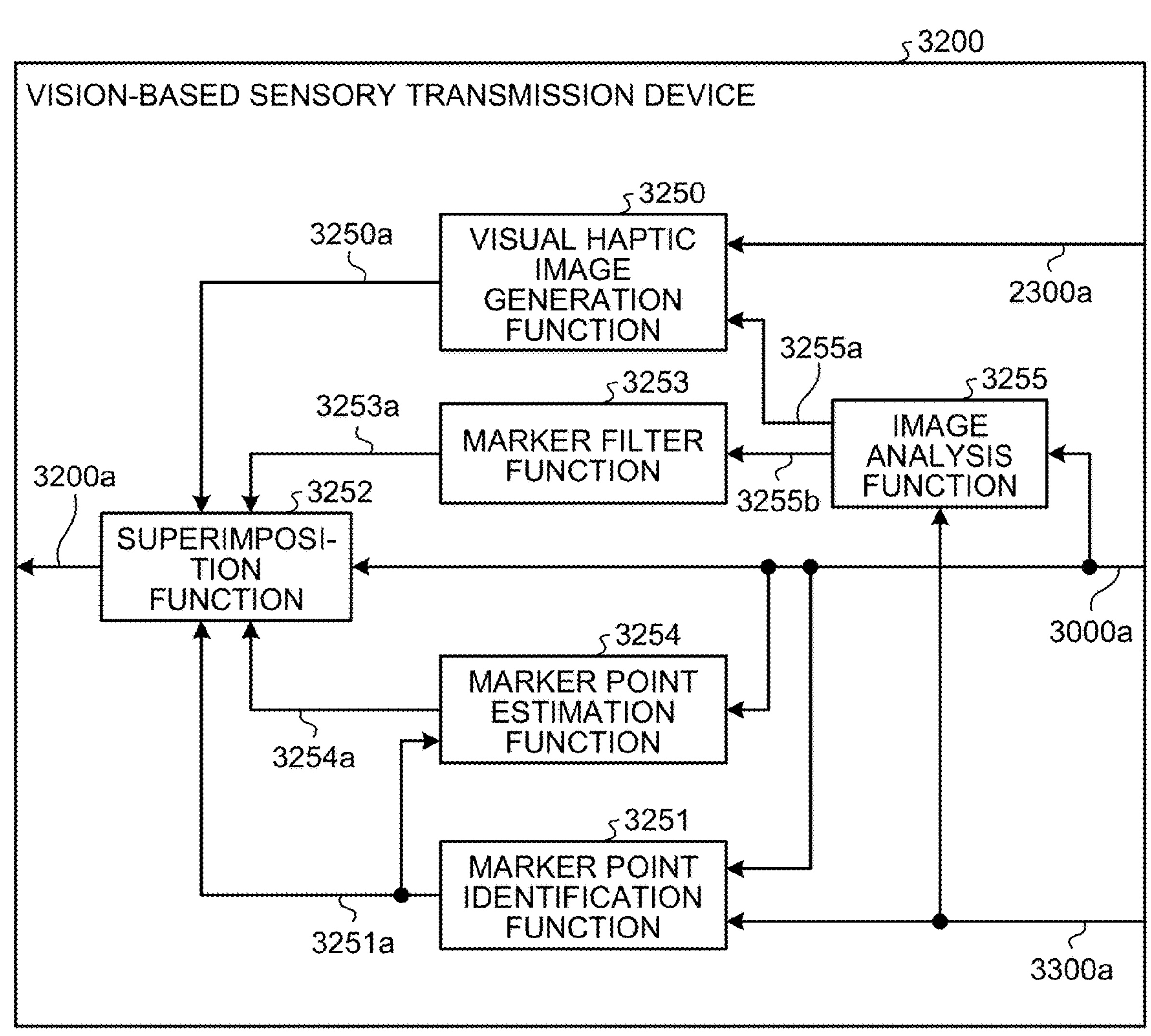
FIG. 23 is a diagram illustrating functions of a vision-based sensory transmission device included in a remote operation system according to an eighth embodiment.

FIG. 23 is a diagram illustrating the functions of the vision-based sensory transmission device 3200 included in the remote operation system according to the eighth embodiment. The vision-based sensory transmission device 3200 includes the marker point identification function 3251 that uses the marker information 3300*a* to identify the positions of the passive markers 2500, based on the imaging information 3000*a*, and generates the marker point identification information 3251*a*.

The vision-based sensory transmission device 3200 further includes an image analysis function 3255 that generates, based on the marker information 3300*a* and the imaging information 3000*a*, marker filter image selection information 3255*b* that is image selection information effective as a marker filter, and haptic image pattern selection information 3255*a* that is image pattern selection information effective as a haptic image. More specifically, the image analysis function 3255 is a function of generating, based on the imaging information 3000*a*, the haptic image pattern selection information 3255*a* for selecting a haptic image pattern that is easy for a person to recognize, and the marker filter image selection information 3255*b* for selecting a naturally harmonious image.

The vision-based sensory transmission device 3200 further includes the visual haptic image generation function 3250 that generates the visual haptic image information 3250*a*, based on the haptic information 2300*a* and the haptic image pattern selection information 3255*a*. The vision-based sensory transmission device 3200 further includes the marker filter function 3253 that generates the marker filter information 3253*a*, based on the marker filter image selection information 3255*b*, for filtering the passive markers 2500 detected.

The vision-based sensory transmission device 3200 further includes the marker point estimation function 3254 that generates the marker point estimation information 3254*a*, based on the imaging information 3000*a* and the marker point identification information 3251*a*. The vision-based sensory transmission device 3200 further includes the superimposition function 3252 that generates the vision-based sensory transmission image 3200*a*, based on the visual haptic image information 3250*a*, the marker point identification information 3251*a*, the marker filter information 3253*a*, and the marker point estimation information 3254*a*.

Image selection criteria are set such that, for example, for a filter image, a color similar to that of the end effector is used, and for a visual haptic image, a color conspicuous in imaging information is used. By making a filter image similar in color to the end effector, when the end effector is not in contact with the target 4000, the operator can concentrate on work without being aware of the presence of the passive markers 2500.

The remote operation system according to the eighth embodiment allows the operator 1000 to detect the interaction 4000*a* of the end effector 2100 with the target 4000 from visual information. The remote operation system according to the eighth embodiment can avoid increases in the size and complexity of the operating device. Since the operator 1000 can obtain the haptic information without feeling discomfort by concentrating on the visual presentation device 1100, relatively high operability can be obtained.

The remote operation system according to the eighth embodiment allows the images of the passive markers 2500 to be replaced with images preset by the designer in a situation where contact involving haptic sensation has not occurred between the edge device 2000 and the target 4000 that is the work environment of the edge device 2000. That is, the remote operation system according to the eighth embodiment can reduce the load of recognition on the operator 1000.

Even when one of the passive markers 2500 is hidden by a hiding object, the point of the hidden passive marker 2500 can be estimated, so that the remote operation system according to the eighth embodiment can improve operability for the operator 1000. The remote operation system according to the eighth embodiment can present a visual haptic image pattern that is easy for a person to recognize when detecting haptic sensation, and can present an image in which a marker is naturally harmonious when detecting no haptic sensation, and thus can improve operability for the operator 1000.

Ninth Embodiment

Figure 24:
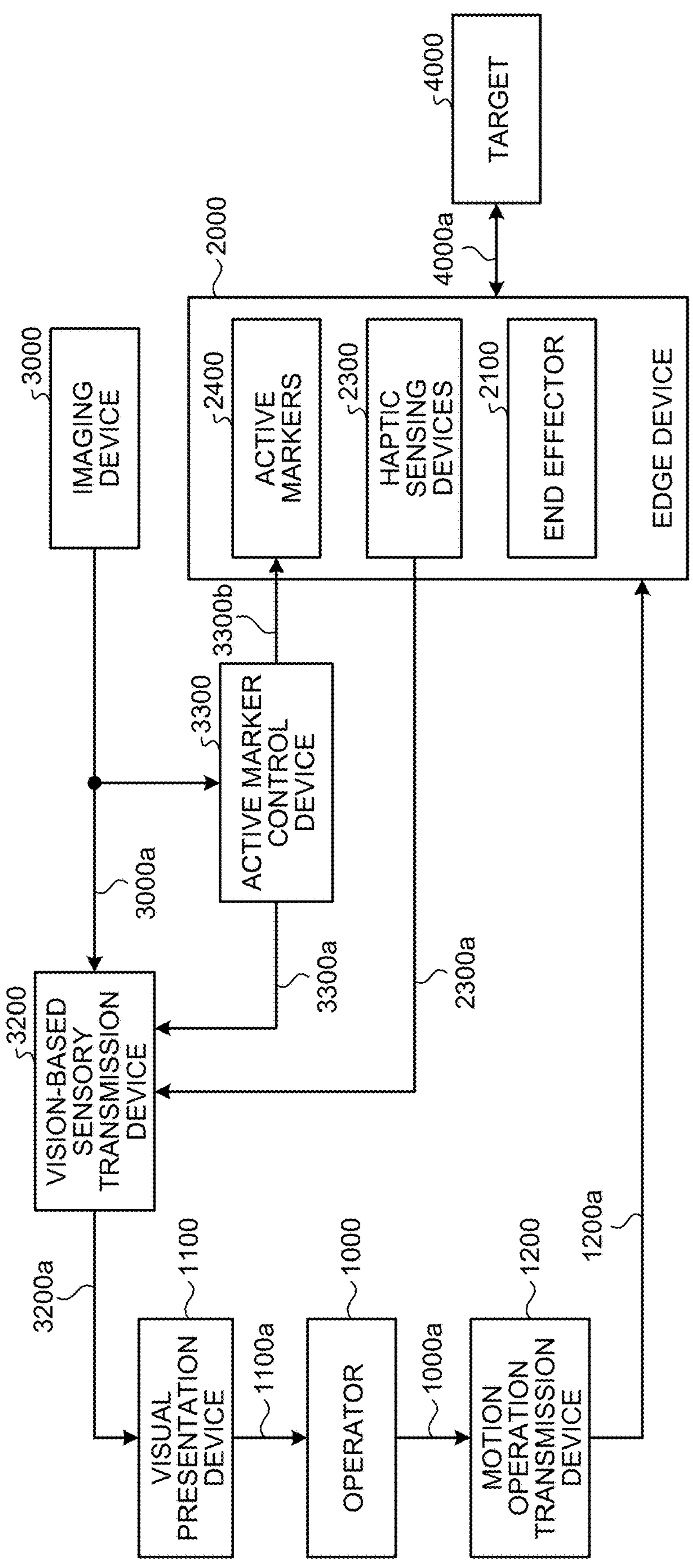
FIG. 24 is a diagram illustrating a configuration of a remote operation system according to a ninth embodiment.

FIG. 24 is a diagram illustrating a configuration of a remote operation system 9 according to a ninth embodiment. The remote operation system 9 includes the motion operation transmission device 1200, the edge device 2000, the imaging device 3000, the vision-based sensory transmission device 3200, and the visual presentation device 1100 included in the remote operation system according to any one of the third to eighth embodiments. In the ninth embodiment, the passive markers 2500 included in the edge device 2000 are changed to active markers 2400. FIG. 24 also illustrates the operator 1000 and the target 4000.

The remote operation system 9 further includes an active marker control device 3300 that receives the imaging information 3000*a* as input and generates an active marker control signal 3300*b* detectable in the imaging device 3000, and the marker information 3300*a*. The active marker control signal 3300*b* is output to the active markers 2400. The marker information 3300*a* is output to the vision-based sensory transmission device 3200.

Figure 25:
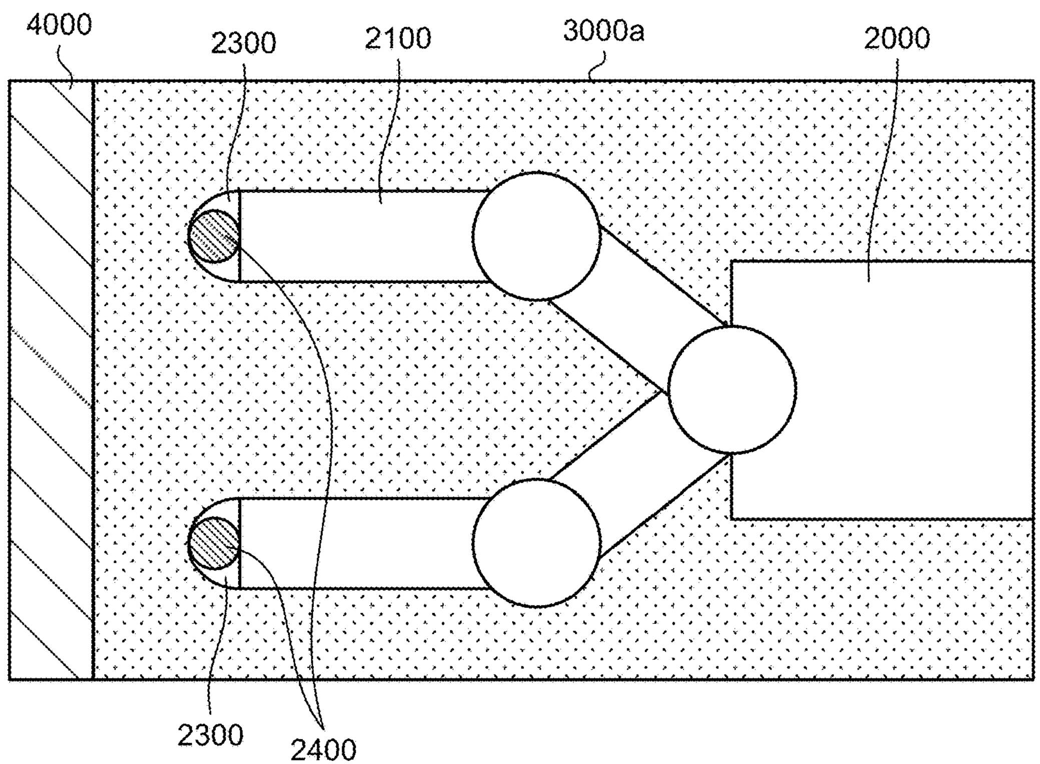
FIG. 25 is a diagram illustrating imaging information that is the output of an imaging device when an end effector included in an edge device of the remote operation system according to the ninth embodiment is not in contact with a target.
Figure 26:
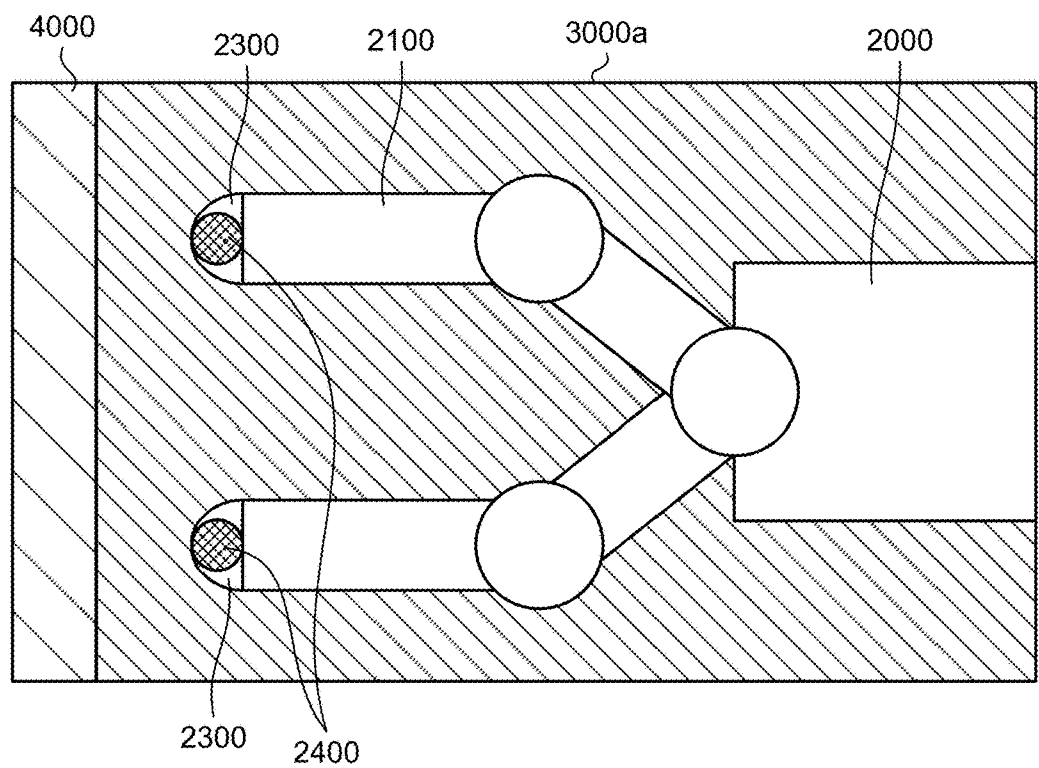
FIG. 26 is a diagram illustrating imaging information that is the output of the imaging device when the end effector included in the edge device of the remote operation system according to the ninth embodiment is not in contact with the target.
Figure 27:
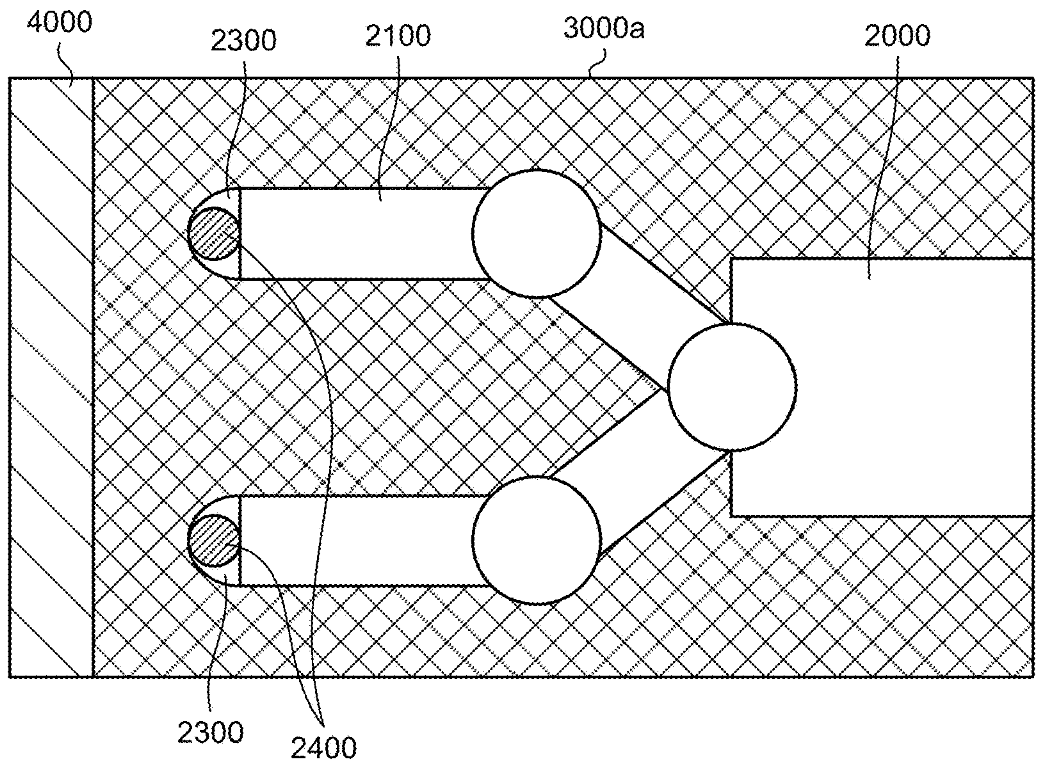
FIG. 27 is a diagram illustrating imaging information that is the output of the imaging device when the end effector included in the edge device of the remote operation system according to the ninth embodiment is not in contact with the target.

FIGS. 25, 26, and 27 are diagrams illustrating the imaging information 3000*a* that is the output of the imaging device 3000 when the end effector 2100 included in the edge device 2000 of the remote operation system 9 according to the ninth embodiment is not in contact with the target 4000. The active marker control device 3300 receives the imaging information 3000*a* as input, generates a color, a shape, or a color and a shape that are easily detected from the imaging device 3000, and outputs the active marker control signal 3300*b* to the active markers 2400.

For example, in FIG. 25, the active markers 2400 are lit in "blue" that is not included in the imaging information 3000*a*. In FIG. 26, the active markers 2400 are lit in "yellow" that is not included in the imaging information 3000*a*. In FIG. 27, the active markers 2400 are lit in "green" that is not included in the imaging information 3000*a*.

Figure 28:
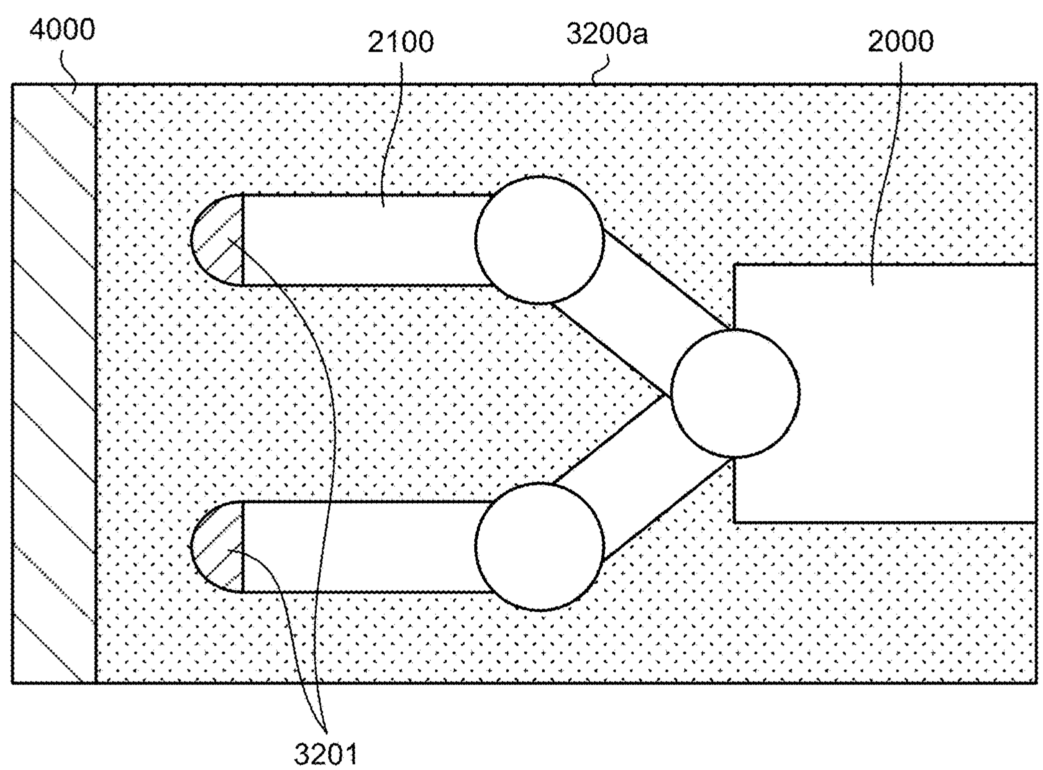
FIG. 28 is a diagram illustrating a vision-based sensory transmission image that is the output of a vision-based sensory transmission device when the end effector included in the edge device of the remote operation system according to the ninth embodiment is not in contact with the target.
Figure 29:
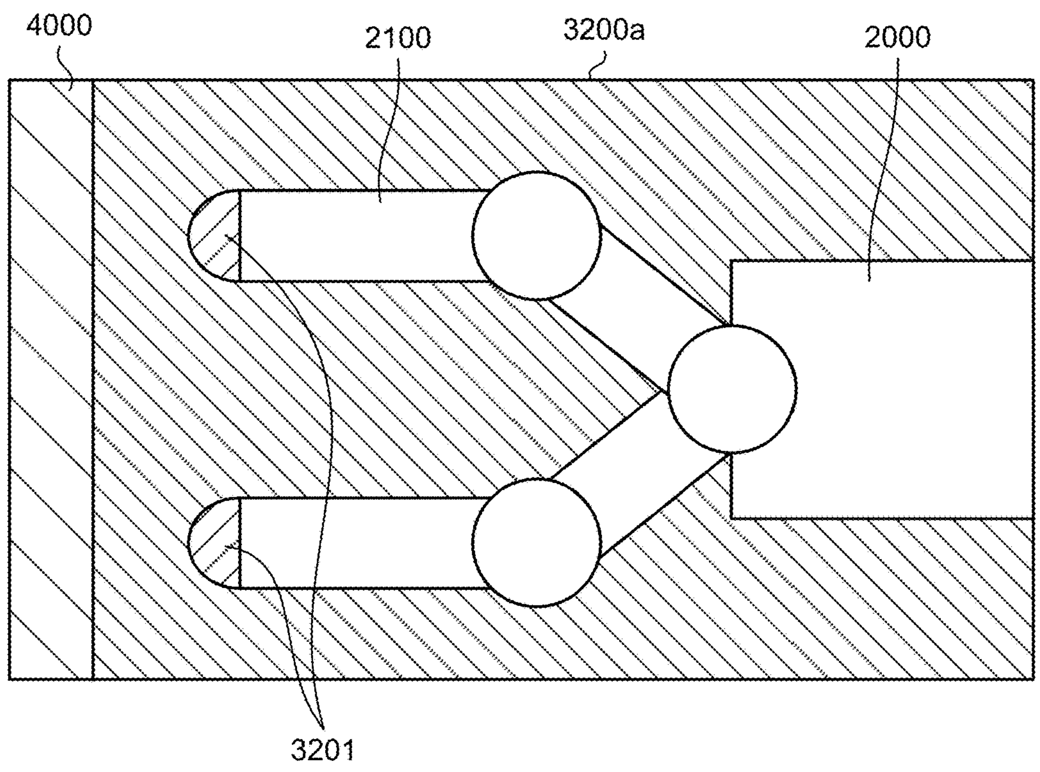
FIG. 29 is a diagram illustrating a vision-based sensory transmission image that is the output of the vision-based sensory transmission device when the end effector included in the edge device of the remote operation system according to the ninth embodiment is not in contact with the target.
Figure 30:
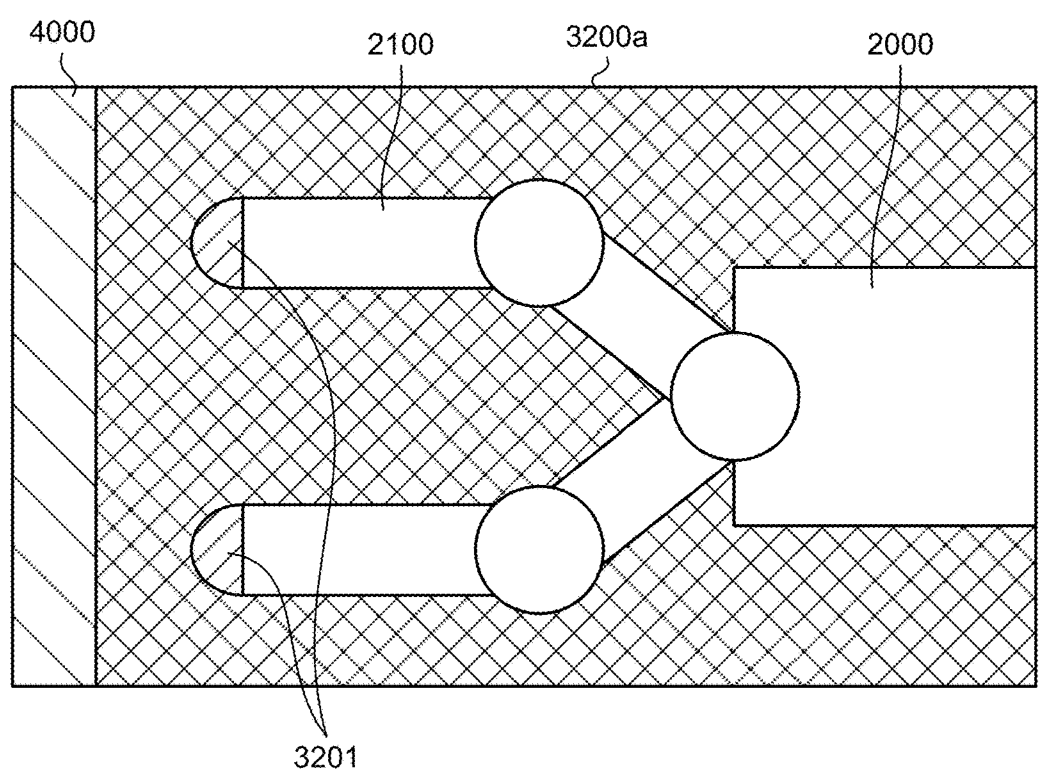
FIG. 30 is a diagram illustrating a vision-based sensory transmission image that is the output of the vision-based sensory transmission device when the end effector included in the edge device of the remote operation system according to the ninth embodiment is not in contact with the target.

FIGS. 28, 29, and 30 are diagrams illustrating the vision-based sensory transmission image 3200*a* that is the output of the vision-based sensory transmission device 3200 when the end effector 2100 included in the edge device 2000 of the remote operation system 9 according to the ninth embodiment is not in contact with the target 4000. The vision-based sensory transmission image 3200*a* in each of FIGS. 28, 29, and 30 shows that the superimposed images 3201 fixed are superimposed on the positions of the active markers 2400 that change according to the imaging information 3000*a*, so that although the image changes from moment to moment in the imaging information 3000*a*, information on changes in the active markers 2400 is blocked in the vision-based sensory transmission image 3200*a* presented to the operator 1000.

Figure 31:
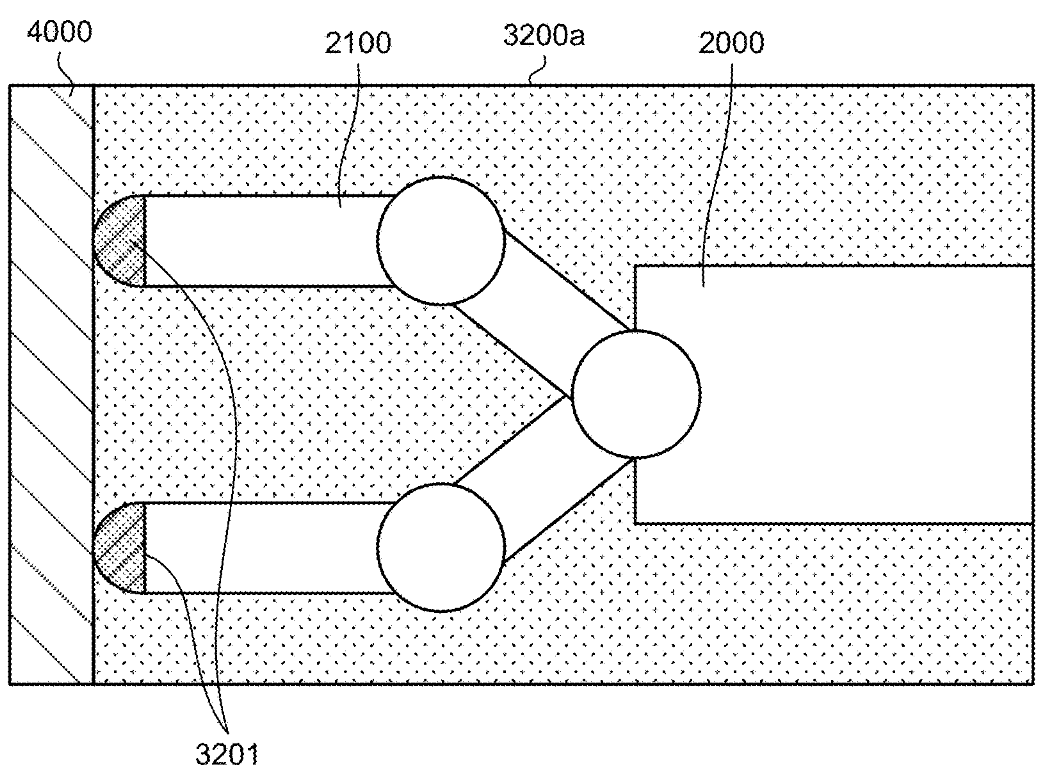
FIG. 31 is a diagram illustrating a vision-based sensory transmission image that is the output of the vision-based sensory transmission device when the end effector included in the edge device of the remote operation system according to the ninth embodiment is in contact with the target.
Figure 32:
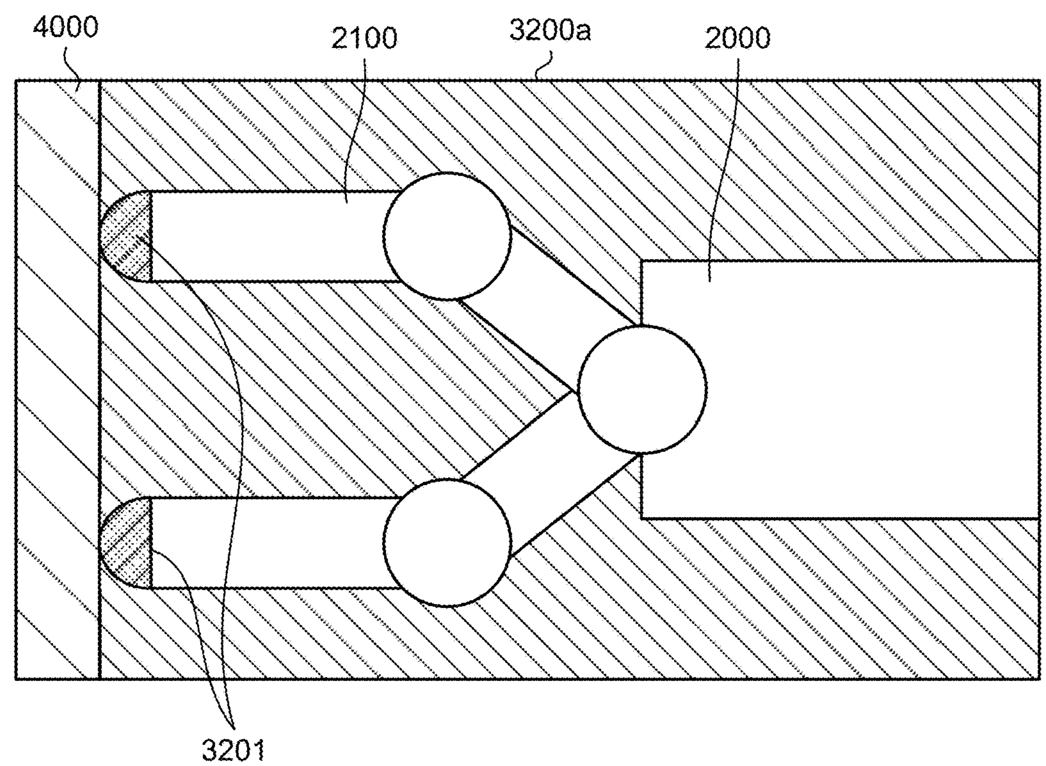
FIG. 32 is a diagram illustrating a vision-based sensory transmission image that is the output of the vision-based sensory transmission device when the end effector included in the edge device of the remote operation system according to the ninth embodiment is in contact with the target.
Figure 33:
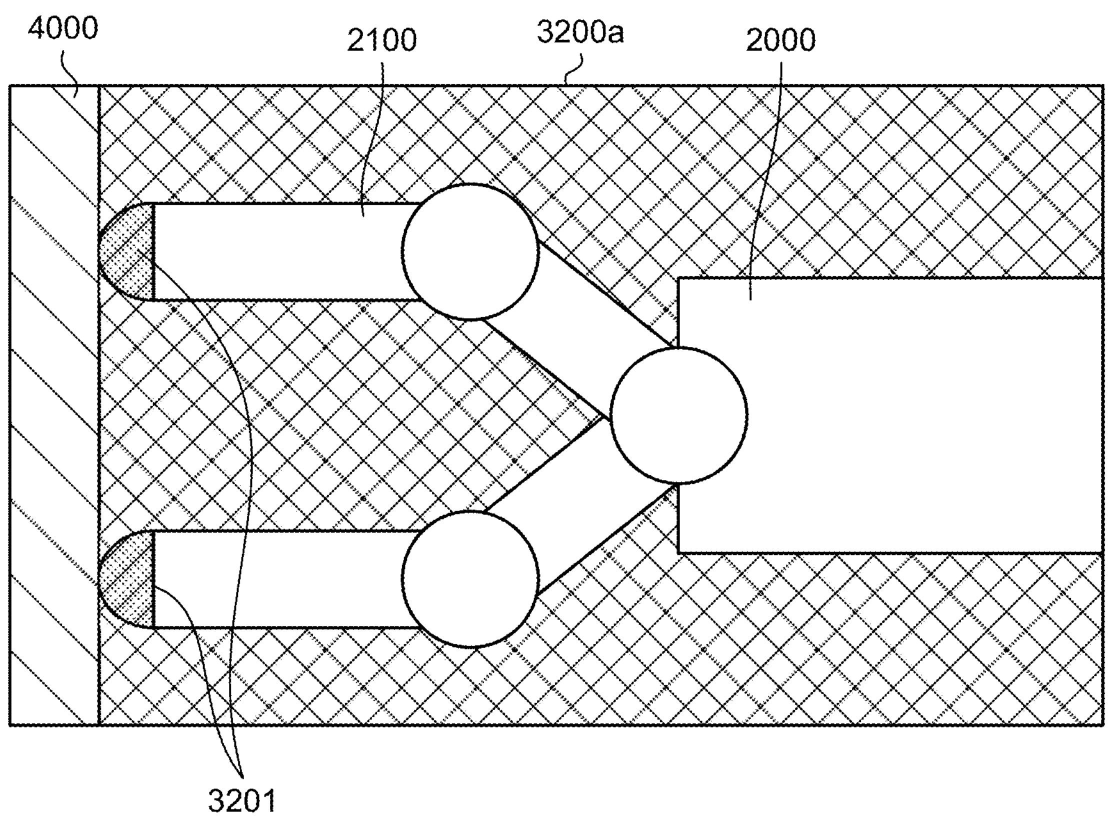
FIG. 33 is a diagram illustrating a vision-based sensory transmission image that is the output of the vision-based sensory transmission device when the end effector included in the edge device of the remote operation system according to the ninth embodiment is in contact with the target.

FIGS. 31, 32, and 33 are diagrams illustrating the vision-based sensory transmission image 3200*a* that is the output of the vision-based sensory transmission device 3200 when the end effector 2100 included in the edge device 2000 of the remote operation system 9 according to the ninth embodiment is in contact with the target 4000. By the vision-based sensory transmission image 3200*a* in each of FIGS. 31, 32, and 33, the superimposed images 3201 matching the statuses of contact of the haptic sensing devices 2300 with the target 4000 are presented to the operator 1000.

The remote operation system 9 according to the ninth embodiment provides, in addition to the effect provided by any one of the third to eighth embodiments, an effect that the positions of the active markers 2400 can be identified based on the imaging information 3000*a*. The remote operation system 9 can improve the stability of detection of the active markers 2400. By superimposing fixed images on the positions of the active markers 2400 identified based on the imaging information 3000*a*, the remote operation system 9 can block information on image changes unnecessary for the operator 1000 from being transmitted to the operator 1000, and can expand the range of use of the remote operation system 9 without hindering operability for the operator 1000.

Tenth Embodiment

Figure 34:
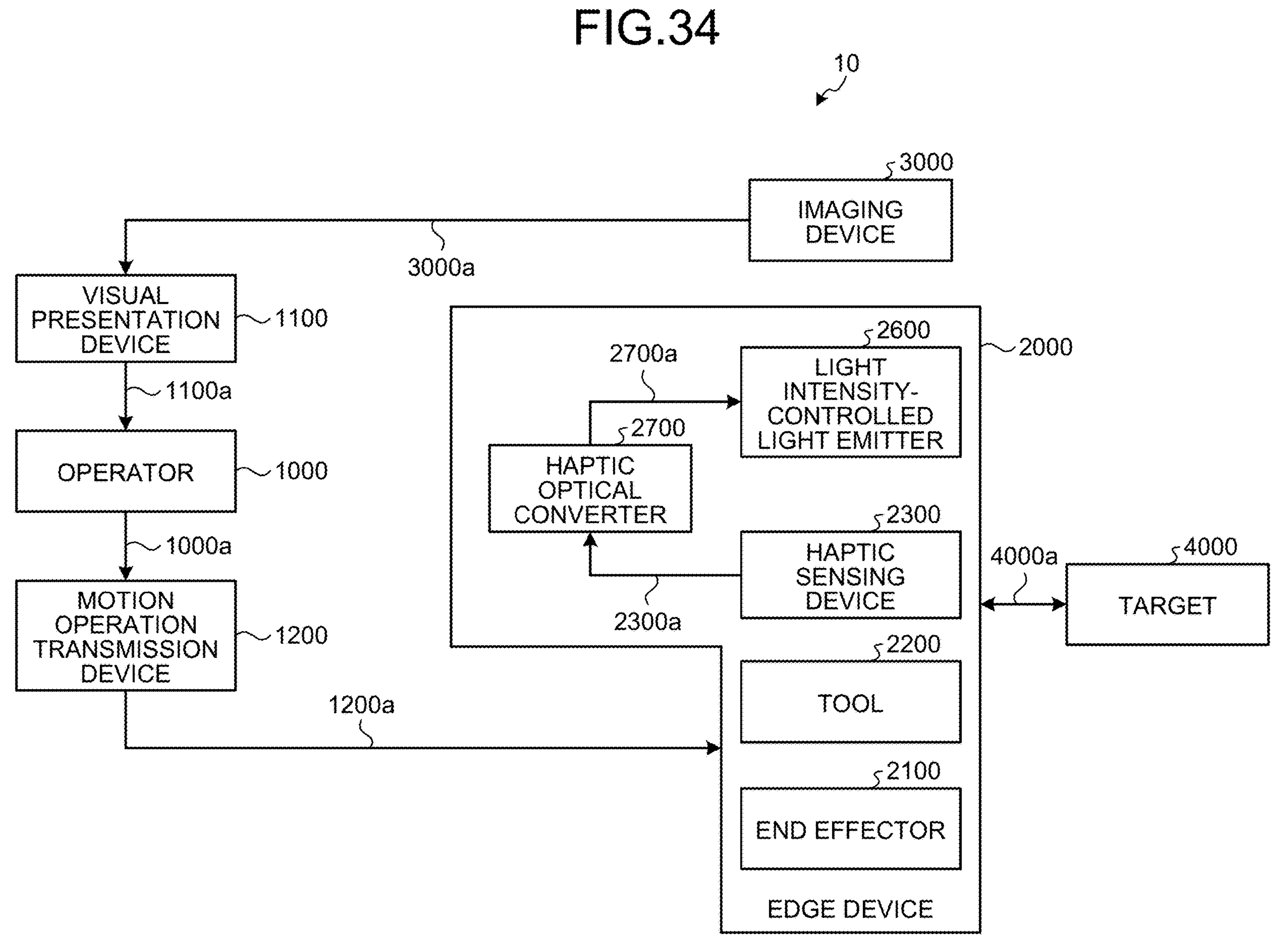
FIG. 34 is a diagram illustrating a configuration of a remote operation system according to a tenth embodiment.

FIG. 34 is a diagram illustrating a configuration of a remote operation system 10 according to a tenth embodiment. The remote operation system 10 includes all the components included in the remote operation system 1 according to the first embodiment. The edge device 2000 of the remote operation system 10 further includes a tool 2200 attached to the end effector 2100. In the tenth embodiment, a haptic sensing device 2300 and a light intensity-controlled light emitter 2600 are attached to a distal end portion that contacts the target 4000.

Figure 35:
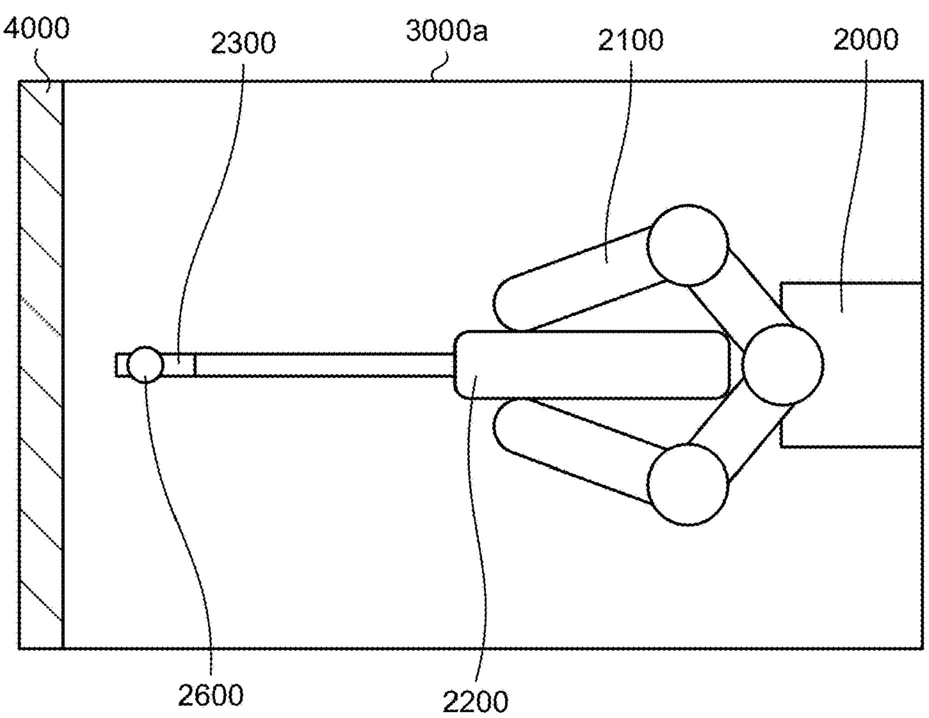
FIG. 35 is a diagram illustrating imaging information that is the output of an imaging device when a tool included in an edge device of the remote operation system according to the tenth embodiment is not in contact with a target.

FIG. 35 is a diagram illustrating the imaging information 3000*a* that is the output of the imaging device 3000 when the tool 2200 included in the edge device 2000 of the remote operation system 10 according to the tenth embodiment is not in contact with the target 4000. The haptic sensing device 2300 and the light intensity-controlled light emitter 2600 are disposed at a point of contact of the tool 2200 with the target 4000. The light intensity-controlled light emitter 2600 is not lit.

Figure 36:
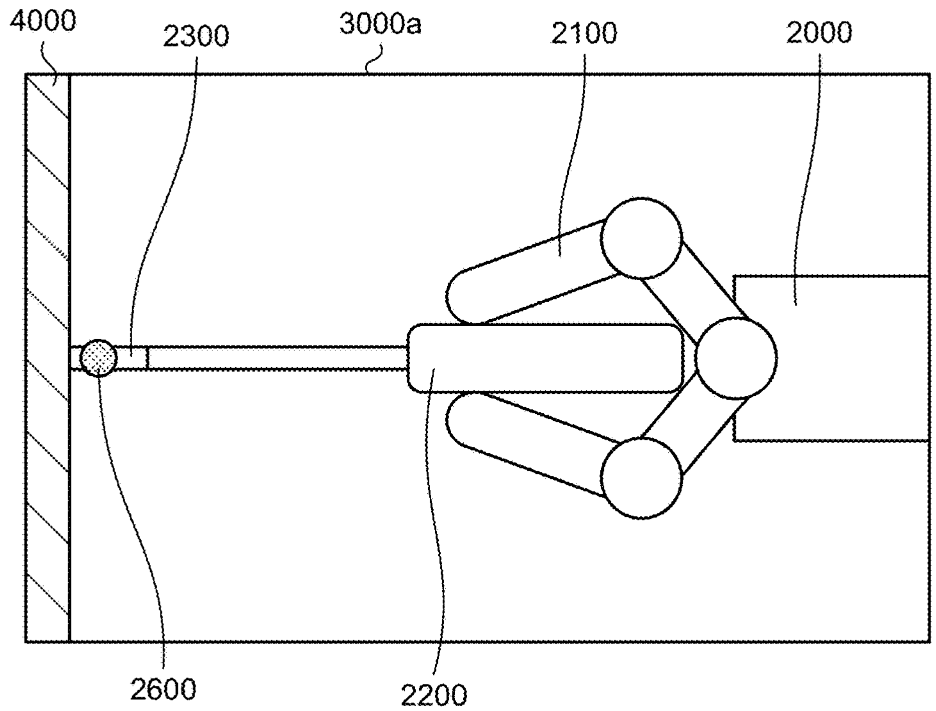
FIG. 36 is a diagram illustrating imaging information provided to a visual presentation device when the tool included in the edge device of the remote operation system according to the tenth embodiment is in contact with the target.

FIG. 36 is a diagram illustrating the imaging information 3000*a* provided to the visual presentation device 1100 when the tool 2200 included in the edge device 2000 of the remote operation system 10 according to the tenth embodiment is in contact with the target 4000. The light intensity-controlled light emitter 2600 is lit, according to the state of contact between the haptic sensing device 2300 and the target 4000.

The remote operation system 10 according to the tenth embodiment allows the operator 1000 to detect the interaction 4000*a* of the tool 2200 with the target 4000 from visual information. The remote operation system 10 can avoid increases in the size and complexity of the operating device. Since the operator 1000 can obtain the haptic information 2300*a* without feeling discomfort by concentrating on the visual presentation device 1100, relatively high operability can be obtained.

In the tenth embodiment, the light intensity-controlled light emitter 2600 may not change the intensity of light when emitting light, but may express the state of contact of the haptic sensing device 2300 with the target 4000 by changes in hue and lighting frequency when emitting light.

Eleventh Embodiment

Figure 37:
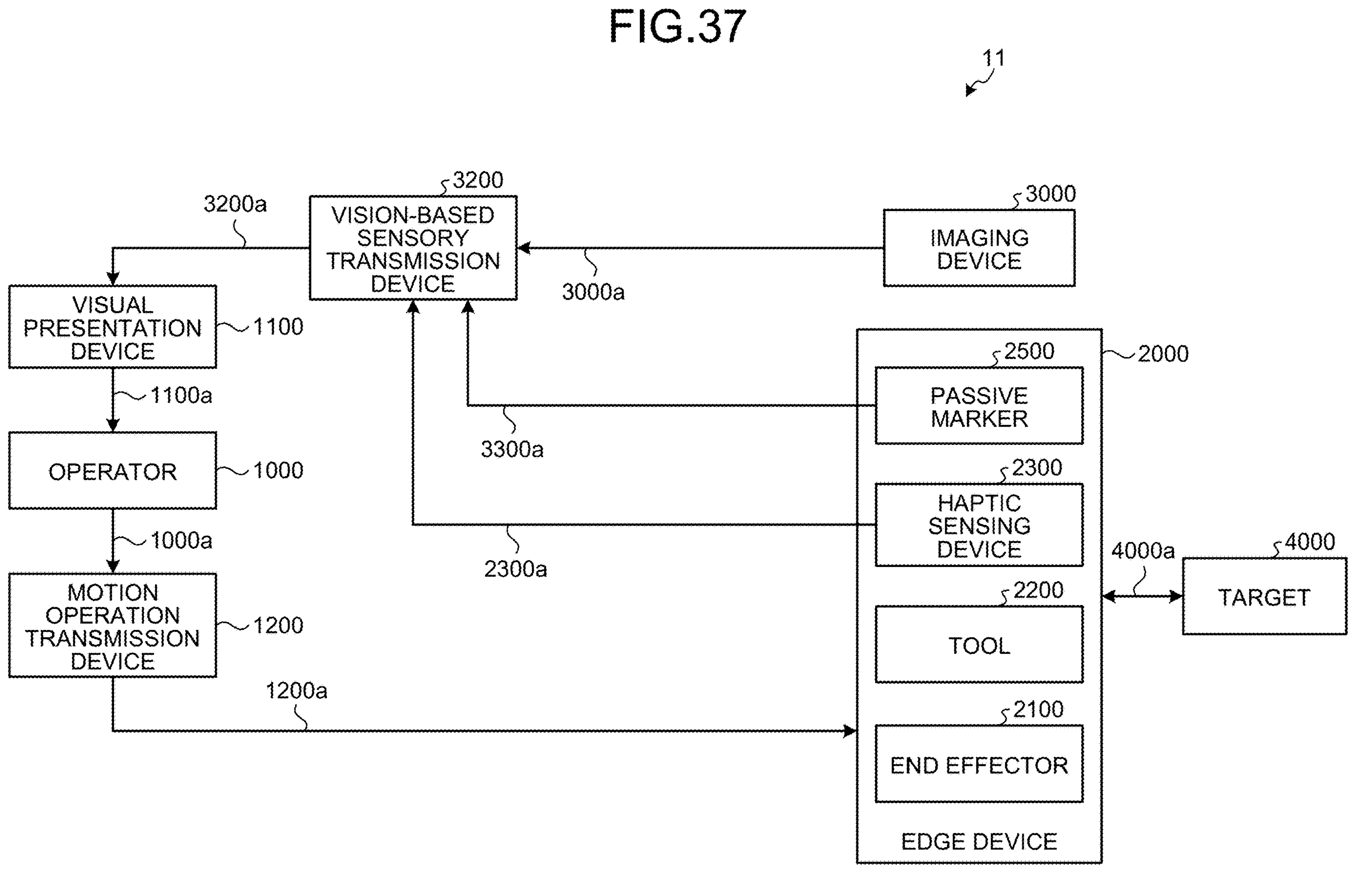
FIG. 37 is a diagram illustrating a configuration of a remote operation system according to an eleventh embodiment.

FIG. 37 is a diagram illustrating a configuration of a remote operation system 11 according to an eleventh embodiment. The remote operation system 11 includes all the components included in the remote operation system according to any one of the third to eighth embodiments. The edge device 2000 of the remote operation system 11 further includes the tool 2200 attached to the end effector 2100. In the eleventh embodiment, a haptic sensing device 2300 and a passive marker 2500 are attached to a distal end portion that contacts the target 4000.

Figure 38:
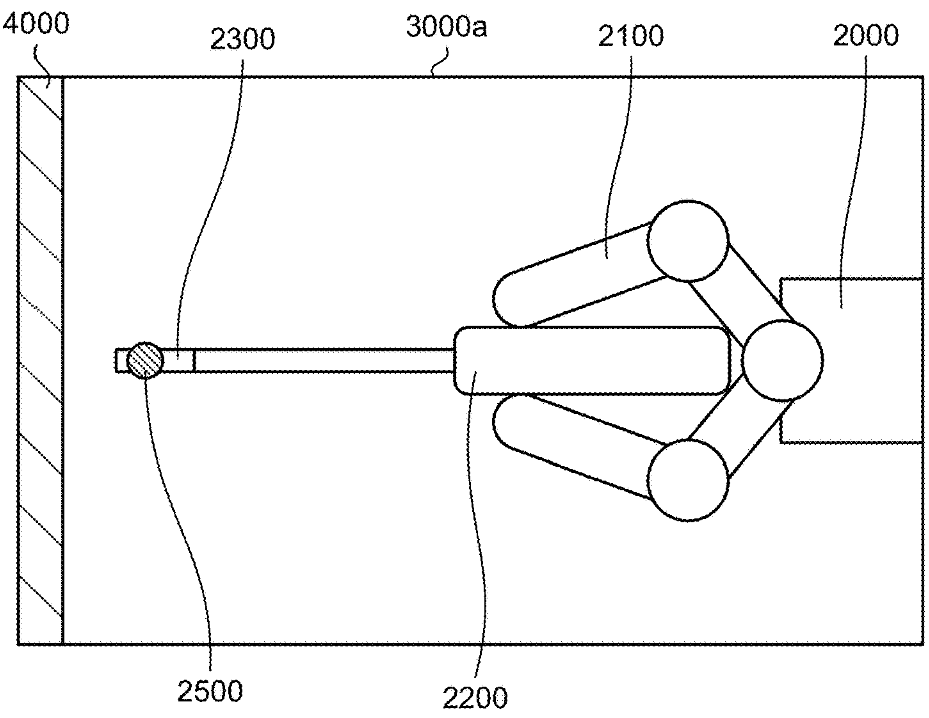
FIG. 38 is a diagram illustrating imaging information that is the output of an imaging device when a tool included in an edge device of the remote operation system according to the eleventh embodiment is not in contact with a target.

FIG. 38 is a diagram illustrating the imaging information 3000*a* that is the output of the imaging device 3000 when the tool 2200 included in the edge device 2000 of the remote operation system 11 according to the eleventh embodiment is not in contact with the target 4000. The passive marker 2500 has been detected as the marker point identification information 3251*a*.

Figure 39:
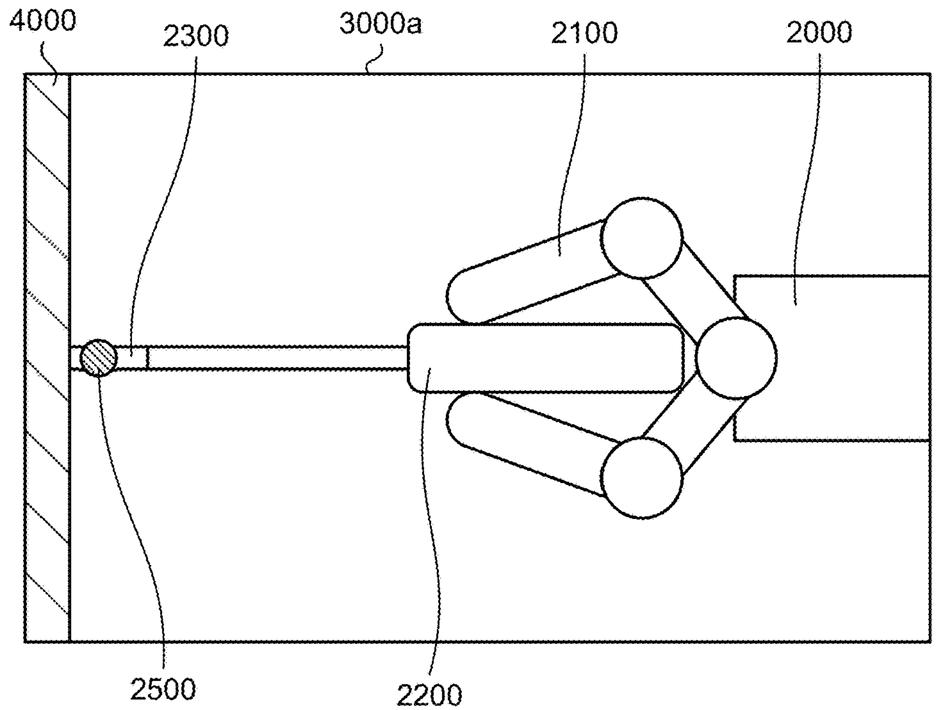
FIG. 39 is a diagram illustrating imaging information that is the output of the imaging device when the tool included in the edge device of the remote operation system according to the eleventh embodiment is in contact with the target.

FIG. 39 is a diagram illustrating the imaging information 3000*a* that is the output of the imaging device 3000 when the tool 2200 included in the edge device 2000 of the remote operation system 11 according to the eleventh embodiment is in contact with the target 4000. The passive marker 2500 has been detected as the marker point identification information 3251*a*, and the haptic sensing device 2300 has detected a haptic sensation.

Figure 40:
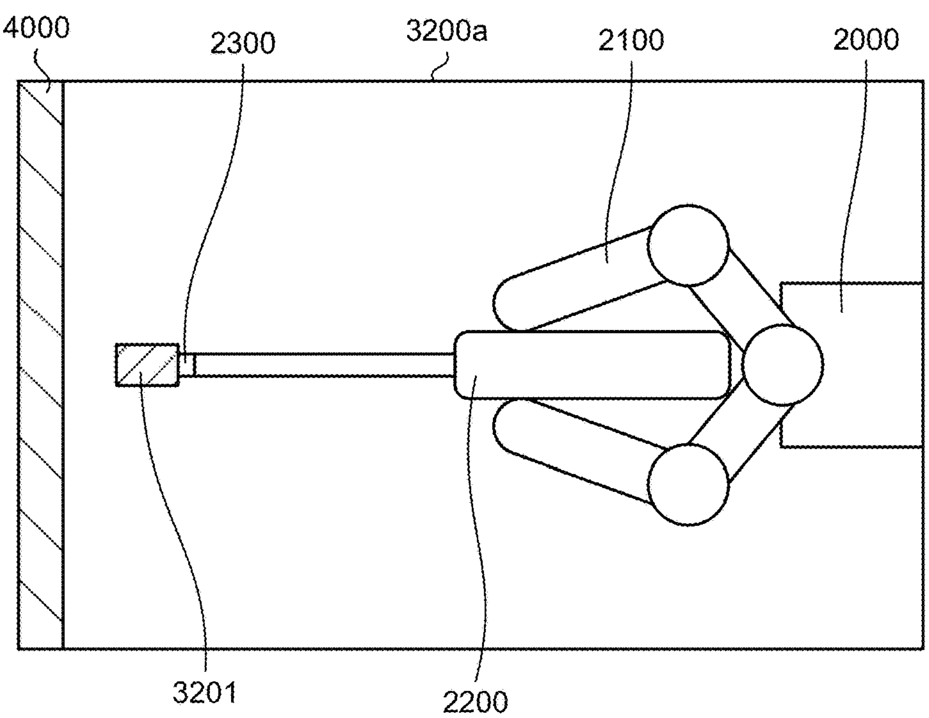
FIG. 40 is a diagram illustrating a vision-based sensory transmission image that is the output of a vision-based sensory transmission device when the tool included in the edge device of the remote operation system according to the eleventh embodiment is not in contact with the target.

FIG. 40 is a diagram illustrating the vision-based sensory transmission image 3200*a* that is the output of the vision-based sensory transmission device 3200 when the tool 2200 included in the edge device 2000 of the remote operation system 11 according to the eleventh embodiment is not in contact with the target 4000. The superimposed image 3201 in which the marker filter information 3253*a* as filtering information is expressed by the image is displayed at the position where the passive marker 2500 has been detected as the marker point identification information 3251*a* in FIG. 38.

Figure 41:
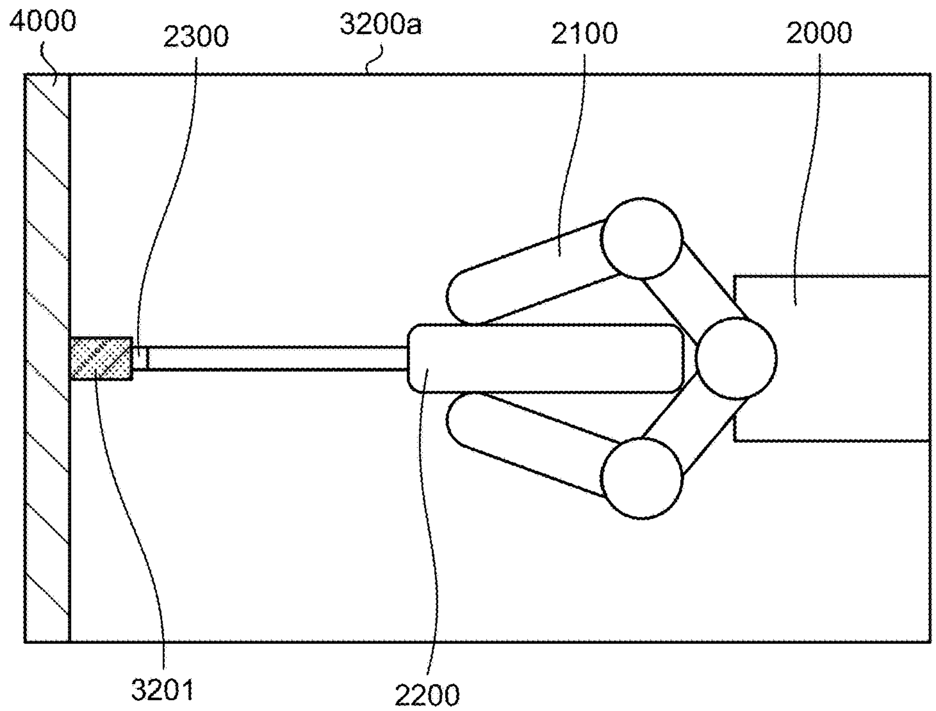
FIG. 41 is a diagram illustrating a vision-based sensory transmission image that is the output of the vision-based sensory transmission device when the tool included in the edge device of the remote operation system according to the eleventh embodiment is in contact with the target.

FIG. 41 is a diagram illustrating the vision-based sensory transmission image 3200*a* that is the output of the vision-based sensory transmission device 3200 when the tool 2200 included in the edge device 2000 of the remote operation system 11 according to the eleventh embodiment is in contact with the target 4000. The superimposed image 3201 in which the haptic information 2300*a* is expressed by the image is displayed at the position where the passive marker 2500 has been detected as the marker point identification information 3251*a* in FIG. 39.

The remote operation system 11 according to the eleventh embodiment allows the operator 1000 to detect the interaction 4000*a* of the tool 2200 with the target 4000 from visual information. The remote operation system 11 can avoid increases in the size and complexity of the operating device. Since the operator 1000 can obtain the haptic information 2300*a* without feeling discomfort by concentrating on the visual presentation device 1100, relatively high operability can be obtained.

Twelfth Embodiment

FIG. 42 is a diagram illustrating a configuration of a remote operation system 12 according to a twelfth embodiment. The remote operation system 12 is a system in which the passive marker 2500 of the remote operation system 11 according to the eleventh embodiment is changed to an active marker 2400. In the twelfth embodiment, the haptic sensing device 2300 and the active marker 2400 are attached to a distal end portion that contacts the target 4000.

The remote operation system 12 further includes the active marker control device 3300 that receives the imaging information 3000*a* as input and generates the active marker control signal 3300*b* detectable in the imaging device 3000, and the marker information 3300*a*. The active marker control signal 3300*b* is output to the active marker 2400. The marker information 3300*a* is output to the vision-based sensory transmission device 3200.

Figure 43:
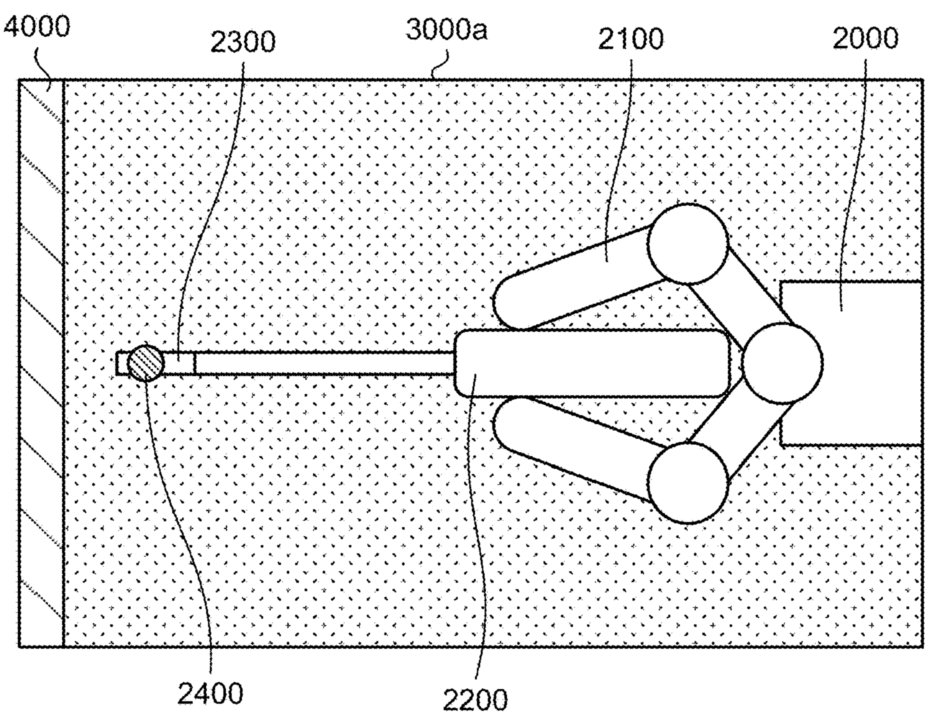
FIG. 43 is a diagram illustrating imaging information that is the output of an imaging device when a tool included in an edge device of the remote operation system according to the twelfth embodiment is not in contact with a target.
Figure 44:
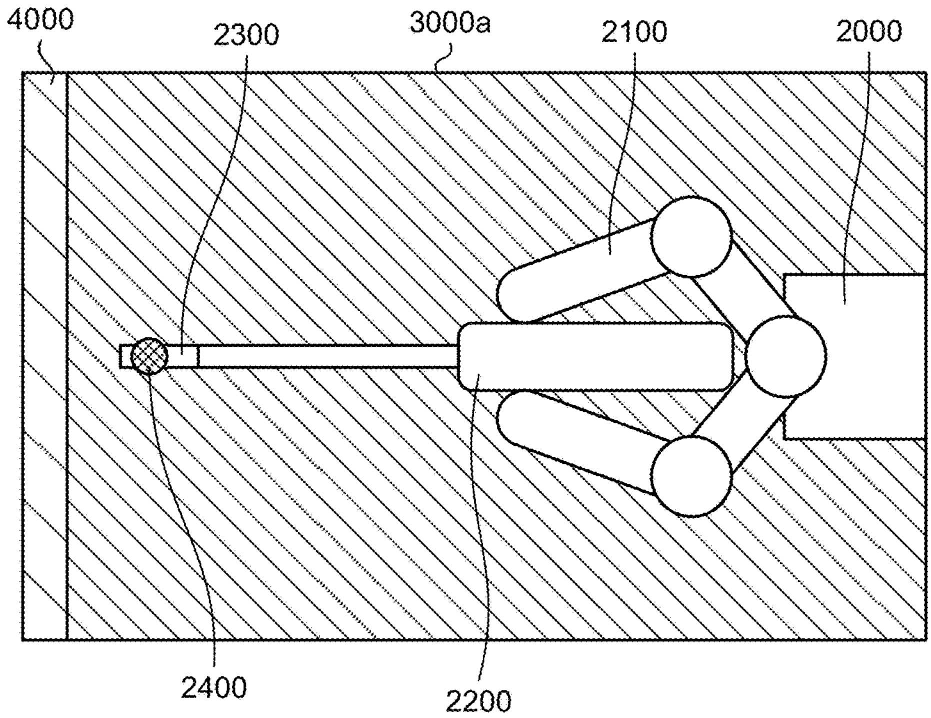
FIG. 44 is a diagram illustrating imaging information that is the output of the imaging device when the tool included in the edge device of the remote operation system according to the twelfth embodiment is not in contact with the target.
Figure 45:
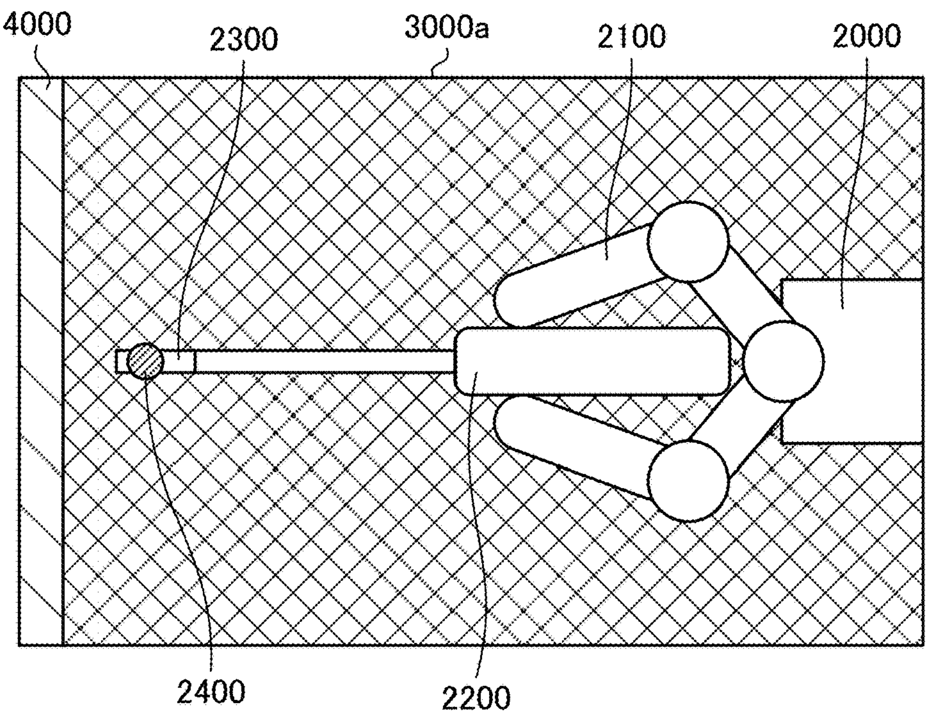
FIG. 45 is a diagram illustrating imaging information that is the output of the imaging device when the tool included in the edge device of the remote operation system according to the twelfth embodiment is not in contact with the target.

FIGS. 43, 44, and 45 are diagrams illustrating the imaging information 3000*a* that is the output of the imaging device 3000 when the tool 2200 included in the edge device 2000 of the remote operation system 12 according to the twelfth embodiment is not in contact with the target 4000. The active marker control device 3300 receives the imaging information 3000*a* as input, generates a color, a shape, or a color and a shape that are easily detected from the imaging device 3000, and outputs the active marker control signal 3300*b* to the active marker 2400.

For example, in FIG. 43, the active marker 2400 is lit in "blue" that is not included in the imaging information 3000*a*. In FIG. 44, the active marker 2400 is lit in "yellow" that is not included in the imaging information 3000*a*. In FIG. 45, the active marker 2400 is lit in "green" that is not included in the imaging information 3000*a*.

Figure 46:
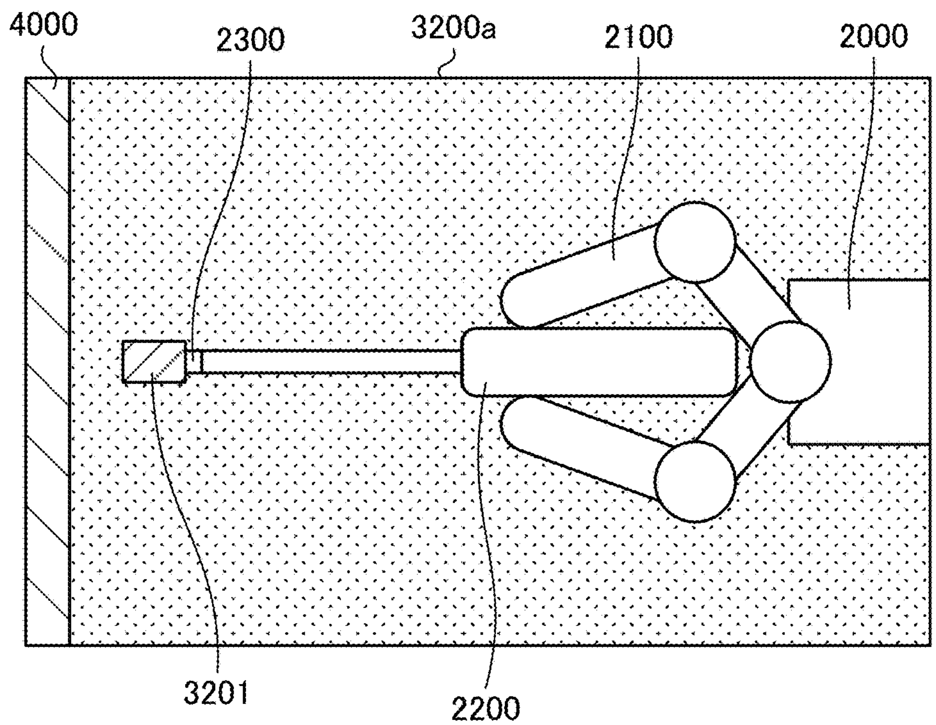
FIG. 46 is a diagram illustrating a vision-based sensory transmission image that is the output of a vision-based sensory transmission device when the tool included in the edge device of the remote operation system according to the twelfth embodiment is not in contact with the target.
Figure 47:
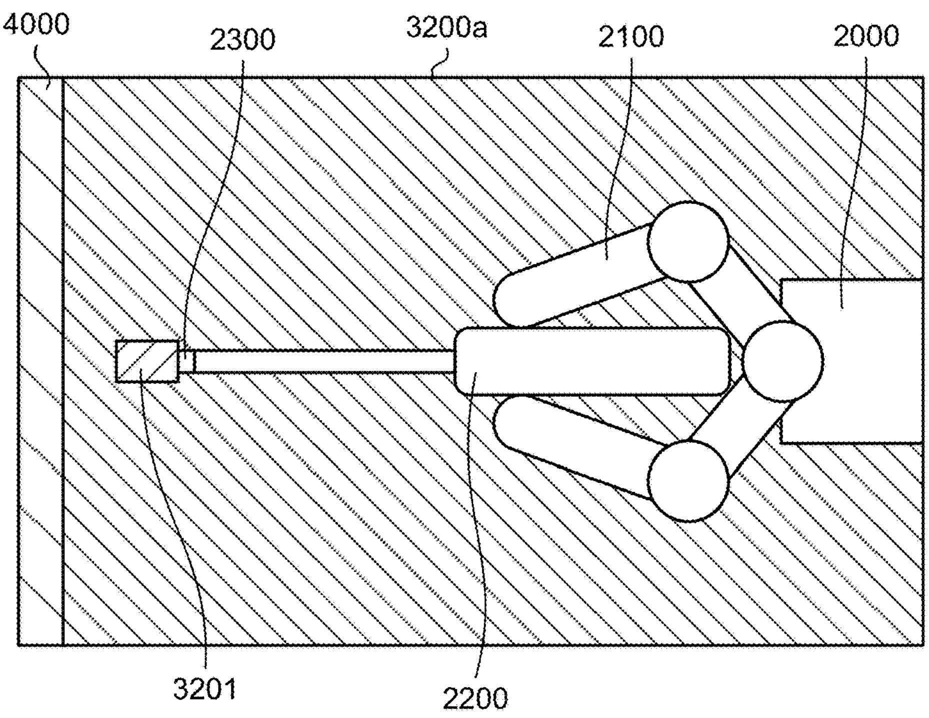
FIG. 47 is a diagram illustrating a vision-based sensory transmission image that is the output of the vision-based sensory transmission device when the tool included in the edge device of the remote operation system according to the twelfth embodiment is not in contact with the target.
Figure 48:
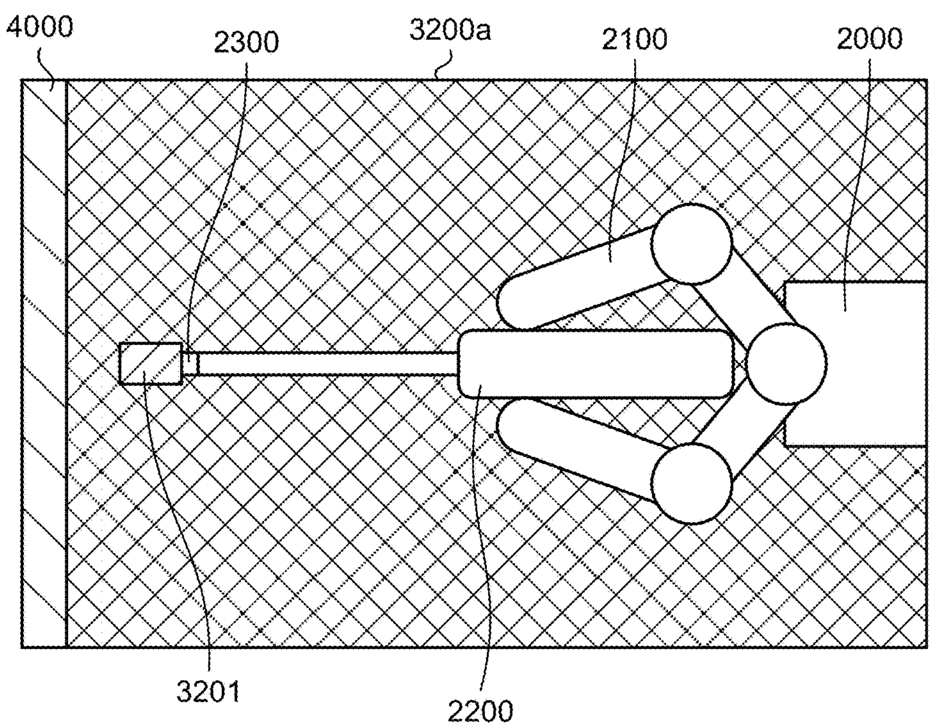
FIG. 48 is a diagram illustrating a vision-based sensory transmission image that is the output of the vision-based sensory transmission device when the tool included in the edge device of the remote operation system according to the twelfth embodiment is not in contact with the target.

FIGS. 46, 47, and 48 are diagrams illustrating the vision-based sensory transmission image 3200*a* that is the output of the vision-based sensory transmission device 3200 when the tool 2200 included in the edge device 2000 of the remote operation system 12 according to the twelfth embodiment is not in contact with the target 4000. The image based on the imaging information 3000*a* changes from moment to moment. In the vision-based sensory transmission image 3200*a* in each of FIGS. 46, 47, and 48 that is resultantly presented to the operator 1000, the superimposed image 3201 fixed is superimposed on the position of the active marker 2400 that changes according to the imaging information 3000*a*, so that information on changes in the active marker 2400 is blocked.

Figure 49:
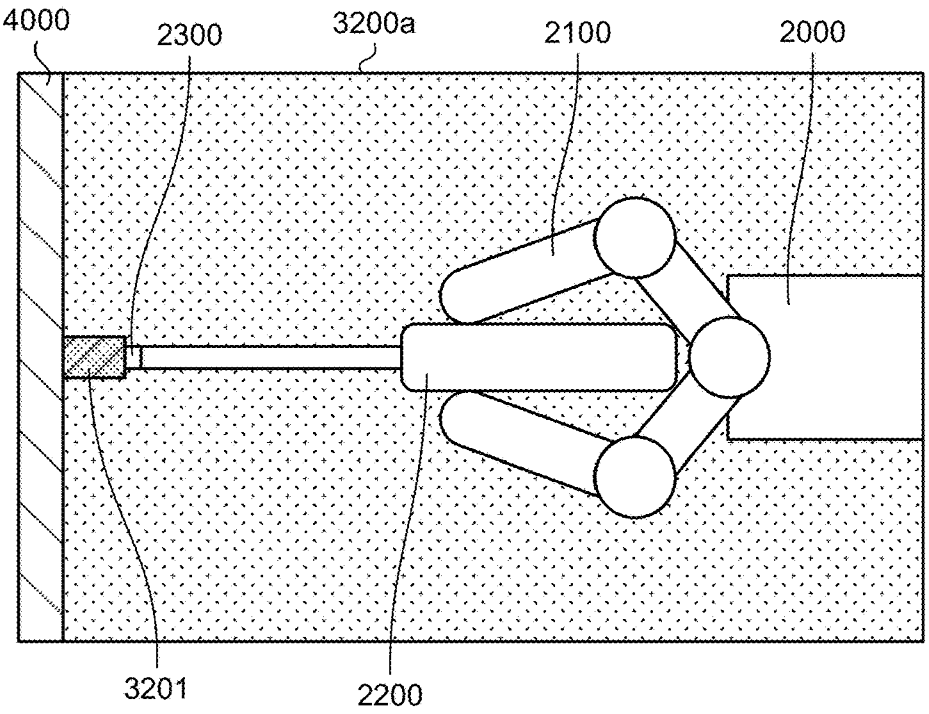
FIG. 49 is a diagram illustrating a vision-based sensory transmission image that is the output of the vision-based sensory transmission device when the tool included in the edge device of the remote operation system according to the twelfth embodiment is in contact with the target.
Figure 50:
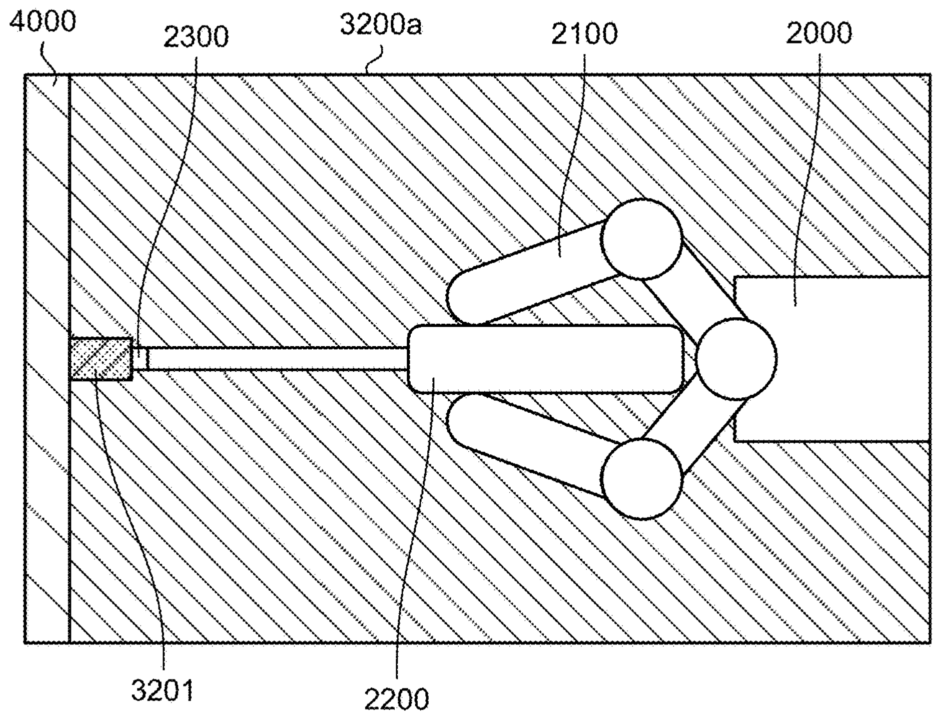
FIG. 50 is a diagram illustrating a vision-based sensory transmission image that is the output of the vision-based sensory transmission device when the tool included in the edge device of the remote operation system according to the twelfth embodiment is in contact with the target.
Figure 51:
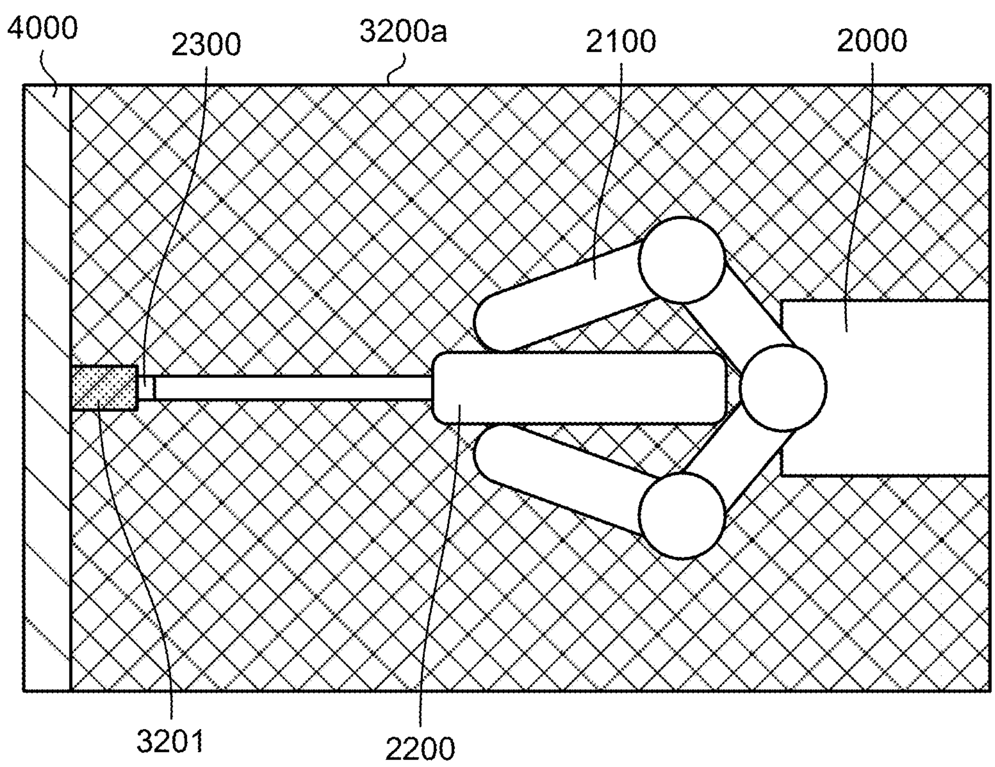
FIG. 51 is a diagram illustrating a vision-based sensory transmission image that is the output of the vision-based sensory transmission device when the tool included in the edge device of the remote operation system according to the twelfth embodiment is in contact with the target.

FIGS. 49, 50, and 51 are diagrams illustrating the vision-based sensory transmission image 3200*a* that is the output of the vision-based sensory transmission device 3200 when the tool 2200 included in the edge device 2000 of the remote operation system 12 according to the twelfth embodiment is in contact with the target 4000. In the vision-based sensory transmission image 3200*a* in each of FIGS. 49, 50, and 51, the superimposed image 3201 matching the status of contact of the haptic sensing device 2300 with the target 4000 is presented to the operator 1000.

The remote operation system 12 according to the twelfth embodiment provides, in addition to the effect provided by the remote operation system 11 according to the eleventh embodiment, an effect that the stable position of the active marker 2400 can be identified based on the imaging information 3000*a*. By superimposing a fixed image on a position identified based on the imaging information 3000*a*, the remote operation system 12 can block information on image changes unnecessary for the operator 1000, and can expand the range of use of the remote operation system 12 without hindering operability for the operator 1000.

Thirteenth Embodiment

Figure 52:
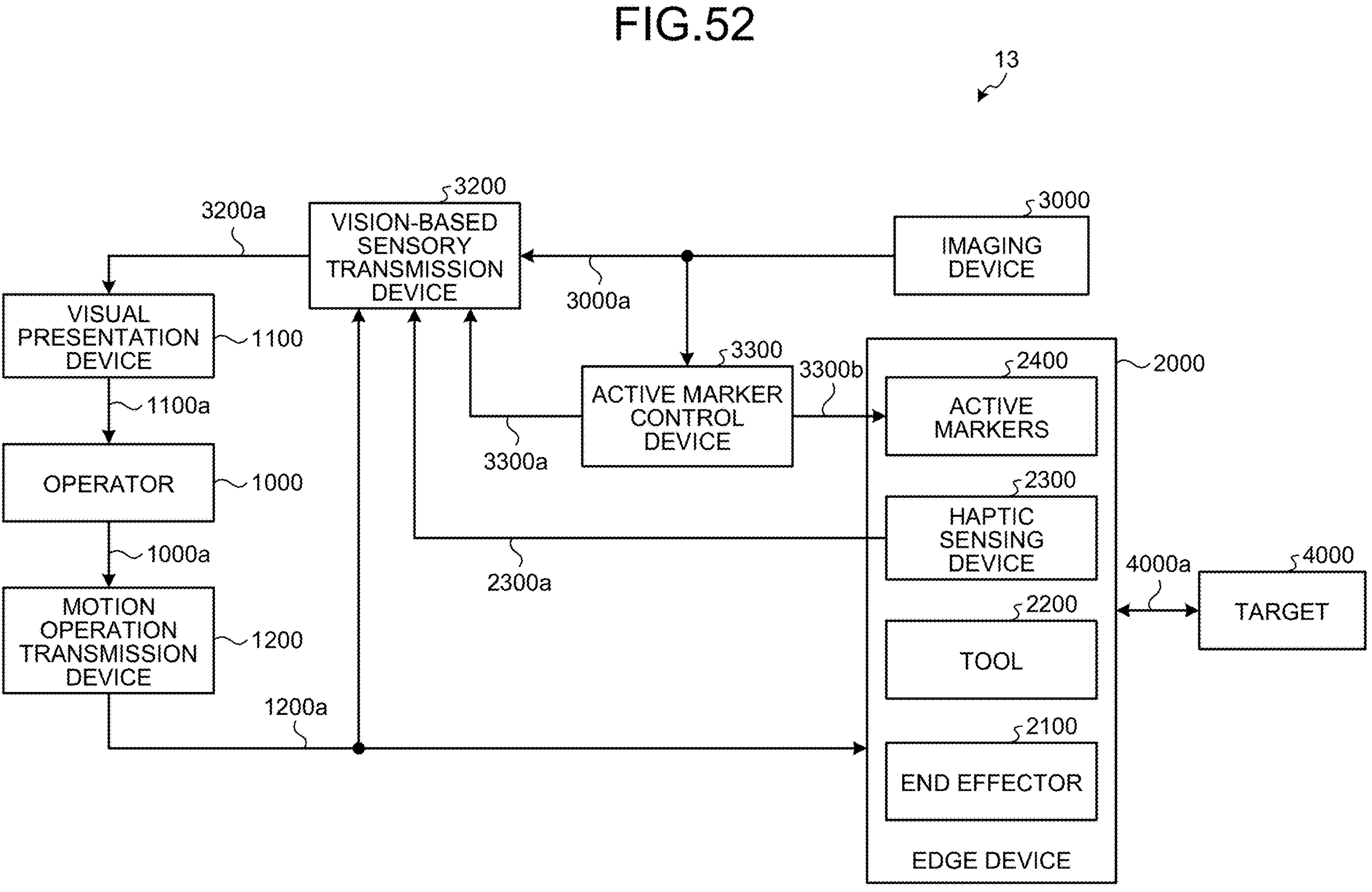
FIG. 52 is a diagram illustrating a configuration of a remote operation system according to a thirteenth embodiment.
Figure 53:
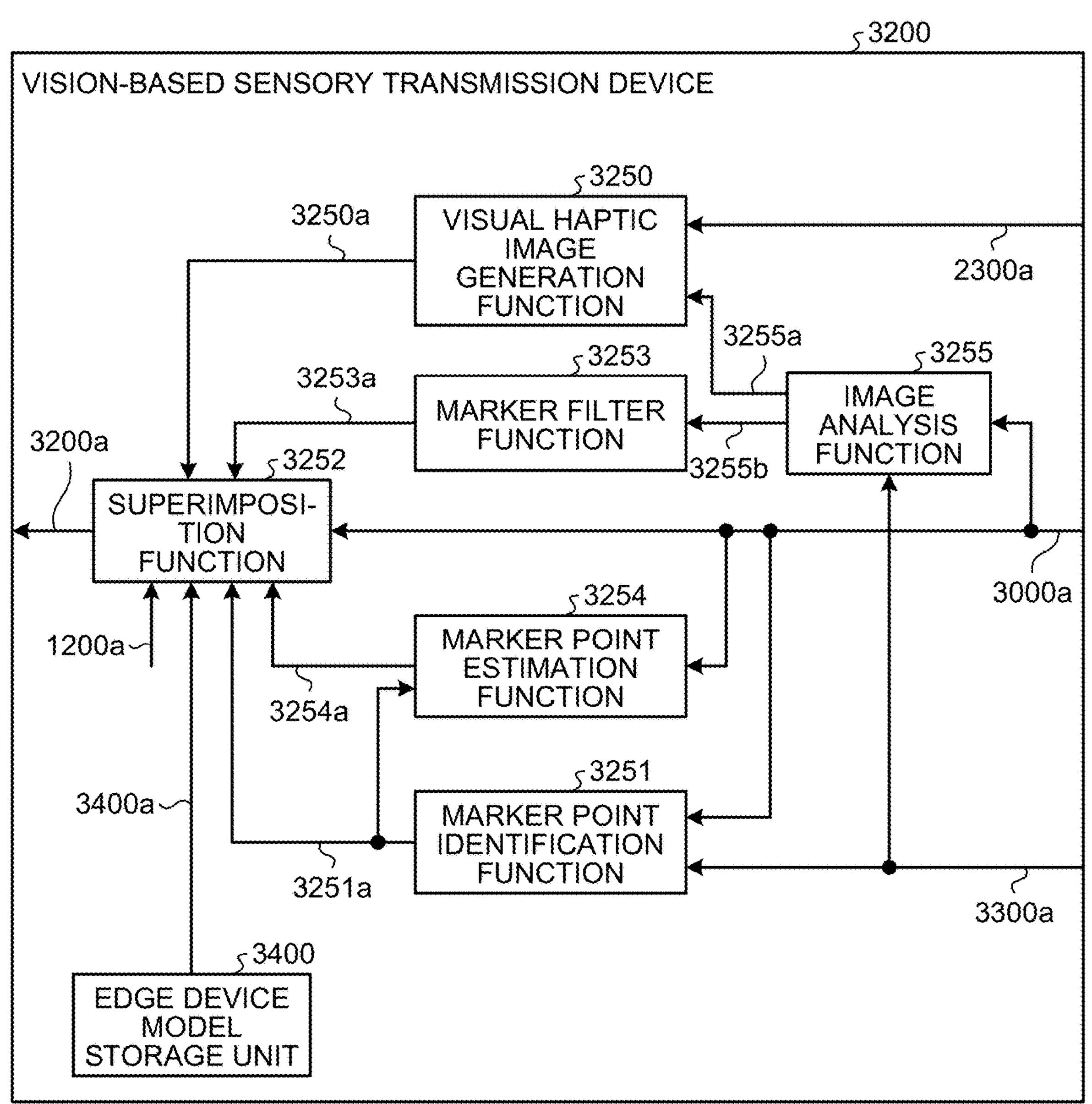
FIG. 53 is a diagram illustrating functions of a vision-based sensory transmission device included in the remote operation system according to the thirteenth embodiment.

FIG. 52 is a diagram illustrating a configuration of a remote operation system 13 according to a thirteenth embodiment. The remote operation system 13 is a system in which the motion transmission information 1200*a* is input to the vision-based sensory transmission device 3200 included in the remote operation system 12 according to the twelfth embodiment. FIG. 53 is a diagram illustrating functions of the vision-based sensory transmission device 3200 included in the remote operation system 13 according to the thirteenth embodiment. The vision-based sensory transmission device 3200 includes an edge device model storage unit 3400 that stores edge device model information 3400*a* that is model information on the edge device 2000. The edge device model storage unit 3400 stores geometric information on a point at which the edge device 2000 contacts the target 4000. For example, the edge device model storage unit 3400 is implemented by semiconductor memory.

The vision-based sensory transmission device 3200 uses the superimposition function 3252 to generate the vision-based sensory transmission image 3200*a* based on the visual haptic image information 3250*a*, the marker point identification information 3251*a*, the marker filter information 3253*a*, the marker point estimation information 3254*a*, the motion transmission information 1200*a*, and the edge device model information 3400*a* output from the edge device model storage unit 3400.

Figure 54:
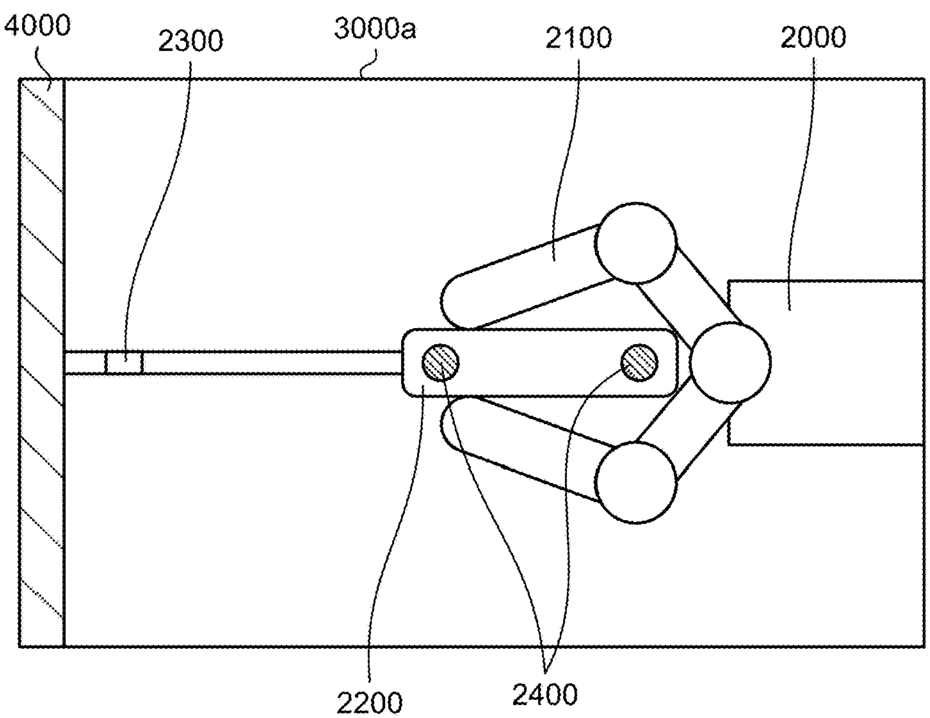
FIG. 54 is a diagram illustrating imaging information that is the output of an imaging device when a tool included in an edge device of the remote operation system according to the thirteenth embodiment is in contact with a target.

FIG. 54 is a diagram illustrating the imaging information 3000*a* that is the output of the imaging device 3000 when the tool 2200 included in the edge device 2000 of the remote operation system 13 according to the thirteenth embodiment is in contact with the target 4000. The tool 2200 includes two active markers 2400.

Figure 55:
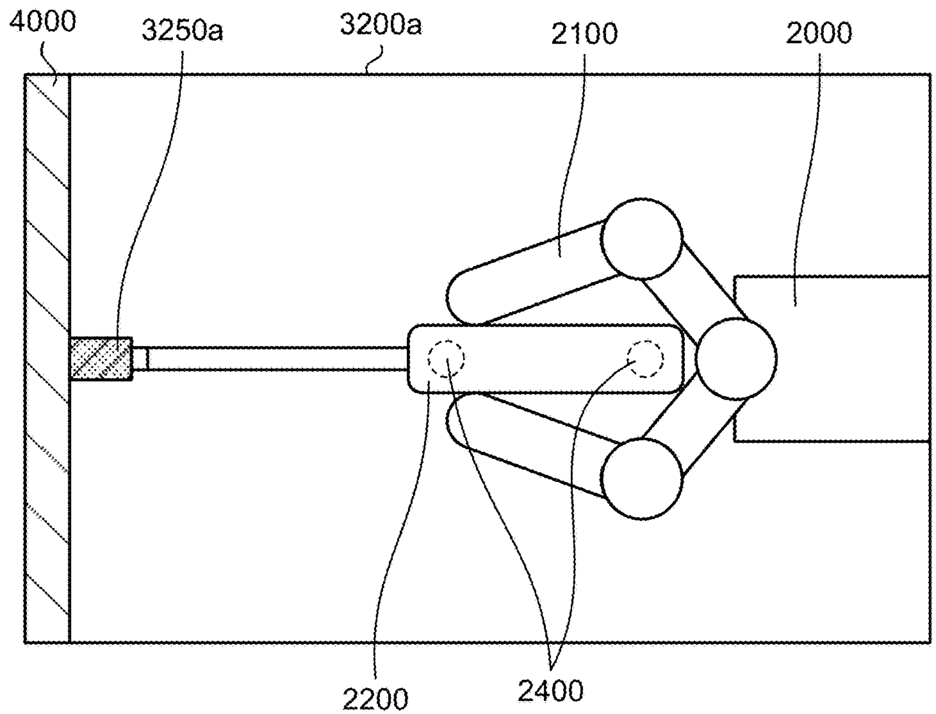
FIG. 55 is a diagram illustrating a vision-based sensory transmission image that is the output of the vision-based sensory transmission device when the tool included in the edge device of the remote operation system according to the thirteenth embodiment is in contact with the target.

FIG. 55 is a diagram illustrating the vision-based sensory transmission image 3200*a* that is the output of the vision-based sensory transmission device 3200 when the tool 2200 included in the edge device 2000 of the remote operation system 13 according to the thirteenth embodiment is in contact with the target 4000. In the vision-based sensory transmission image 3200*a*, the visual haptic image information 3250*a* is superimposed on the position of the distal end of the tool 2200 calculated based on a vector in the image calculated from the positions of the two active markers 2400 and the edge device model information 3400*a* stored in advance.

The remote operation system 13 according to the thirteenth embodiment provides, in addition to the effect provided by the remote operation system 12 according to the twelfth embodiment, an effect that even when the positions where the active markers 2400 are attached are not the point of contact with the target 4000, the haptic information 2300*a* can be presented at a position in contact with the target 4000, and the ranges of selection of sizes and attachment methods of the active markers 2400 can be expanded.

Fourteenth Embodiment

In the thirteenth embodiment, the active markers 2400 are attached to the tool 2200. In a fourteenth embodiment, active markers 2400 are attached to the end effector 2100 rather than to the tool 2200. That is, the component to which the active markers 2400 are attached is different between the thirteenth embodiment and the fourteenth embodiment.

Figure 56:
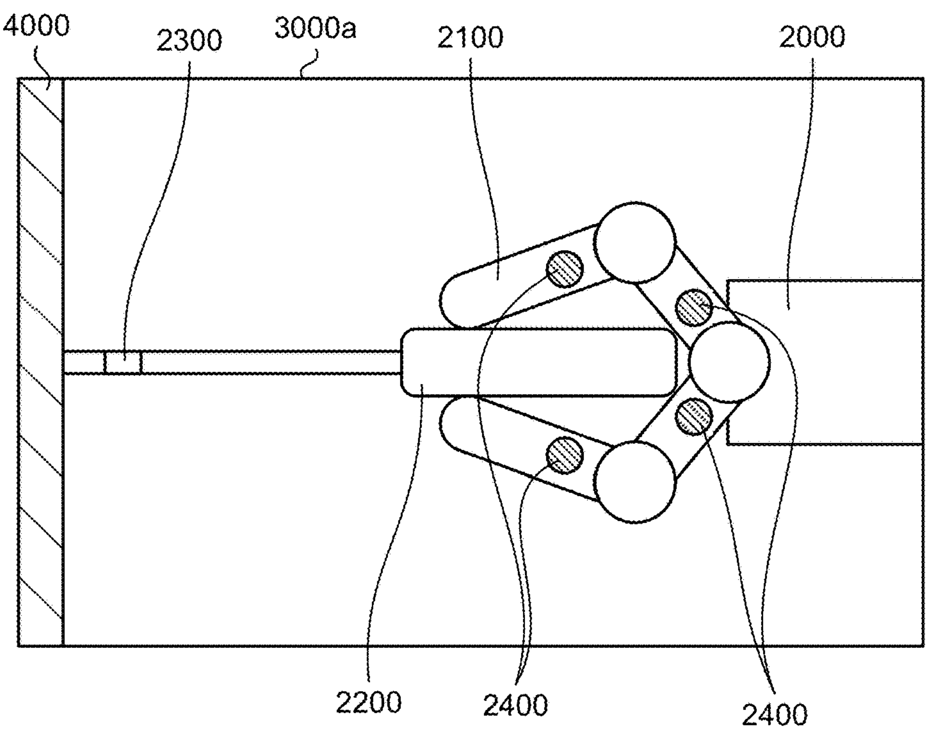
FIG. 56 is a diagram illustrating imaging information that is the output of an imaging device when an end effector included in an edge device of a remote operation system according to a fourteenth embodiment is in contact with a target.
Figure 57:
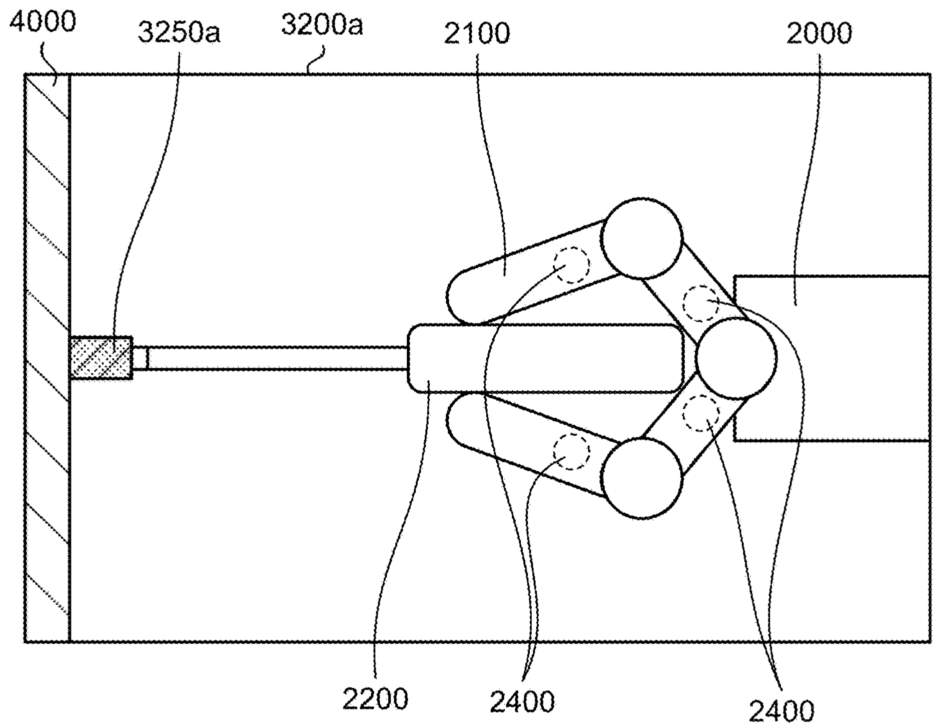
FIG. 57 is a diagram illustrating a vision-based sensory transmission image that is the output of a vision-based sensory transmission device when the end effector included in the edge device of the remote operation system according to the fourteenth embodiment is in contact with the target.

FIG. 56 is a diagram illustrating the imaging information 3000*a* that is the output of the imaging device 3000 when the end effector 2100 included in the edge device 2000 of the remote operation system according to the fourteenth embodiment is in contact with the target 4000. FIG. 57 is a diagram illustrating the vision-based sensory transmission image 3200*a* that is the output of the vision-based sensory transmission device 3200 when the end effector 2100 included in the edge device 2000 of the remote operation system according to the fourteenth embodiment is in contact with the target 4000. As illustrated in FIGS. 56 and 57, in the fourteenth embodiment, the active markers 2400 are attached to the end effector 2100 rather than to the tool 2200.

The remote operation system according to the fourteenth embodiment provides, in addition to the effect provided by the remote operation system 13 according to the thirteenth embodiment, an effect that even when the positions where the active markers 2400 are attached are not the point of contact with the target 4000, the haptic information 2300*a* can be presented at a position in contact with the target 4000, and the ranges of selection of sizes and attachment methods of the active markers 2400 can be further expanded.

Fifteenth Embodiment

In the thirteenth embodiment, the haptic sensing device 2300 is attached to the tool 2200. In a fifteenth embodiment, the haptic sensing device 2300 is attached to the end effector 2100 rather than to the tool 2200. That is, the component to which the haptic sensing device 2300 is attached is different between the thirteenth embodiment and the fifteenth embodiment.

Figure 58:
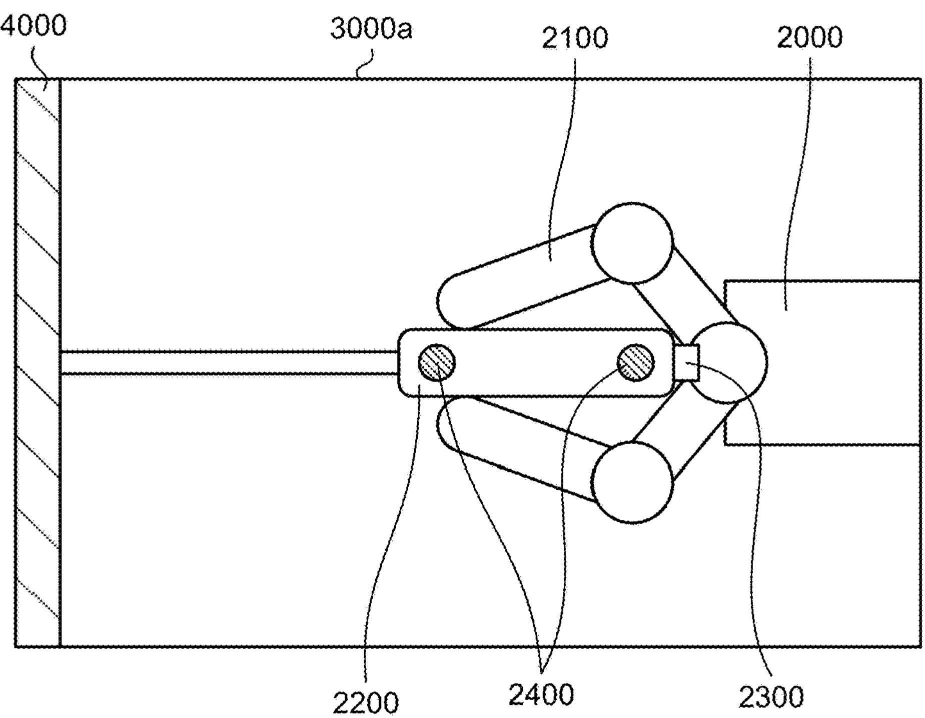
FIG. 58 is a diagram illustrating imaging information that is the output of an imaging device when a tool included in an edge device of a remote operation system according to a fifteenth embodiment is in contact with a target.
Figure 59:
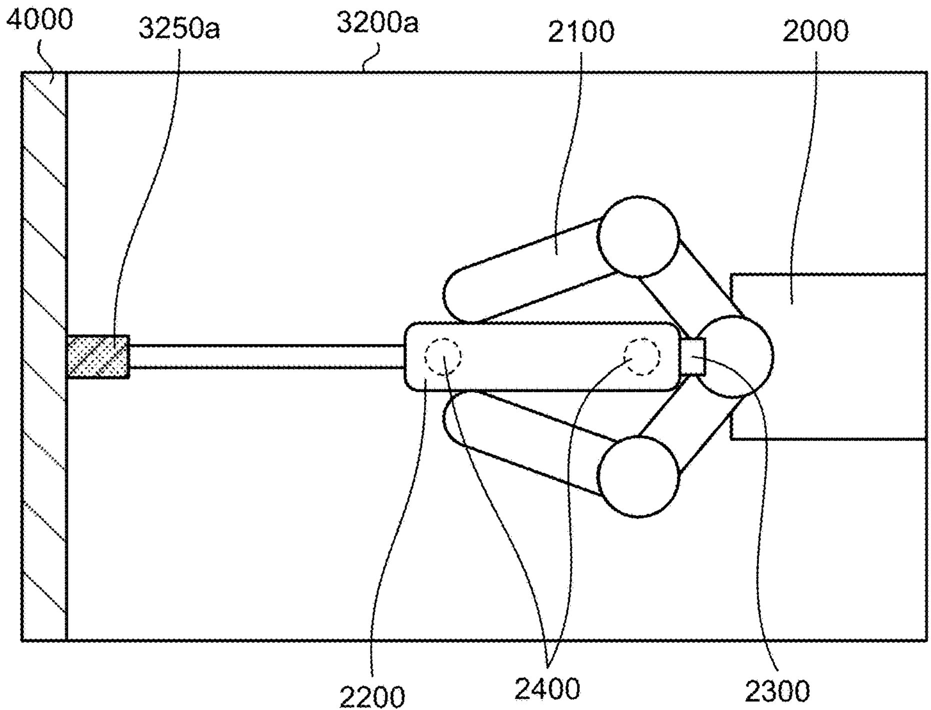
FIG. 59 is a diagram illustrating a vision-based sensory transmission image that is the output of a vision-based sensory transmission device when the tool included in the edge device of the remote operation system according to the fifteenth embodiment is in contact with the target.

FIG. 58 is a diagram illustrating the imaging information 3000*a* that is the output of the imaging device 3000 when the tool 2200 included in the edge device 2000 of the remote operation system according to the fifteenth embodiment is in contact with the target 4000. FIG. 59 is a diagram illustrating the vision-based sensory transmission image 3200*a* that is the output of the vision-based sensory transmission device 3200 when the tool 2200 included in the edge device 2000 of the remote operation system according to the fifteenth embodiment is in contact with the target 4000. As illustrated in FIGS. 58 and 59, in the fifteenth embodiment, the haptic sensing device 2300 is attached to the end effector 2100 rather than to the tool 2200.

The remote operation system according to the fifteenth embodiment provides, in addition to the effect provided by the remote operation system 13 according to the thirteenth embodiment, an effect that even when the position where the haptic sensing device 2300 is attached is not the point of contact with the target 4000, the haptic information 2300*a* can be presented at the position in contact with the target 4000, and the ranges of selection of sizes and attachment methods of the haptic sensing device 2300 can be further expanded.

Also in the fourteenth embodiment, the haptic sensing device 2300 may be attached to the end effector 2100 rather than to the tool 2200. When the haptic sensing device 2300 is attached to the end effector 2100, in addition to the effect provided by the remote operation system according to the fourteenth embodiment, an effect can be provided that even when the position where the haptic sensing device 2300 is attached is not the point of contact with the target 4000, the haptic information 2300*a* can be presented at the position in contact with the target 4000, and the ranges of selection of sizes and attachment methods of the haptic sensing device 2300 can be further expanded.

Sixteenth Embodiment

In a sixteenth embodiment, although not illustrated, the configuration in which the active markers 2400 are attached to places other than the point of contact with the target 4000 as illustrated in the thirteenth and fourteenth embodiments is applied to the configurations of the third, fourth, fifth, sixth, seventh, eighth, and eleventh embodiments.

The configuration of the sixteenth embodiment provides, in addition to the effects provided by the third, fourth, fifth, sixth, seventh, eighth, and eleventh embodiments, an effect that even when the position(s) where the haptic sensing device(s) 2300 is/are attached is/are not the point(s) of contact with the target 4000, the haptic information 2300*a* can be presented at the position(s) in contact with the target 4000, and the ranges of selection of sizes and attachment methods of the haptic sensing device(s) 2300 can be further expanded.

Seventeenth Embodiment

In a seventeenth embodiment, although not illustrated, the configuration in which the haptic sensing device 2300 is attached to a place other than the point of contact with the target 4000 as illustrated in the fifteenth embodiment is applied to the configurations of the third, fourth, fifth, sixth, seventh, eighth, eleventh, and sixteenth embodiments.

The configuration of the seventeenth embodiment provides, in addition to the effects provided by the third, fourth, fifth, sixth, seventh, eighth, eleventh, and sixteenth embodiments, an effect that even when the position(s) where the haptic sensing device(s) 2300 is/are attached is/are not the point(s) of contact with the target 4000, the haptic information 2300*a* can be presented at the position(s) in contact with the target 4000, and the ranges of selection of sizes and attachment methods of the haptic sensing device(s) 2300 can be further expanded.

Eighteenth Embodiment

In an eighteenth embodiment, although not illustrated, the haptic sensing device(s) 2300 in any one of the third, fourth, fifth, sixth, seventh, eighth, ninth, eleventh, twelfth, thirteenth, fourteenth, fifteenth, sixteenth, and seventeenth embodiments includes/include detection capability before contacting the target 4000.

The configuration of the eighteenth embodiment provides, in addition to the effects provided by the third, fourth, fifth, sixth, seventh, eighth, ninth, eleventh, twelfth, thirteenth, fourteenth, fifteenth, sixteenth, and seventeenth embodiments, an effect of enabling the operator 1000 to visually recognize a situation in which the edge device 2000 is likely to contact the target 4000, allowing an improvement in operability for the operator 1000.

Nineteenth Embodiment

In a nineteenth embodiment, although not illustrated, the haptic sensing device(s) 2300 in any one of the first, second, third, fourth, fifth, sixth, seventh, eighth, ninth, eleventh, twelfth, thirteenth, fourteenth, fifteenth, sixteenth, seventeenth, and eighteenth embodiments includes/include a function of, when detecting the target 4000, simultaneously transmitting not only the visual haptic image information 3250*a* but also auditory information of loudness of sound, an interval, a tone, or a combination of these three, according to a detected distance, a detected force, a detected tactile sensation, or a combination of these three.

The configuration of the nineteenth embodiment provides, in addition to the effects provided by the first, second, third, fourth, fifth, sixth, seventh, eighth, ninth, eleventh, twelfth, thirteenth, fourteenth, fifteenth, sixteenth, seventeenth, and eighteenth embodiments, an effect of, when the haptic sensing device(s) 2300 detects/detect the target 4000, enabling the operator 1000 to recognize the detection not only visually but also auditorily at the same time, allowing an improvement in operability for the operator 1000.

A "visual display device" in the claims corresponds to the "visual presentation device" in the description and the drawings.

Figure 60:
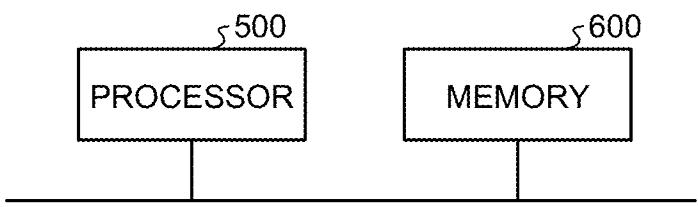
FIG. 60 is a diagram illustrating a processor when some of a plurality of components included in the remote operation system according to the first embodiment are implemented by the processor.

FIG. 60 is a diagram illustrating a processor 500 when some of a plurality of components included in the remote operation system 1 according to the first embodiment are implemented by the processor 500. That is, some functions of the plurality of components included in the remote operation system 1 may be implemented by the processor 500 that executes a program stored in memory 600. The processor 500 is a central processing unit (CPU), a processing device, an arithmetic device, a microprocessor, a digital signal processor (DSP), or a system large-scale integration (LSI). FIG. 60 also illustrates the memory 600.

When some functions of the plurality of components included in the remote operation system 1 are implemented by the processor 500, the functions are implemented by the processor 500 and software, firmware, or a combination of software and firmware. The software or firmware is described as a program and stored in the memory 600. The processor 500 reads and executes the program stored in the memory 600 to implement some functions of the plurality of components included in the remote operation system 1.

When some functions of the plurality of components included in the remote operation system 1 are implemented by the processor 500, the remote operation system 1 includes the memory 600 for storing a program that results in execution of some of a plurality of steps executed by the remote operation system 1. The program stored in the memory 600 can be said to causes a computer to perform some of the plurality of components included in the remote operation system 1.

The memory 600 is, for example, nonvolatile or volatile semiconductor memory such as random-access memory (RAM), read-only memory (ROM), flash memory, an erasable programmable read-only memory (EPROM), or an electrically erasable programmable read-only memory (EEPROM) (registered trademark); a magnetic disk; a flexible disk; an optical disk; a compact disk; a mini disk; a digital versatile disk (DVD); or the like.

For example, the memory 600 also stores obstacle information, target shape information, and shape deformation information. The memory 600 may also be used as temporary memory when the processor 500 performs processing.

The program executed by the processor 500 may be stored in an installable-format or executable-format file on a computer-readable storage medium and provided as a computer product. The program executed by the processor 500 may be provided to the remote operation system 1 via a communication network such as the Internet.

Figure 61:
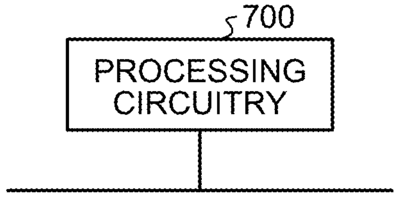
FIG. 61 is a diagram illustrating processing circuitry when some of the plurality of components included in the remote operation system according to the first embodiment are implemented by the processing circuitry.

FIG. 61 is a diagram illustrating processing circuitry 700 when some of the plurality of components included in the remote operation system 1 according to the first embodiment are implemented by the processing circuitry 700. That is, some of the plurality of components included in the remote operation system 1 may be implemented by the processing circuitry 700.

The processing circuitry 700 is dedicated hardware. The processing circuitry 700 is, for example, a single circuit, a combined circuit, a programmed processor, a parallel-programmed processor, an application-specific integrated circuit (ASIC), a field-programmable gate array (FPGA), or a combination of them. Some of the plurality of components included in the remote operation system 1 may be implemented by dedicated hardware separate from the rest.

For a plurality of functions of the remote operation system 1, some of the plurality of functions may be implemented by software or firmware, and the rest of the plurality of functions may be implemented by dedicated hardware. Thus, the plurality of functions of the remote operation system 1 can be implemented by hardware, or a combination of one of or both software and firmware and hardware.

Some of a plurality of components included in the remote operation system of each of the second to eighteenth embodiments may be implemented by a processor. The processor is a processor similar to the processor 500 described above. In that case, the processor executes a program stored in memory, thereby implementing some functions of the plurality of components included in the remote operation system of each of the second to eighteenth embodiments. The memory is memory similar to the memory 600.

Some of the plurality of components included in the remote operation system of each of the second to eighteenth embodiments may be implemented by processing circuitry. The processing circuitry is processing circuitry similar to the processing circuitry 700 described above.

The configurations described in the above embodiments illustrate an example, and can be combined with another known art. The embodiments can be combined with each other. The configurations can be partly omitted or changed without departing from the gist.

REFERENCE SIGNS LIST

1, 3, 9, 10, 11, 12, 13 remote operation system; 500 processor; 600 memory; 700 processing circuitry; 1000 operator; **1000*a* operator operation; 1100 visual presentation device; 1100*a* image information; 1200 motion operation transmission device; 1200*a* motion transmission information; 2000 edge device; 2100 end effector; 2200 tool; 2300 haptic sensing device; 2300*a* haptic information; 2400 active marker; 2500 passive marker; 2600 light intensity-controlled light emitter; 2700 haptic optical converter; 2700*a* light intensity signal; 3000 imaging device; 3000*a* imaging information; 3200 vision-based sensory transmission device; 3200*a* vision-based sensory transmission image; 3201 superimposed image; 3250 visual haptic image generation function; 3250*a* visual haptic image information; 3251 marker point identification function; 3251*a* marker point identification information; 3252 superimposition function; 3253 marker filter function; 3253*a* marker filter information; 3254 marker point estimation function; 3254*a* marker point estimation information; 3255 image analysis function; 3255*a* haptic image pattern selection information; 3255*b* marker filter image selection information; 3300 active marker control device; 3300*a* marker information; 3300*b* active marker control signal; 3400 edge device model storage unit; 3400*a* edge device model information; 4000 target; 4000*a*** interaction.

The invention claimed is:

1. A remote operation system comprising:

an edge device to contact a target;

processing circuitry configured as a motion operation transmission device to receive an operator operation for operating the edge device and output motion transmission information corresponding to the operator operation to the edge device; and a visual display device to display an image of the target and the edge device, wherein the edge device includes a haptic sensing device to detect a haptic sensation to the target, and wherein the edge device further includes processing circuitry configured as a haptic optical converter that converts the haptic information output from the haptic sensing devices into light intensity signals, and a light intensity-controlled light emitter attached to a distal end portion of the edge device that emits light of an intensity corresponding to the light intensity signals obtained by the haptic optical converter.

2. The remote operation system according to claim 1, further comprising:

an imaging device to image the target and the edge device;

the processing circuitry further configured as a vision-based sensory transmission device; and the processing circuitry further configured as an active marker control device to generate an active marker control signal for generating a detectable marker and to generate marker information based on imaging information obtained by the imaging device, wherein the edge device further includes an active marker controlled by the active marker control signal generated by the active marker control device, and the vision-based sensory transmission device identifies a position of the active marker, generates visual haptic image information indicating an image corresponding to haptic information indicating the haptic sensation detected by the haptic sensing device, and superimposes marker point identification information obtained by a marker point identification function, the visual haptic image information obtained by a visual haptic image generation function, and the imaging information obtained by the imaging device.

3. The remote operation system according to claim 2, wherein the haptic sensing device and the active marker provided to the edge device are attached to a distal end portion to contact the target.

4. The remote operation system according to claim 1, wherein the edge device further includes a haptic optical converter to convert the haptic sensation detected by the haptic sensing device into a signal specifying an intensity of light corresponding to a magnitude of the detected haptic sensation, and a light intensity-controlled light emitter to emit light of an intensity corresponding to the signal obtained by the haptic optical converter.

5. The remote operation system according to claim 4, wherein the haptic sensing device provided to the edge device is attached to a distal end portion to contact the target.

6. A remote operation system comprising:

an edge device to contact a target;

processing circuitry configured as a motion operation transmission device to receive an operator operation for operating the edge device and output motion transmission information corresponding to the operator operation to the edge device; and a visual display device to display an image of the target and the edge device, wherein the edge device includes a haptic sensing device to detect a haptic sensation to the target, an imaging device to image the target and the edge device; and the processing circuitry further configured as a vision-based sensory transmission device, wherein the edge device further includes a passive marker, and the vision-based sensory transmission device identifies a position of the passive marker, generates visual haptic image information indicating an image corresponding to haptic information indicating the haptic sensation detected by the haptic sensing device, and superimposes marker point identification information obtained by a marker point identification function, the visual haptic image information obtained by a visual haptic image generation function, and imaging information obtained by the imaging device, the edge device includes a plurality of the passive markers, and the vision-based sensory transmission device estimates a marker point that has disappeared, based on the imaging information and the marker point identification information, when one of the passive markers has been hidden by the target and disappeared from the imaging information, and another passive marker is present in the imaging information.

7. The remote operation system according to claim 6, wherein the haptic sensing device and the passive marker provided to the edge device are attached to a distal end portion to contact the target.

8. The remote operation system according to claim 7, wherein the vision-based sensory transmission device generates marker filter information for filtering the passive marker detected.

9. The remote operation system according to claim 8, wherein the vision-based sensory transmission device generates, based on the imaging information, haptic image pattern selection information for selecting a haptic image pattern that is easy for a person to recognize, and marker filter image selection information for selecting a naturally harmonious image.

10. The remote operation system according to claim 7, wherein the vision-based sensory transmission device generates, based on the imaging information, haptic image pattern selection information for selecting a haptic image pattern that is easy for a person to recognize, and marker filter image selection information for selecting a naturally harmonious image.

11. The remote operation system according to claim 7, wherein the vision-based sensory transmission device includes an edge device model memory to store geometric information on a point at which the edge device contacts the target.

12. The remote operation system according to claim 6, wherein the vision-based sensory transmission device generates marker filter information for filtering the passive marker detected.

13. The remote operation system according to claim 12, wherein the vision-based sensory transmission device generates, based on the imaging information, haptic image pattern selection information for selecting a haptic image pattern that is easy for a person to recognize, and marker filter image selection information for selecting a naturally harmonious image.

14. The remote operation system according to claim 6, wherein the vision-based sensory transmission device generates, based on the imaging information, haptic image pattern selection information for selecting a haptic image pattern that is easy for a person to recognize, and marker filter image selection information for selecting a naturally harmonious image.

15. The remote operation system according to claim 6, wherein the vision-based sensory transmission device includes an edge device model memory to store geometric information on a point at which the edge device contacts the target.

* * * * *